(12) United States Patent
Park et al.

(10) Patent No.: US 12,111,096 B2
(45) Date of Patent: Oct. 8, 2024

(54) REFRIGERATOR

(71) Applicant: LG Electronics Inc., Seoul (KR)

(72) Inventors: Kyutae Park, Seoul (KR); Minsub Kim, Seoul (KR); Kyongsok Oh, Seoul (KR); Sangmyung Lee, Seoul (KR); Hangbok Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/378,516

(22) Filed: Oct. 10, 2023

(65) Prior Publication Data
US 2024/0035734 A1 Feb. 1, 2024

Related U.S. Application Data

(60) Continuation of application No. 18/137,161, filed on Apr. 20, 2023, which is a division of application No.
(Continued)

(30) Foreign Application Priority Data

Aug. 29, 2016 (KR) .......................... 10-2016-0110370

(51) Int. Cl.
H05K 5/00 (2006.01)
E06B 3/70 (2006.01)
(Continued)

(52) U.S. Cl.
CPC .............. *F25D 23/028* (2013.01); *E06B 3/70* (2013.01); *E06B 7/30* (2013.01); *F25D 23/02* (2013.01);
(Continued)

(58) Field of Classification Search
CPC ...................................................... H05K 7/00
See application file for complete search history.

(56) References Cited

U.S. PATENT DOCUMENTS 10,126,849 B2 11/2018 Lee et al.
2006/0260341 A1 11/2006 Meyvis
(Continued)

FOREIGN PATENT DOCUMENTS

EP 2927628 10/2015
EP 3505853 7/2019
(Continued)

OTHER PUBLICATIONS

Extended European Search Report in European Application No. 17846858.3, dated Mar. 3, 2020, 8 pages.
(Continued)

*Primary Examiner* — Jerry Wu
(74) *Attorney, Agent, or Firm* — Fish & Richardson P.C.

(57) ABSTRACT

A refrigerator includes: a cabinet forming a storage space; a door for opening and closing the storage space and provided with a receiving space; a see-through portion extending through the door and communicating with the receiving space; a door light for illuminating a rear space of the door; a transparent panel assembly for shielding the see-through portion and becoming transparent or opaque so as to selectively visualize the see-through portion according to On/Off states of the door light; and a heat insulating member, formed along a perimeter of the transparent panel assembly, for insulating a perimeter portion of the transparent panel assembly.

19 Claims, 57 Drawing Sheets

Related U.S. Application Data

16/329,457, filed as application No. PCT/KR2017/008473 on Aug. 4, 2017, now Pat. No. 11,674,742.

(51) Int. Cl.

| | | |
|---|---|---|
| *E06B 7/30* | (2006.01) | |
| *F25D 23/02* | (2006.01) | |
| *F25D 27/00* | (2006.01) | |
| *F25D 29/00* | (2006.01) | |
| *H04L 12/28* | (2006.01) | |

(52) U.S. Cl.
CPC ............ *F25D 27/00* (2013.01); *F25D 29/00* (2013.01); *H04L 12/28* (2013.01)

(56) References Cited

U.S. PATENT DOCUMENTS

| | | |
|---|---|---|
| 2012/0105424 A1 | 5/2012 | Lee et al. |
| 2013/0026900 A1* | 1/2013 | Oh .................... F25D 23/028 312/401 |
| 2014/0078407 A1 | 3/2014 | Green et al. |
| 2014/0144083 A1 | 5/2014 | Artwohl et al. |
| 2014/0232958 A1 | 8/2014 | Venturas et al. |
| 2015/0276302 A1* | 10/2015 | Roh .................. G02F 1/133377 62/127 |

FOREIGN PATENT DOCUMENTS

| | | |
|---|---|---|
| JP | 2004-028542 | 1/2004 |
| JP | 2004-061734 | 2/2004 |
| KR | 10-2012-0044874 | 5/2012 |
| KR | 10-2015-0036321 | 4/2015 |
| KR | 10-2016-0045545 | 4/2016 |
| KR | 10-2016-0084020 | 7/2016 |
| WO | WO 2012/057457 | 5/2012 |

OTHER PUBLICATIONS

Notice of Allowance in European Appln. No. 17846858.3, mailed on May 22, 2023, 9 pages.
Office Action in Chinese Appln. No. 201780049869.7, dated Apr. 21, 2020, 18 pages (with English translation).
Office Action in Korean Appln. No. 10-2016-0110370, mailed on Nov. 29, 2022, 12 pages (with English translation).
Refrigerators And Refrigerator Interior Illumination Device, Apr. 22, 2010; Publication of KR20100041055A (Year: 2010).

\* cited by examiner

FIG. 16
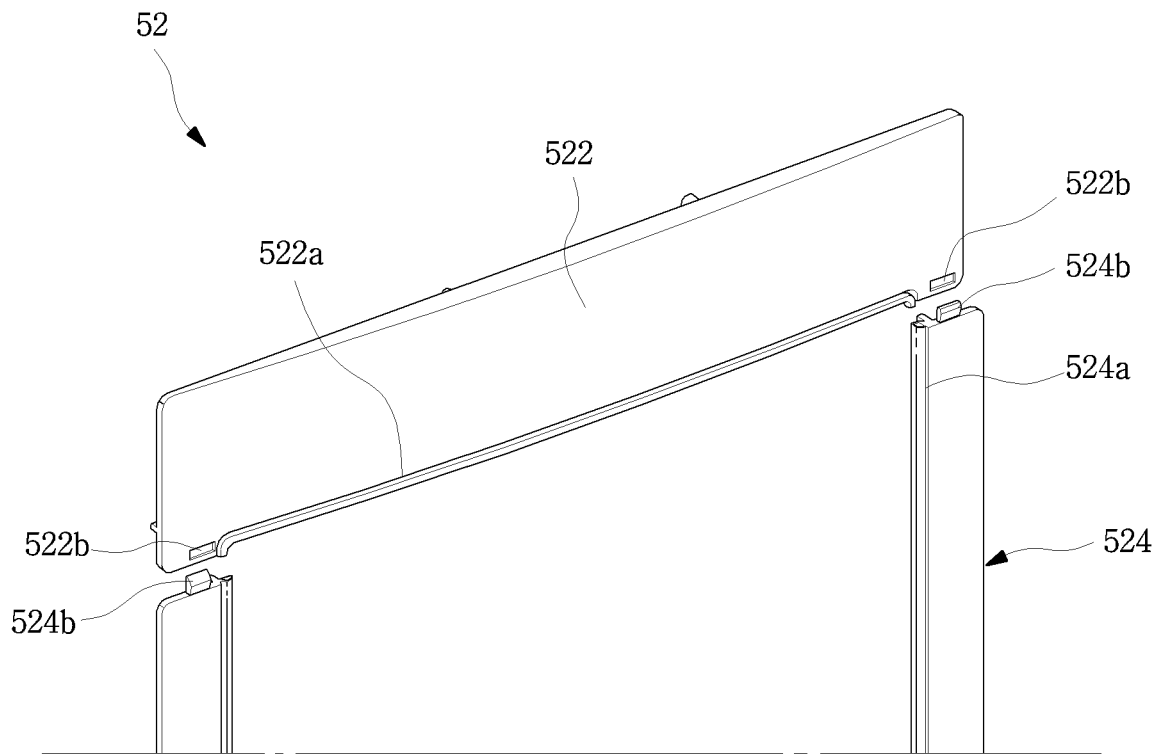
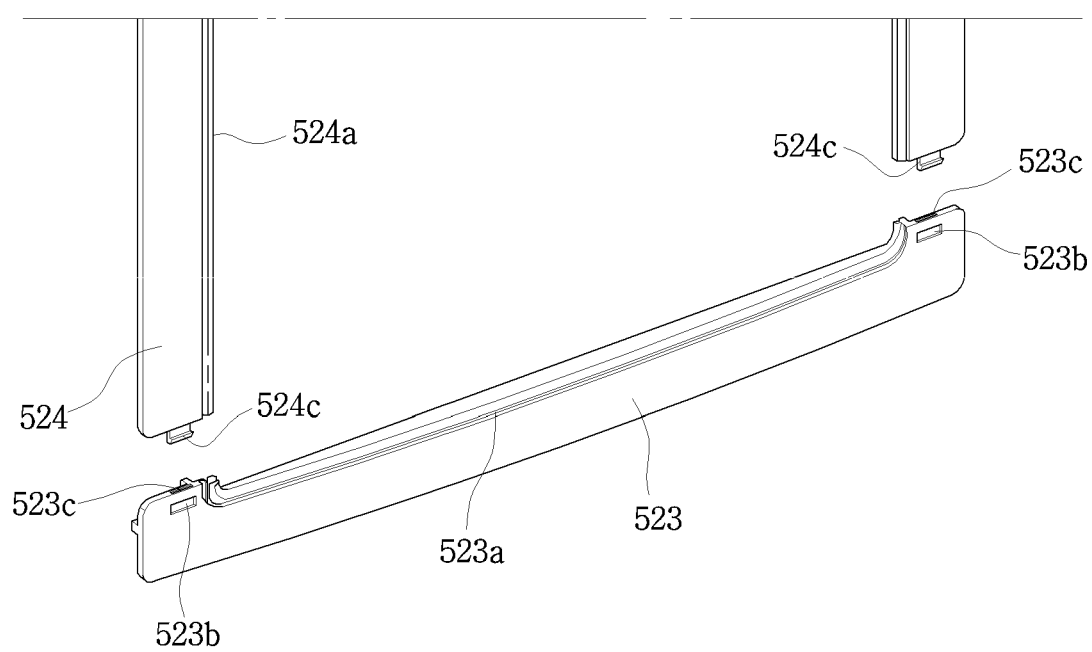

REFRIGERATOR

CROSS-REFERENCE TO RELATED APPLICATIONS

This application is a continuation of U.S. application Ser. No. 18/137,161, filed on Apr. 20, 2023, which is a divisional of U.S. application Ser. No. 16/329,457, filed on Feb. 28, 2019, now U.S. Pat. No. 11,674,742, which is a National Stage application under 35 U.S.C. § 371 of International Application No. PCT/KR2017/008473, filed on Aug. 4, 2017, which claims the benefit of Korean Patent Application No. 10-2016-0110370, filed on Aug. 29, 2016. The disclosures of the prior applications are incorporated by reference in their entirety.

TECHNICAL FIELD

The present invention relates to a refrigerator.

BACKGROUND

In general, refrigerators are home appliances for storing foods at a low temperature in a storage space that is covered by a door. For this, refrigerators cool the inside of the storage space by using cool air generated by being heat-exchanged with a refrigerant circulated through a refrigeration cycle to store foods in an optimum state.

In recent years, refrigerators have become increasingly multi-functional with changes of dietary lives and gentrification of products, and refrigerators having various structures and convenience devices for convenience of users and for efficient use of internal spaces have been released.

The storage space of the refrigerator may be opened/closed by the door. Also, refrigerators may be classified into various types according to an arranged configuration of the storage space and a structure of the door for opening and closing the storage space.

In general, the refrigerator has a problem in that when the door is not opened, internal food may not be identified. That is, the door should be opened to identify whether desired food is received in a space in the refrigerator or in a separate storage space provided in the door. Further, when a user does not exactly know where the food is stored, an opening time of the door may increase or the number of times the door is opened may increase. At this time, unnecessary outflow of cold air may occur.

In recent years, to solve such a limitation, a refrigerator has been developed while allows a portion of a door thereof to be transparent or allows the inside thereof to be visible from the outside.

SUMMARY

An object of an embodiment of the present invention is to provide a refrigerator in which a see-through part that is selectively transparent by user's manipulation is provided in at least a portion of a refrigerator door, and dew condensation is prevented from occurring on the see-through part.

Another object of an embodiment of the present invention is to provide a refrigerator in which at least a portion of a refrigerator door is selectively transparent by user's manipulation to allow the user to see the inside of the refrigerator even though the refrigerator door is closed, and simultaneously, to selectively output a screen.

Another object of an embodiment of the present invention is to provide a refrigerator in which a see-through part of a door is capable of being transparent or opaque or outputting a screen according to selective turn-on/off of a door light or a display light.

Another object of an embodiment of the present invention is to provide a refrigerator in which a transparent display is disposed on the see-through part, and a wire and a PCB within a door are not exposed through the see-through part.

Another object of an embodiment of the present invention is to provide a refrigerator in which a transparent panel assembly that is viewing the inside thereof and displaying a screen is provided, and a door having a compact structure is provided.

Another object of an embodiment of the present invention is to provide a refrigerator in which a transparent panel assembly is easily assembled and mounted.

Another object of an embodiment of the present invention is to provide a refrigerator in which a screen displayed through a display is more clearly displayed.

Another object of an embodiment of the present invention is to provide a refrigerator which is capable of being insulated without damaging a display within a door.

Another object of an embodiment of the present invention is to provide a refrigerator having a slim door structure even though a display and a door light are provided in a door.

Another object of an embodiment of the present invention is to provide a refrigerator in which a PCB within a door is easily dissipated.

Another object of an embodiment of the present invention is to provide a refrigerator in which a PCB within a door is easily prevented from being contaminated by foreign substances while being easily dissipated.

Another object of an embodiment of the present invention is to provide a refrigerator in which a screen that is capable of being touched to be manipulated is displayed on a see-through part through which an inner accommodation space is visible.

Another object of an embodiment of the present invention is to provide a refrigerator which is capable of wirelessly communicating with home appliances and capable of being manipulated to output and control information of the home appliances through a see-through part through which an inner accommodation space is visible.

A refrigerator according to an embodiment of the present invention includes: a cabinet defining a storage space; a door configured to open and close the storage space and provide an accommodation space; a see-through part passing through the door to communicate with the accommodation space; a door light configured to illuminate a rear space of the door; a transparent panel assembly configured to cover the see-through part and being transparent or opaque so as to allow the see-through part to be selectively visible according to turn on/off of the door light; and an insulation member disposed along a circumference of the transparent panel assembly to thermally insulate a circumferential portion of the transparent panel assembly.

The transparent panel assembly may include: a front panel made of a transparent material to define a front surface of the transparent panel assembly and exposed through the see-through part; a rear panel made of a transparent material to define a rear surface of the transparent panel assembly and spaced apart from the front panel; and an outer spacer configured to connect the front panel to the rear panel, defining an outer appearance of a circumferential surface of the transparent panel assembly, and configured to seal a gap between the front panel and the rear panel.

A low-emission coating layer for the insulation may be disposed on the rear panel.

A space between the front panel and the rear panel may be thermally insulated by vacuum or injecting an insulation gas.

A transparent plate may be further disposed between the front panel and the rear panel, a spacer for maintaining a distance between the front panel and the rear panel may be disposed on a circumference of each of front a rear surfaces of the transparent plate, and the transparent plate and the spacer may be disposed in an inner space of the outer spacer.

A heating member configured to heat a circumference of the front panel may be disposed on a circumference of a rear surface of the see-through part contacting the circumference of the front panel.

An opaque bezel may be disposed on a circumference of the front panel, and a heating member configured to heat the circumference of the front panel may be disposed on the bezel.

The front panel may further protrude outward than the rear panel, and the bezel may be disposed on a rear surface of the protruding portion of the front panel.

The door may include an out plate which defines an outer appearance of a front surface and through which the see-through part is opened, and an inner frame which is disposed along a circumference of the see-through part and on which a protruding end of the front panel is seated.

A bent part that is bent along the see-through part may be disposed on the out plate, an accommodation groove into which an end of the bent part is inserted may be defined in the inner frame, and a space between the see-through part and the front panel may be covered by the inner frame.

A rib supporting an end of the front panel may be disposed on the rear surface of the inner frame.

The transparent panel assembly may include: a display configured to output a screen and being transparent; and a display light configured to emit light for so as to output the screen on the display, wherein the door light and the display light are disposed along a circumference of the transparent panel assembly.

The door light may be disposed along each of left and right ends of the transparent panel assembly, and the display light may be disposed along each of upper and lower ends of the transparent panel assembly.

When the see-through part is in the opaque state, the transparent panel assembly output a black screen, and the display light may be turned on to heat the circumference of the transparent panel assembly.

When the see-through part is in the opaque state, the display light may be periodically turned on.

When the see-through part is in the opaque state, all of the display light and the door light may be turned on.

The insulation member may be assembled and mounted after being molded into a plurality of parts, and, when assembled, the insulation member may have a rectangular frame shape surrounding a circumferential surface of the transparent panel assembly.

A supplement member configured to support the transparent panel assembly may be further disposed between the insulation member and the transparent panel assembly.

The supplement member may include an adhesive or a sealing member for fixing the insulation member and the transparent panel assembly.

The supplement member may be made of an elastic material to fix the transparent panel member and prevent an impact from being applied to the transparent panel member.

The supplement member may include: a first supplement member made of an elastic material to press and support the circumference of the transparent panel assembly; and a second supplement member disposed between the first supplement member and the insulation member to allow the first supplement member and the insulation member to adhere to each other.

The following effects may be expected in the refrigerator according to the proposed embodiments.

In the refrigerator according to the embodiment of the present invention, the insulation may be disposed on the circumference of the transparent panel assembly to prevent the dew condensation from occurring on the circumference of the transparent panel assembly.

Also, the heating member may be disposed on the bezel of the transparent panel assembly to more effectively prevent the dew condensation from occurring on the transparent panel assembly.

Also, the door light and the display light may be provided on the circumference of the transfer panel assembly, and when the see-through part outputs the screen that is in the black state, the door light and/or the display light may be turned on to heat the circumference of the transparent panel assembly, thereby preventing the dew condensation from occurring on the circumference of the transparent panel assembly.

Also, the low-emission coating layer may be disposed on the rear panel of the transparent panel assembly to improve the insulation performance and prevent the dew condensation from occurring on the transparent panel assembly.

Also, the inside of the transparent panel assembly may be provided with the multilayered panel structure, and the vacuum or the insulation gas may be injected into the transparent panel assembly to improve the insulation performance, thereby more preventing the dew condensation from occurring on the transparent panel assembly.

Also, the supplement member may be disposed between the transparent panel assembly and the insulation member to prevent the gap from occurring between the transparent panels, thereby more stably supporting the transparent panels.

Also, the see-through part through which the accommodation space is visible may be provided in the door. The see-through part may include the transparent display and be selectively transparent or opaque according to the turn-on/off of the door light and the display light. Thus, the user may confirm the accommodation space through the see-through part by the user's manipulation without opening the door to improve the user's convenience and reduce the power consumption.

Also, in the see-through part, the display may operate according to the user's manipulation to display various screens and thereby to provide various information for the user's convenience and allow the user to input the manipulation thereof, thereby improving the user's convenience.

Also, in the state in which the see-through part is transparent, the screen of the display may be outputted. Thus, see-through part may provide the same use environment as the augmented reality through the see-through part to more improve the use convenience.

Also, at least a portion of the cable connected to the transparent display within the door, the cable connecting the door light to the display light, and the PCBs for controlling the cables may be provided with the same structure as the flexible flat cable and thus be disposed along the circumference of the transparent panel assembly. Thus, the cables may not be exposed through the see-through part to more improve the outer appearance.

Also, the plurality of wires may be disposed along the circumference of the transparent display panel to minimize the space which the wires are accommodated, thereby realizing the compact door.

Also, the PCB may be disposed in the upper portion of the door and be guided in the form of the wire to the outside of the door to minimize the portion through which the wires are accessible and provide the structure to be easily connected to the main control unit.

Also, the PBC provided in the upper portion of the door may be covered by the upper cap decor. The heat dissipation hole may be defined in the upper decor so that the heat generated in the PCB is easily released.

Also, the heat dissipation hole guide may be provided in the heat dissipation hole to easily release the heat, and also, the contaminants may not be directly introduced into the PCB to secure the safety.

Also, the adaptor and the display PCB, each of which has the relatively large volume, of the PCBs for driving the electronic components within the door may be disposed on the main PCB disposed on the cabinet to realize the slim structure of the door.

Also, the front panel defining the front surface of the transparent panel assembly may have the size greater than that of the see-through part so as to be stably supported on the inner surface of the door. In addition, the front panel may be assembled and mounted later to improve the durability and also improve the assemblability and productivity.

Also, the front panel may have the size greater than that of the display, and thus, when the touch sensor is disposed, the front panel may be disposed to be touched on the entire area of the display, thereby improving the usability.

Also, the insulation member that is previously molded along the circumference of the transparent panel assembly may be assembled and mounted inside the door to improve the assemblability and the productivity and also prevent the display and the PCB from being damaged when being foamed.

Also, the supplement member may be provided between the insulation member and the transparent panel assembly to buffer the impact applied to the transparent panel assembly to fix the transparent panel assembly and the previously molded insulation member with respect to each other and fill the gap between the transparent panel assembly and the insulation member.

Also, the supplement member may be made of the material having the adhesion and sealing property so that the insulation member is firmly fixed to the out plate and the door liner inside the door.

Also, the communication module that communicates with the external device may be provided in the main control unit to output the image or information of the terminal that is portable by the user or the remote personal computer through the see-through part.

Also, the communication module and the plurality of home appliances in the home may be connected to communicate with each other, thereby establishing the home network. Also, the information output and the operation control of the home appliances may be enabled through the see-through part to more improve the use convenience.

BRIEF DESCRIPTION OF THE DRAWINGS

FIG. 16 is an exploded perspective view of the inner frame when viewed from the front side.

DETAILED DESCRIPTION

Hereinafter, detailed embodiments of the present invention will be described in detail with reference to the accompanying drawings. However, the scope of the present disclosure is not limited to proposed embodiments, and other regressive inventions or other embodiments included in the scope of the spirits of the present disclosure may be easily proposed through addition, change, deletion, and the like of other elements.

Figure 1:
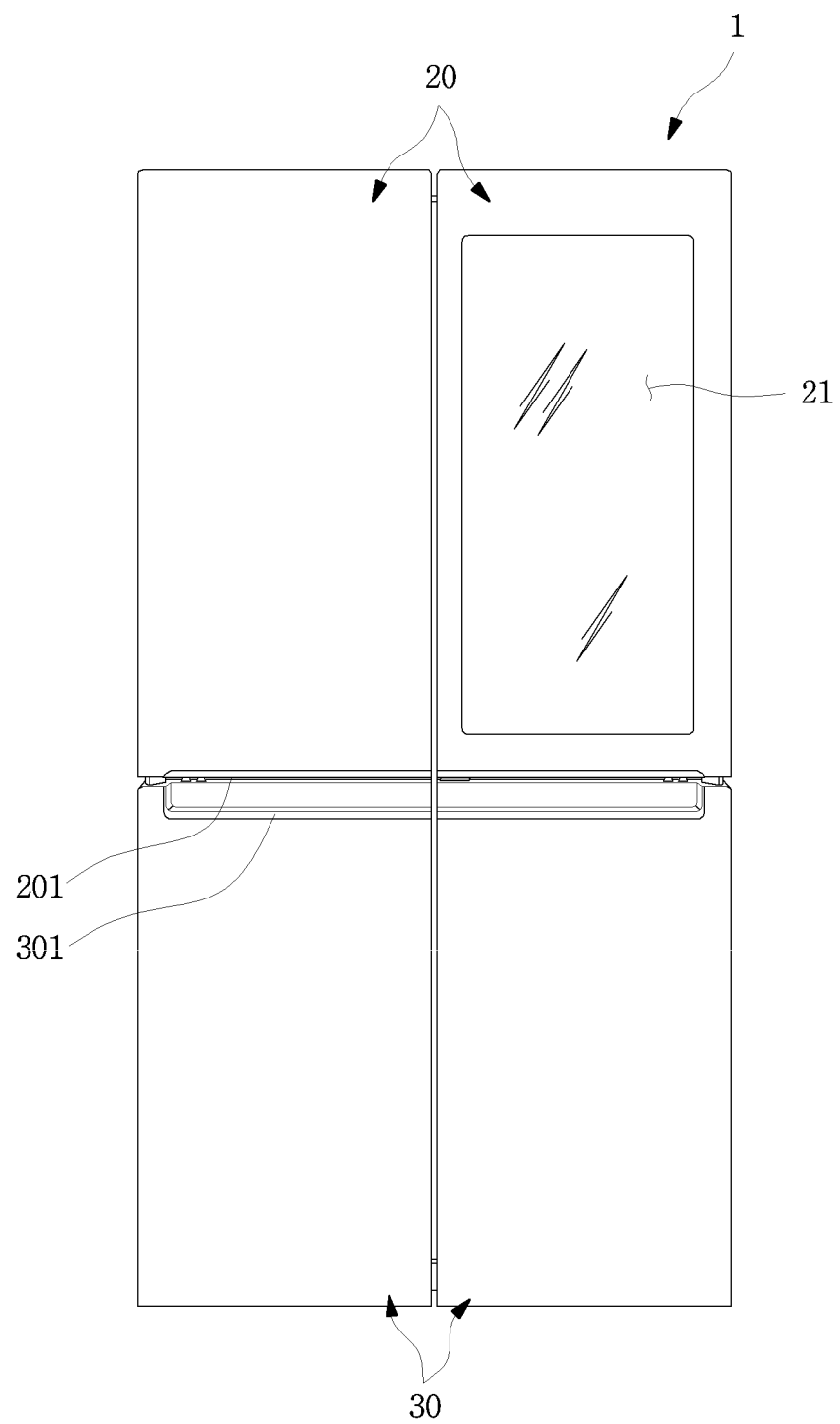
FIG. 1 is a front view of a refrigerator according to a first embodiment of the present invention.

FIG. 1 is a front view of a refrigerator according to a first embodiment of the present invention. Also, FIG. 2 is a perspective view of the refrigerator.

Figure 2:
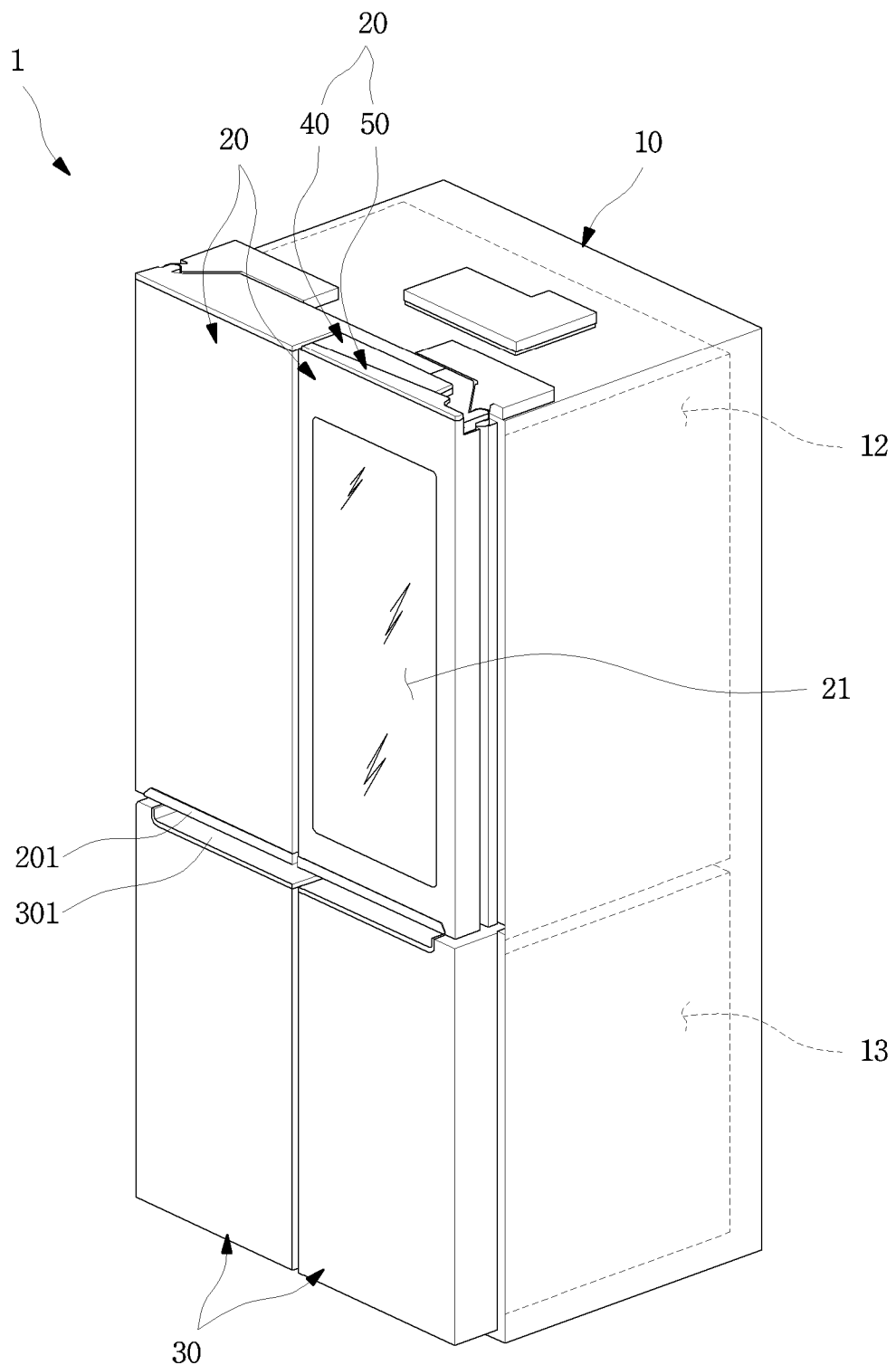
FIG. 2 is a perspective view of the refrigerator.

Referring to FIGS. 1 and 2, a refrigerator 1 according to a first embodiment of the present invention includes a cabinet 10 defining a storage space and a door that opens or closes the storage space. Here, an outer appearance of the refrigerator 1 may be defined by the cabinet 10 and the door.

The inside of the cabinet 10 is partitioned into upper and lower portions by a barrier 11. A refrigerating compartment 12 may be defined in the upper portion of the cabinet 10, and a freezing compartment 13 may be defined in the lower portion of the cabinet 10.

The door may include a refrigerating compartment door and a freezing compartment door 30. The refrigerating compartment door 20 may be opened and closed by rotating an opened front surface of the refrigerating compartment 12, and the freezing compartment door 30 may be switched by rotating an opened front surface of the freezing compartment 13.

Also, the refrigerating compartment door 20 may be provided in a pair of left and right doors. Thus, the refrigerating compartment 12 is covered by the pair of doors. The freezing compartment door 30 may be provided in a pair of left and right doors. Thus, the freezing compartment 13 may be opened and closed by the pair of doors. Alternatively, the freezing compartment door 30 may be withdrawable in a draw type as necessary and provided as one or more doors.

Also, various accommodation members such as shelves, drawers, or baskets may be provided in the refrigerating compartment 12 and the freezing compartment 13. Each of the accommodation members may be accessible as necessary in a state in which the refrigerating compartment door 20 and the freezing compartment door 30 are opened and also may accommodate and store foods through insertion and withdrawal thereof.

Although a refrigerator in which, a French type door in which a pair of doors rotate to open and close one space is applied to a bottom freezer type refrigerator in which the freezing compartment 13 is provided at a lower portion, is described as an example in the first embodiment of the present invention, the present invention may be applied to all types of refrigerators including door without being limited to shapes of the refrigerators.

When viewed from a front side, the refrigerating compartment door 20 and the freezing compartment door 30 may define the overall outer appearance and made of a metal material so that the whole of the refrigerator has a texture of the metal material. Also, as necessary, a dispenser for dispensing water or ice may be provided in one refrigerating compartment door 20 of the pair of refrigerating compartment doors 20.

Also, recessed handle grooves 201 and 301 may be provided in a lower end of the refrigerating compartment door 20 and an upper end of the freezing compartment door 30. A user may insert a his/her hand into the handle groove 201 or 301 to open and close the refrigerating compartment door 20 or the freezing compartment door 30.

At least one door may be provided so that the interior of the refrigerator is visible through the door. For example, as illustrated in FIG. 2, a see-through part 21 that is an area, through which the storage space in the rear surface of the door and/or the inside of the refrigerator are visible, may be provided in the refrigerating compartment door 20. The see-through part 21 may constitute at least a portion of a front surface of the refrigerating compartment door 20. The see-through part 21 may be selectively transparent or opaque according to user's manipulation. Thus, foods accommodated in the refrigerator may be accurately identified through the see-through part 21.

Also, although the structure in which the see-through part 21 is provided in the refrigerating compartment door 20 is described as 1 an example in the first embodiment of the present invention, the see-through part 21 may be provided in different types of refrigerator doors such as the freezing compartment door 30 according to a structure and configuration of the refrigerator.

Figure 3:
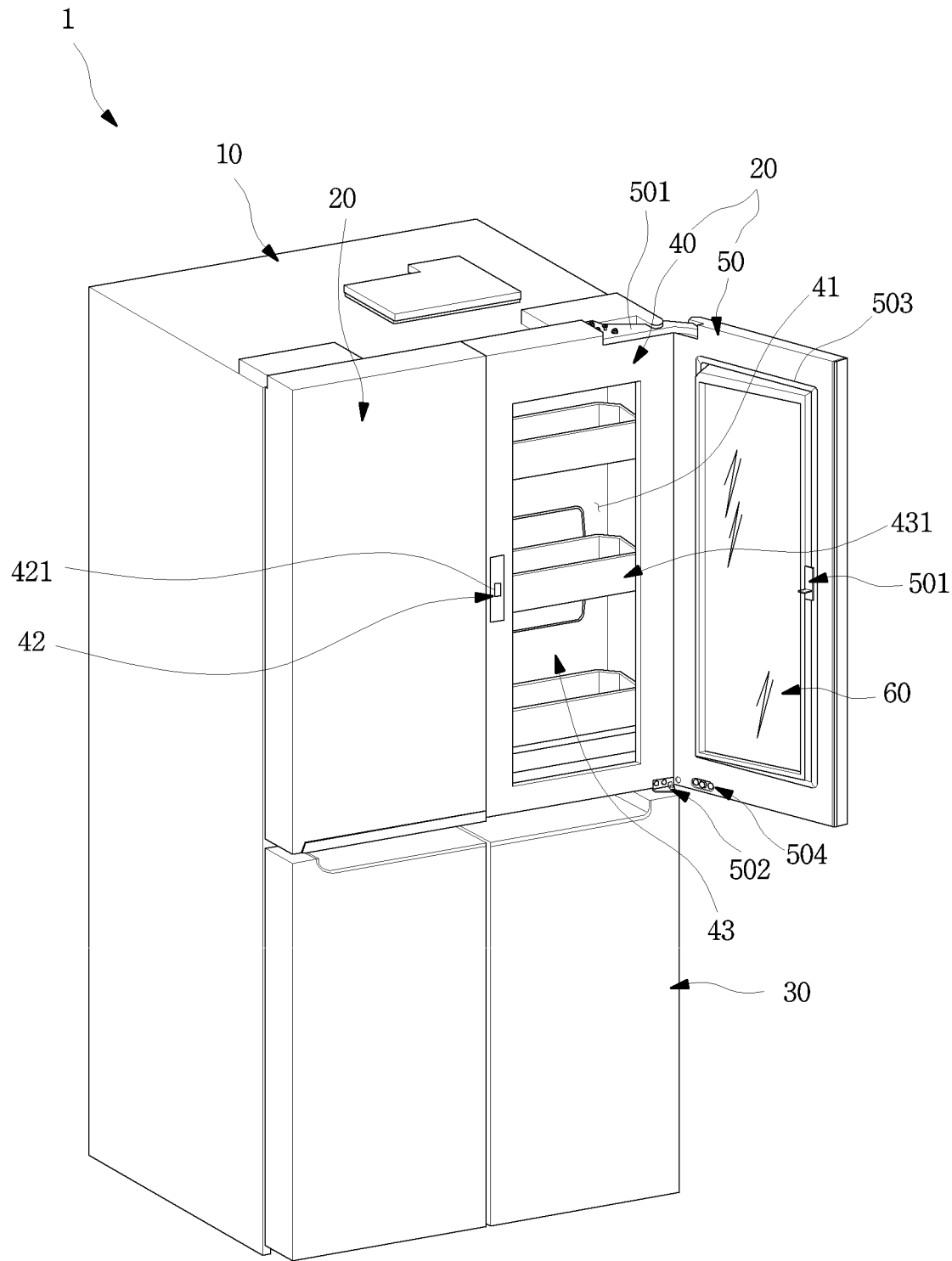
FIG. 3 is a perspective view of the refrigerator with a sub door opened.

FIG. 3 is a perspective view of the refrigerator with a sub door opened. Also, FIG. 4 is a perspective view of the refrigerator with a main door opened.

Figure 4:
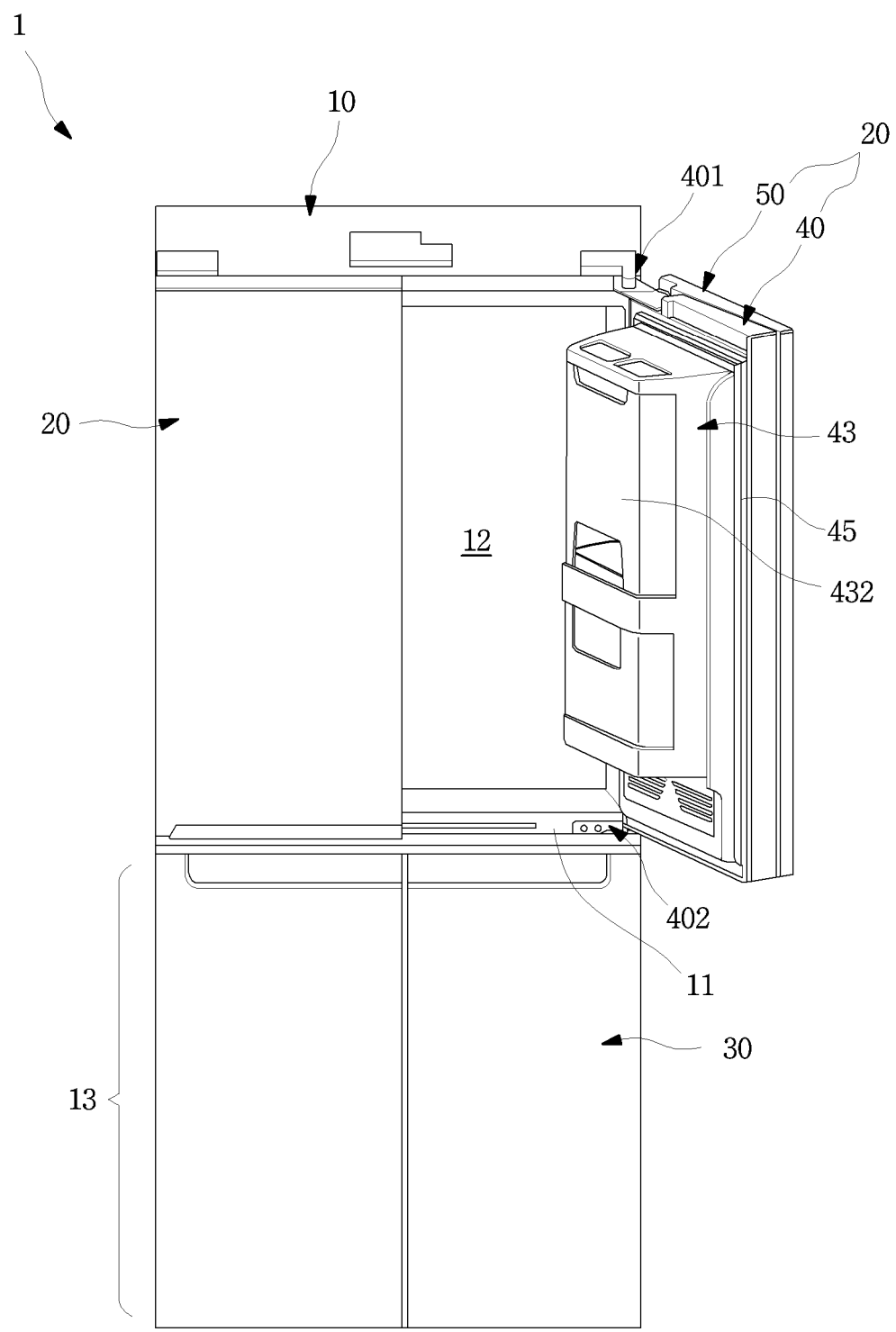
FIG. 4 is a perspective view of the refrigerator with a main door opened.

As illustrated in FIGS. 3 and 4, the refrigerating compartment door 20, which is disposed at the right side (when viewed in FIG. 3), of the pair of refrigerating compartment doors 20 may be doubly opened and closed. In detail, the refrigerating compartment door 20, which is disposed at the right side, may include a main door 40 that opening and closing the refrigerating compartment 12 and a sub door 50 rotatably disposed on the main door 40 to open and close an opening defined in the main door 40.

The main door 40 may have the same size as that of the refrigerating compartment door 20, which is disposed at the left side (when viewed in FIG. 1), of the pair of refrigerating compartment doors 20. The main door 40 may be rotatably mounted on the cabinet 10 by an upper hinge 401 and a lower hinge 402 to open at least a portion of the refrigerating compartment door 12.

Also, an opening 41 that is opened with a predetermined size is defined in the main door 40. A door basket 431 may be mounted on the rear surface of the main door 40 as well as the inside of the opening 41. Here, the opening 41 may have a size that occupies most of the front surface of the main door 40 except for a portion of a circumference of the main door 40.

Also, a main gasket 45 may be disposed on a circumference of the rear surface of the main door 40 to prevent cool air within an internal space of the cabinet 10 from leaking when the main door 40 is opened.

The sub door 50 may be rotatably mounted on the front surface of the main door 40 to open and close the opening 41. Thus, the sub door 50 may be opened to expose the opening 41.

The sub door 50 may have the same size as the main door 40 to cover the entire front surface of the main door 40. Also, when the sub door 50 is closed, the main door 40 and the sub door 50 may be coupled to each other to provide the same size and configuration as those of the left refrigerating compartment door 20. Also, a sub gasket 503 may be disposed on the rear surface of the sub door 50 to seal a gap between the main door 40 and the sub door 50.

A transparent panel assembly 60 that selectively sees the inside and outputs a screen may be disposed at a center of the sub door 50. Thus, even though the sub door 50 is closed, the inside of the opening 41 may be selectively visible, and also an image inside the opening 41 may be outputted. The see-through part 21 may be a portion of the sub door 50, through which the inside of the refrigerator 1 is visible. However, the see-through part 21 may not necessarily match the entirety of the transparent panel assembly 60.

The transparent panel assembly 60 may be configured to be selectively transparent or opaque according to user's manipulation. Thus, only when the user desires, the transparent panel assembly 60 may be transparent so that the interior of the refrigerator 1 is visualized, otherwise, be maintained in the opaque state. Also, the transparent panel assembly 60 may output a screen in the transparent or opaque state.

A sub upper hinge 501 and a sub lower hinge 502 may be respectively provided on upper and lower ends of the sub door 50 so that the sub door 50 is rotatably mounted on the front surface of the main door 40. Thus, the sub door 50 may independently rotate in a state in which the main door 40 is closed to open and close the opening 41.

Also, an opening device 59 may be provided on the sub door 50. A locking unit 42 may be provided on the main door 40 to correspond to the opening device 59. Thus, the sub door 50 may be maintained in the closed state by the coupling between the opening device 59 and the locking unit 42. When the coupling between the opening device 59 and the locking unit 42 is released by manipulation of the opening device 59, the sub door 50 may be opened with respect to the main door 40.

Also, in a state in which the sub door 50 is closed, the state in which the opening device 59 and the locking unit 42 are coupled to each other may be maintained. In this state, when the handle groove 201 is grasped and pulled, the main door 40 may rotate to open the refrigerating compartment 12.

In the sub door 50 is closed, when the user manipulates the opening device 59 of the sub door 50, the opening device 59 and the locking unit 42 may be separated from each other, and thus, only the sub door 50 may rotate. Also, the opening device 42 may be opened by the rotation of the sub door 50.

Also, a damping device 504 may be provided on a lower end of the sub door 50. The damping device 504 may protrude from a rear surface of the sub door 50 and be disposed on an edge portion of each of lower and side ends of the sub door 50 adjacent to the sub lower hinge 502.

In the state in which the sub door 50 is closed, when the opening device 59 is manipulated, the coupling between the opening device 59 and the locking unit 42 may be released, and the sub door 50 may naturally rotate by elastic restoring force of an elastic member supporting the damping device 504.

Also, when the sub door 50 is closed in the opened state, even though the sub door 50 rapidly rotates due to user's carelessness, the damping device 504 may first contact the main door 40 before the sub door 50 and the main door 40 collide with each other. Then, the rotation of the sub door 50 may be decelerated to be buffered while the elastic member is compressed.

An accommodation case 43 may be provided in the rear surface of the main door 40. The accommodation case 43 may define an accommodation space of the rear surface of the main door 40, and a plurality of door baskets 431 may be disposed in the accommodation case 43.

The accommodation case 43 may be accessible through the opening 41. When the sub door 50 is opened, an opened front surface of the accommodation case 43, i.e., the opening 41 may be exposed, and the user may take the foods in or out through the opening 41.

A rear surface of the accommodation case 43 may be exposed when the main door 40 is opened. Also, a case door 432 may be provided to open at least a portion of the rear surface of the accommodation case 43. When the main door 40 is opened, the case door 432 may be opened. Here, the user may take the foods in or out through the opened side of the accommodation case 43.

That is, the accommodation case 43 may be accessible to the sub door 50 or the main door 40 when the sub door 50 or the main door 40 are opened.

Also, an opening may be defined in each of the accommodation case 43 and the case door 432 so that cold air within the refrigerator is introduced into the accommodation case 43. Thus, the inside of the accommodation case 43 may be maintained at the same temperature as that of the inside of the refrigerating compartment 12.

Also, a molded end on which the door basket 431 is mounted may be disposed on the rear surface of the main door 40, more particularly, each of both side surfaces of the opening 41. The molded end may have an uneven structure and be configured so that the door basket 431 is detachable.

Figure 5:
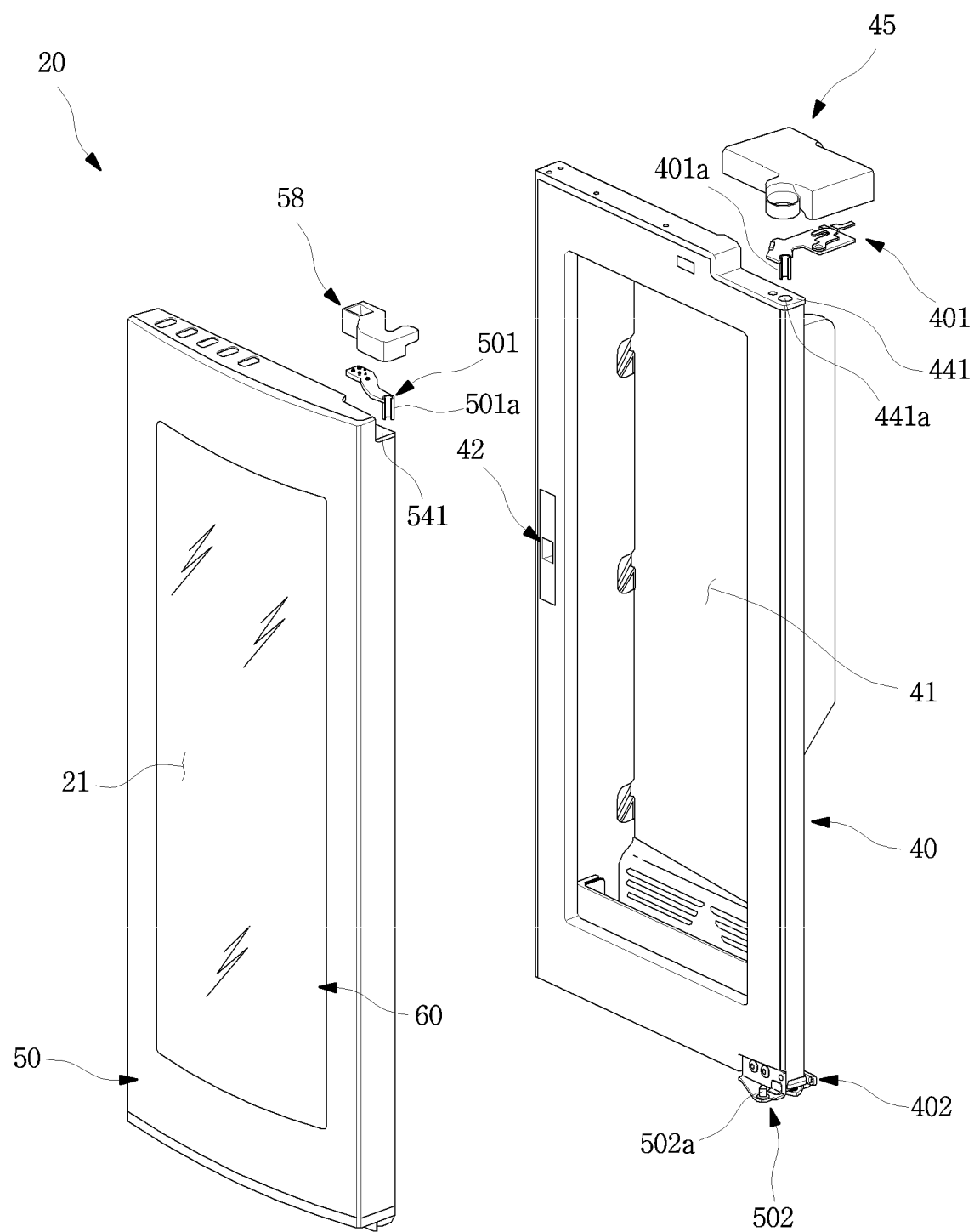
FIG. 5 is an exploded perspective view illustrating a coupling structure of the main door and the sub door.
Figure 6:
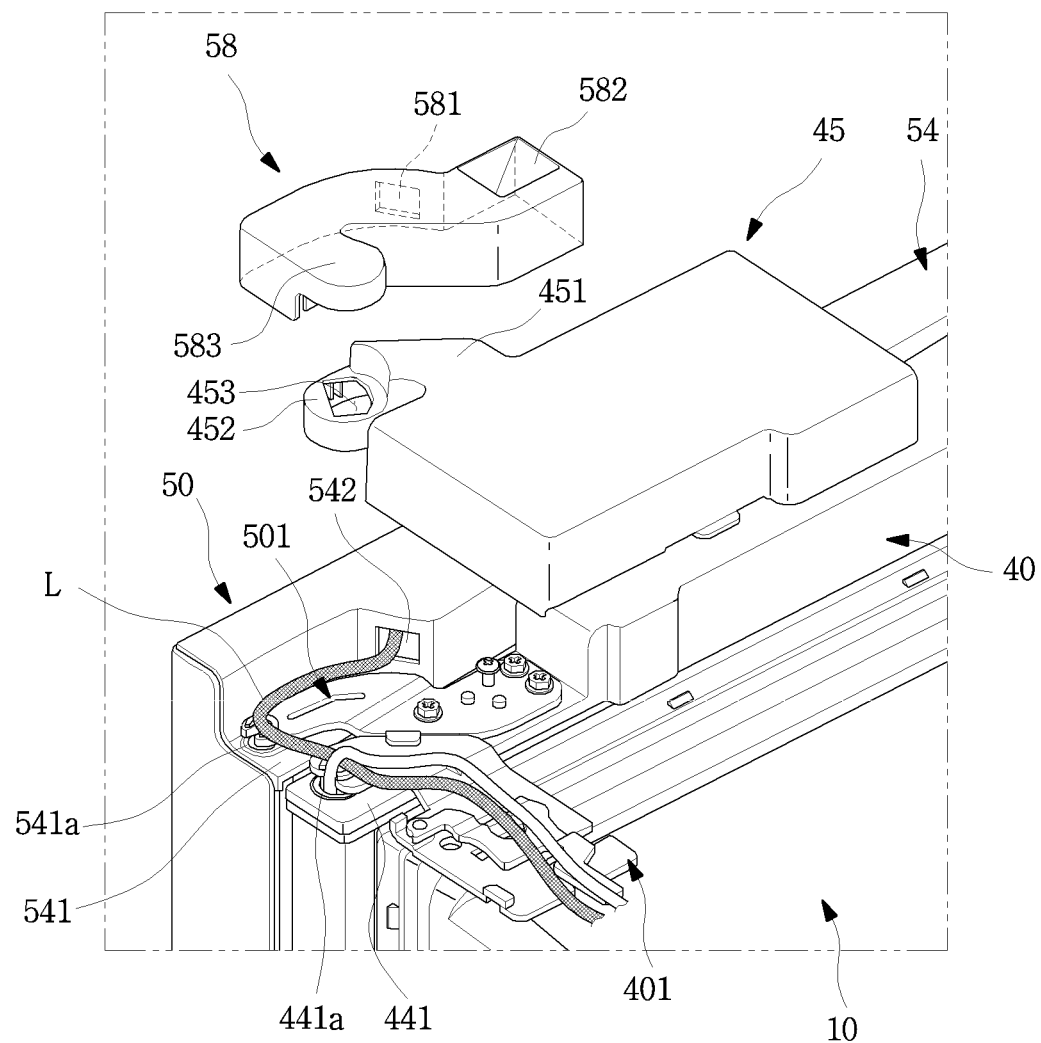
FIG. 6 is a partial perspective view illustrating a hinge-coupled structure of the main door and an upper end of the sub door.
Figure 7:
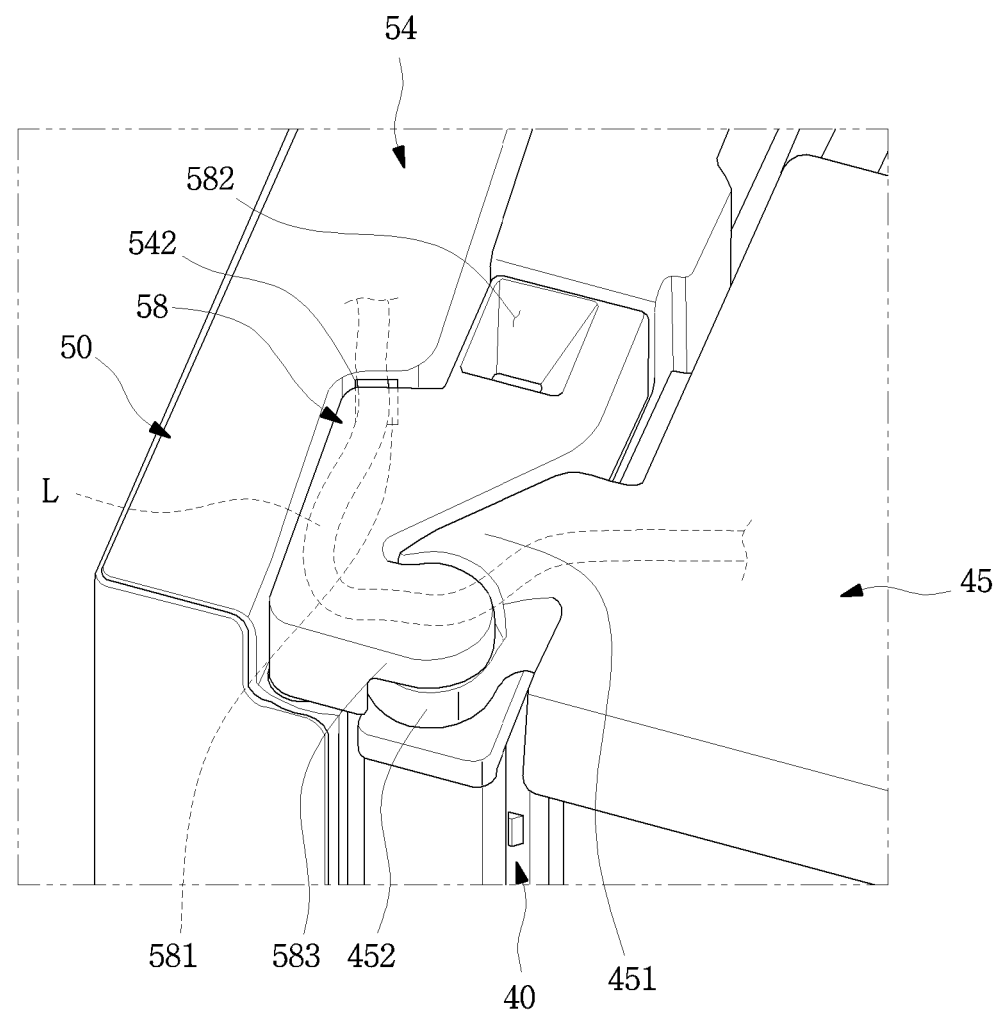
FIG. 7 is a partial perspective view illustrating a state in which a hinge cover is mounted on the main door and the sub door.
Figure 8:
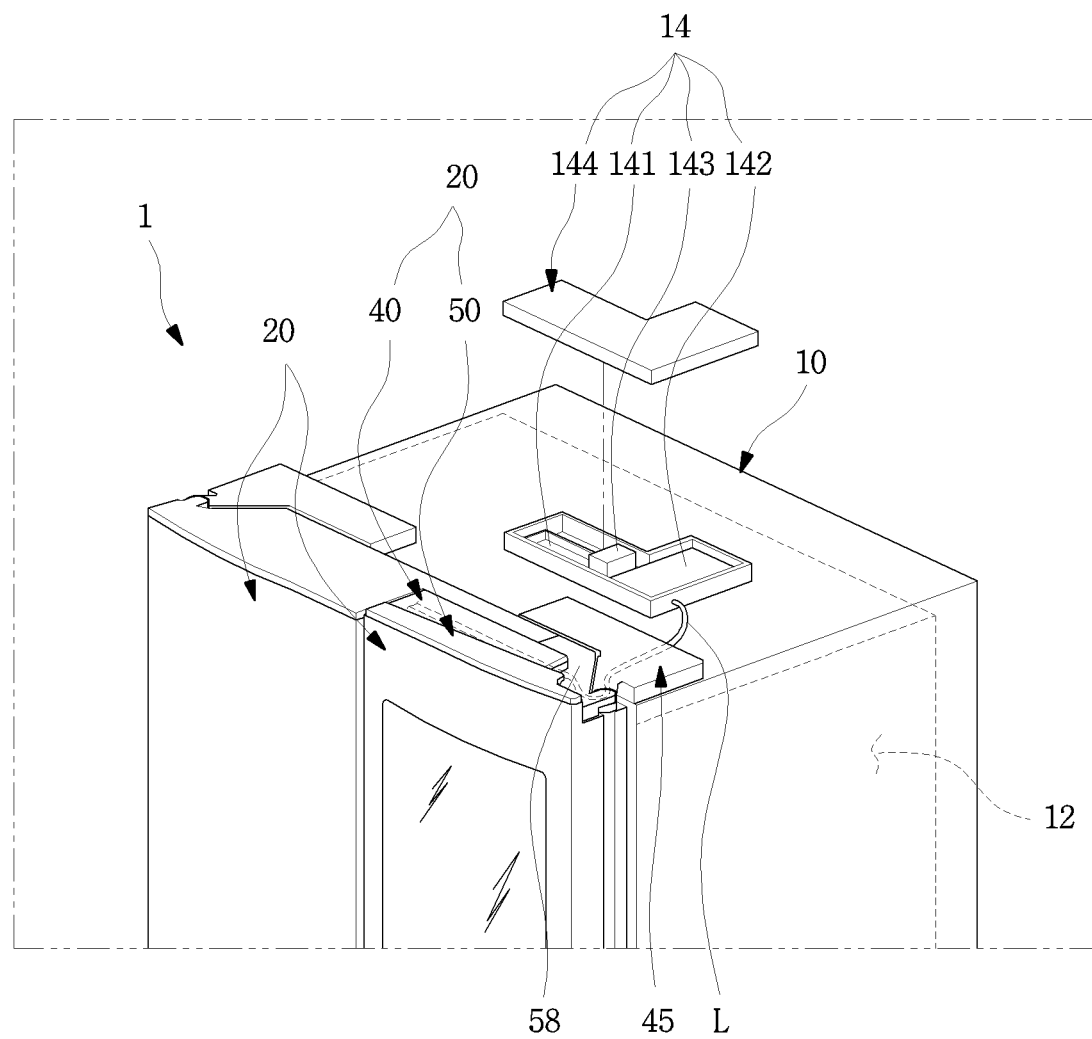
FIG. 8 is a partial perspective view illustrating a top surface of the refrigerator.

FIG. 5 is an exploded perspective view illustrating the coupling structure of the main door and the sub door. Also, FIG. 6 is a partial perspective view illustrating a hinge-coupled structure of the main door and an upper end of the sub door. Also, FIG. 7 is a partial perspective view illustrating a state in which a hinge cover is mounted on the main door and the sub door. Also, FIG. 8 is a partial perspective view illustrating the top surface of the refrigerator.

As illustrated in the drawings, an upper hinge mounting part 441 on which an upper hinge 401 is mounted may be recessed to be defined in an upper end of the main door 40. The upper hinge 401 may be fixed to be mounted on the cabinet 10. Here, a hinge shaft 401*a* may be inserted into a hinge hole 441*a* of the upper hinge mounting part 441 so that the main door 40 is rotatably mounted on the cabinet 10.

Also, a sub upper hinge mounting part 541 on which the sub upper hinge 501 is mounted is recessed in an upper end of the sub door 50. The sub upper hinge 501 may be fixed to be mounted on the upper hinge mounting part 441, and the hinge shaft 501*a* may be inserted into the hinge hole 541*a* of the upper hinge mounting part 541 so that the sub door 50 is rotatably mounted on the main door 40.

The upper hinge 401 and the sub upper hinge 501 may be accommodated inside a main hinge cover 45 and a sub hinge cover 58. The main hinge cover 45 and the sub hinge cover 58 may have a structure connected to each other. A wire L guided to the outside through a wire hole 542 of the sub door 50 may be guided to the main control unit 14 through the inside of the main hinge cover 45 by passing through the inside of the sub hinge cover 58. Thus, the wire L may be guided to the main control unit 14 in a state in which the exposure of the wire L is minimized.

In detail, the wire L within the sub door 50 may be guided to the outside through the wire hole 542 of the rear surface of the upper end of the sub door 50. The wire hole 542 may be defined in a door liner 56 or an upper cap decor 54, which constitutes the sub door 50.

Also, the wire L may be connected to electronic components provided in the sub door 50. For example, the wire L may be connected to the electronic components such as a T-CON board 623, a touch PCB 613, a light PCB 683, and a door light 57, which will be described below, Thus, the number of wires L may increase, and the wire L may increase in volume. As a result, the wire L may be exposed to the outside of the sub door 50 through the wire hole 542. The wires L exposed to the outside may be protected by a separate constitute such as a contraction tube.

A cover hole 581 may be defined in the sub hinge cover 58 corresponding to the wire hole 542. The cover hole 581 may provide a passage through which the wire L exposed through the wire hole 542 is introduced into the sub hinge cover 58. The wire hole 542 and the cover hole 581 may be disposed at positions adjacent to the hinge shaft 501*a* of the sub upper hinge 501 so as to be maintained in the shortest distance even though the sub door 50 is opened and closed. Thus, the exposure of the wire L exposed when the sub door 50 is opened and closed may be minimized.

The main hinge cover 45 may have an opened lower side. Also, a space that is recessed inward may be defined in the main hinge cover 45 to accommodate the whole of the upper hinge 401. The main hinge cover 45 may be fixed and mounted through a structure matching one side of the cabinet 10 or a structure that is coupled by a separate coupling member. Also, a portion of the main hinge cover 45 extends to the upper hinge mounting part 441 of the main door 40.

An extension part 451 extending in a direction of a rotation axis of the upper hinge 401 may be further provided at one side of the main hinge cover 45. Also, a main connection part 452 may be disposed on an end of the extension part 451. The main connection part 452 may be stepped downward from the end of the extension part 451. Also, the main connection part 452 may have a circular shape. A center of the main connection part 452 may be disposed in the same extension line as the hinge shaft 501*a* of the upper hinge 401. Also, a connection part hole 453 may be opened in a top surface of the main connection part 452 so that the wire L is accessible.

The sub hinge cover 58 may have an opened lower side. Also, a space that is recessed inward may be defined in the main hinge cover 45 to accommodate the whole of the sub upper hinge 501. The sub hinge cover 58 may be fixed and mounted on the upper hinge mounting part 441. Also, a portion of the sub hinge cover 58 may extend to the sub upper hinge mounting part 541 to cover the sub upper hinge 501.

A cover fixing part 582 that is recessed downward may be provided at one side of the sub upper hinge 501, and a coupling member such as a screw may pass through the cover fixing part 582 and then be coupled to the sub upper hinge mounting part 541 to fix the sub hinge cover 58.

The sub hinge cover 58 may have a shape corresponding to a space between the sub upper hinge mounting part 541 and the main hinge cover 45 in the state in which the sub door 50 is closed to prevent the sub door 50 and the main door 40 from interfering with each other when the sub door 50 and the main door 40 are opened and closed.

Also, a sub connection part 583 is disposed at one side of the sub hinge cover 58. The sub connection part 583 may extend to the main door 40 and be seated on the top surface of the main connection part 452. Here, the sub connection part 583 may have an opened bottom surface. The inside of the sub connection part 583 may communicate with the inside of the main connection part 452 by the connection hole 453. The sub connection part 583 may have a circular cross-section like the main connection part 452 and be disposed in the same extension line as a center of the rotation shaft of the upper hinge 401.

That is, the center of the rotation shaft of the upper hinge 401 and the center of each of the main connection part 452 and the sub connection part 583 may be concentric to each other. Thus, in a state in which the main door 40 and the sub door 50 rotate, the rotation shaft of the upper hinge 40, and the main connection part 452, and the sub connection part 583 may stably rotate without moving. Also, in the state in which the main door 40 or the sub door 50 rotate, the wire L guided through the sub hinge cover 58 may successively pass through the sub connection part 583 and the main connection part 452 and then be guided to the inside of the main hinge 45.

Here, when the electronic components such a heater are provided in the main door 40, the other wire L passing through the rotation shaft of the upper hinge 401 may be introduced. Here, the other wire L together with the wire L introduced into the sub door 50 may be connected to the main control unit 14 through the main hinge cover 45.

Also, the wire L may be guided from the inside of the main hinge cover 45 to the inside of the cabinet 10 to extend along the inside of the cabinet 10 and then to be connected to the main control unit 14.

A main control unit 14 may be disposed on the top surface of the cabinet 10. The main control unit 14 may control an overall operation of the refrigerator 1 and be connected to the wires L guided to the outside through the sub door 50. The main control unit 14 may protrude from a central portion of the top surface of the cabinet 10 and be disposed between the pair of main hinge covers 45.

The wire L guided to the outside through the sub door 50 sequentially passes through the sub hinge cover 58 and the main hinge cover 45. The wire L guided to the top surface of the cabinet 10 through the main hinge cover 45 may be guided toward the main control unit 14 and then be connected to the main control unit 14. Thus, the main control unit 14 may be connected to the electronic components inside the sub door 50 to receive operation information of the electronic components and also control the electronic components as necessary.

In detail, the main control unit 14 may include a main PCB 141 controlling an overall operation of the refrigerator and a display PCB 142 controlling an operation of the transparent panel assembly 60. The display PCB 142 may be configured to control an operation of the transparent panel assembly 60 and also control the screen outputted through the transparent panel assembly 60. Particularly, the display PCB 142 may have a function of outputting a moving picture and an Internet screen through the transparent panel assembly 60 and also a function for connection with an external device and a function for communication with the transparent panel assembly 60.

The display PCB 142 may be a portion of the constituents for controlling the operation of the transparent panel assembly 60. That is, the constituents for controlling the transparent panel assembly 60 may be divided into a plurality of constituents. At least a portion of the plurality of constituents may be disposed in the main control unit 14 to minimize a size and kind of the PCBs 601 disposed inside the sub door 50. For this, the PCBs for controlling the transparent panel assembly 60 may be divided for a function or size. Here, the relatively large constituents or the constituents that are easily disposed at a remote distance through the wires may be disposed in the main control unit.

The adaptor 143 for converting power supplied to the transparent panel assembly 60 may be further disposed on the main control unit 14. DC power may be converted into AC power that is suitable for driving the transparent panel assembly 60 by the adaptor 143. Also, since the adaptor 143 has a relatively large size and generate large amount of heat, it may be efficient when the adaptor 143 is disposed in the main control unit 14 rather than the sub door 50. As necessary, other PCBs disposed in the sub door 50 may be further disposed in the main control unit 14.

Also, the PCBs disposed in the main control unit 14 may be disposed in spaces that are partitioned from each other. Thus, the PCBs may be disposed to be selectively combined according to specification of the refrigerator 1.

At least a portion of the main control unit 14 may include a control unit cover that is openable. Thus, the main control unit 14 may be easily connected to the wires L disposed in the sub door 50. Also, the control unit cover 144 may be opened and closed to easily perform service operations for the main control unit 14 and the constituents connected to the main control unit 14.

A lower hinge 402 supporting a lower end of the main door 40 is mounted on one side of a front surface of the cabinet 10. Also, a sub lower hinge 502 supporting the sub door 50 is mounted on a lower end of the main door 40.

Figure 9:
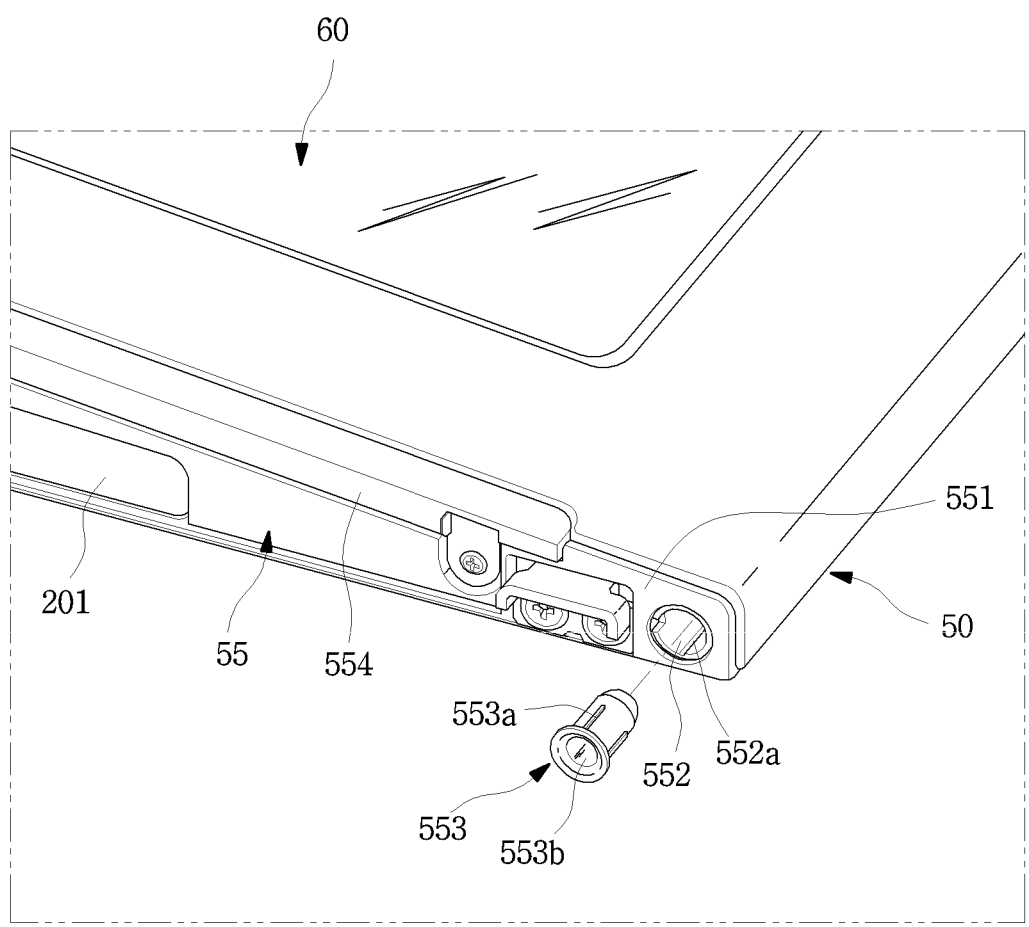
FIG. 9 is a partial perspective view illustrating a hinge-coupled structure of a lower end of the main door.

FIG. 9 is a partial perspective view illustrating a hinge-coupled structure of a lower end of the main door.

As illustrated in the drawing, the lower hinge 402 may be mounted on the front surface of the cabinet 10 so that the main door 40 is rotatably supported. The lower hinge 402 may be fixed and mounted on the front surface of the cabinet 10 so that the lower end of the main door 40 is rotatably supported. Thus, the main door 40 may rotate with respect to the center of a rotation shaft 402a of the lower hinge 402.

Also, the sub lower hinge 502 may be disposed at a front side of the lower hinge 402 and fixed and mounted on the lower end of the main door 40. The sub lower hinge 502 may be mounted on a sub lower hinge mounting part 551 that is recessed in the lower end of the front surface of the main door 40.

The lower end of the sub door 50 may be supported by the sub door hinge 502 to rotate with respect to the hinge shaft 501a. A sub lower cap decor 55 may be disposed on the lower end of the sub door 50. The sub lower cap decor 55 may define the bottom surface of the sub door 50, and a decor member 554 may be coupled to a lower end of the front surface of the lower cap decor 55. The decor member 554 may be a constituent for decoration such as chrome plating.

Also, the decor member 554 may be disposed on the lower end of the sub door 50, in which the handle groove 201 is disposed, and user's eyes are drawn. The decor member 554 may be made of a plastic material that is surface-treated, like the chrome plating. Also, the decor member 554 may be disposed at a position in which the handle groove 201 is defined. Thus, an appearance of the handle groove 201 may be enhanced, and the handle groove 201 may increase in discrimination. The decor member 554 may also be disposed on an upper end of the freezing compartment door 30 in addition to the lower end of the refrigerating compartment door 20.

A shaft mounting part 552 on which the rotation shaft 502a of the sub lower hinge 502 is mounted may be recessed in one end of the sub lower cap decor 55. A lower boss 553 may be provided on the shaft mounting part 552. The lower boss 553 may have a rotation shaft hole 553b into which the rotation shaft 502a is inserted and have a cylindrical shape or a cylindrical shape having a closed top surface. Also, the lower boss 553 may be made of an engineering plastic material having excellent strength and abrasion resistance.

Since the heavy transparent panel assembly 60 is disposed on the sub door 50, the whole sub door 50 may increase in weight. Thus, the shaft mounting part 552 may have a sufficient thick thickness to stably support the sub door 50 and prevent the sub door 50 from being damaged while rotating.

Also, a mounting part groove 552a may be defined in the shaft mounting part 552, and a boss protrusion 553a may be disposed on the lower boss 553. In detail, the mounting part groove 552a extending in a vertical direction may be defined in an inner surface of the shaft mounting part 552. The mounting part groove 552a may be provided in plurality at predetermined intervals along a circumference of the inner surface of the shaft mounting part 552. Thus, a load applied to the shaft mounting part 552 may be dispersed to prevent the shaft mounting part 552 from being damaged.

Also, the plurality of boss protrusions 553a may be disposed on an outer surface of the lower boss 553. The boss protrusions 553a may be provided at positions and in number corresponding to the mounting part grooves 552a. When the lower boss 553 is mounted, the boss protrusions 553a and the mounting part grooves 552a may be coupled to each other. Thus, the lower boss 553 may also be reinforces and prevented from being damaged.

Figure 10:
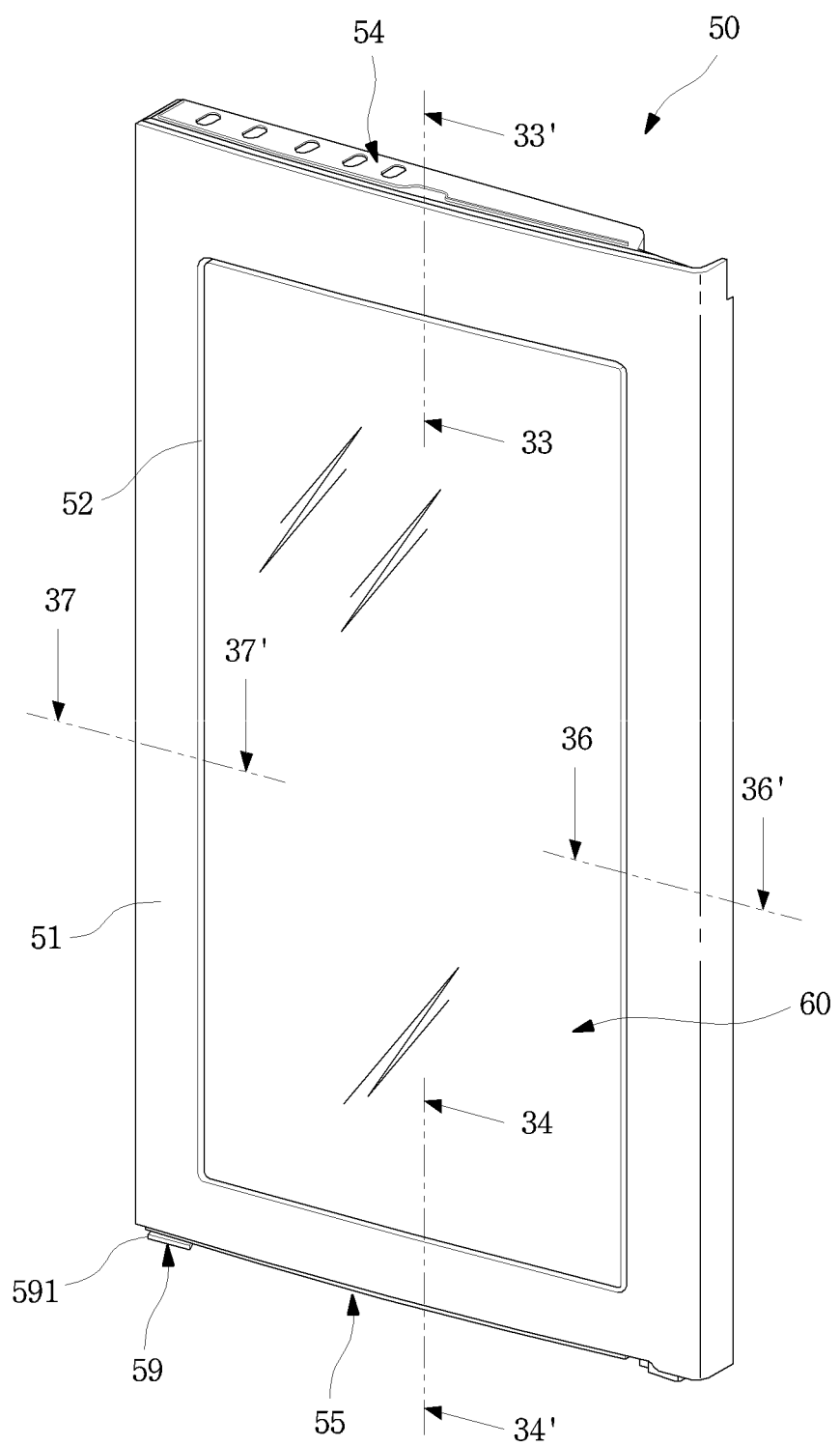
FIG. 10 is a perspective view of the sub door when viewed from a front side.
Figure 11:
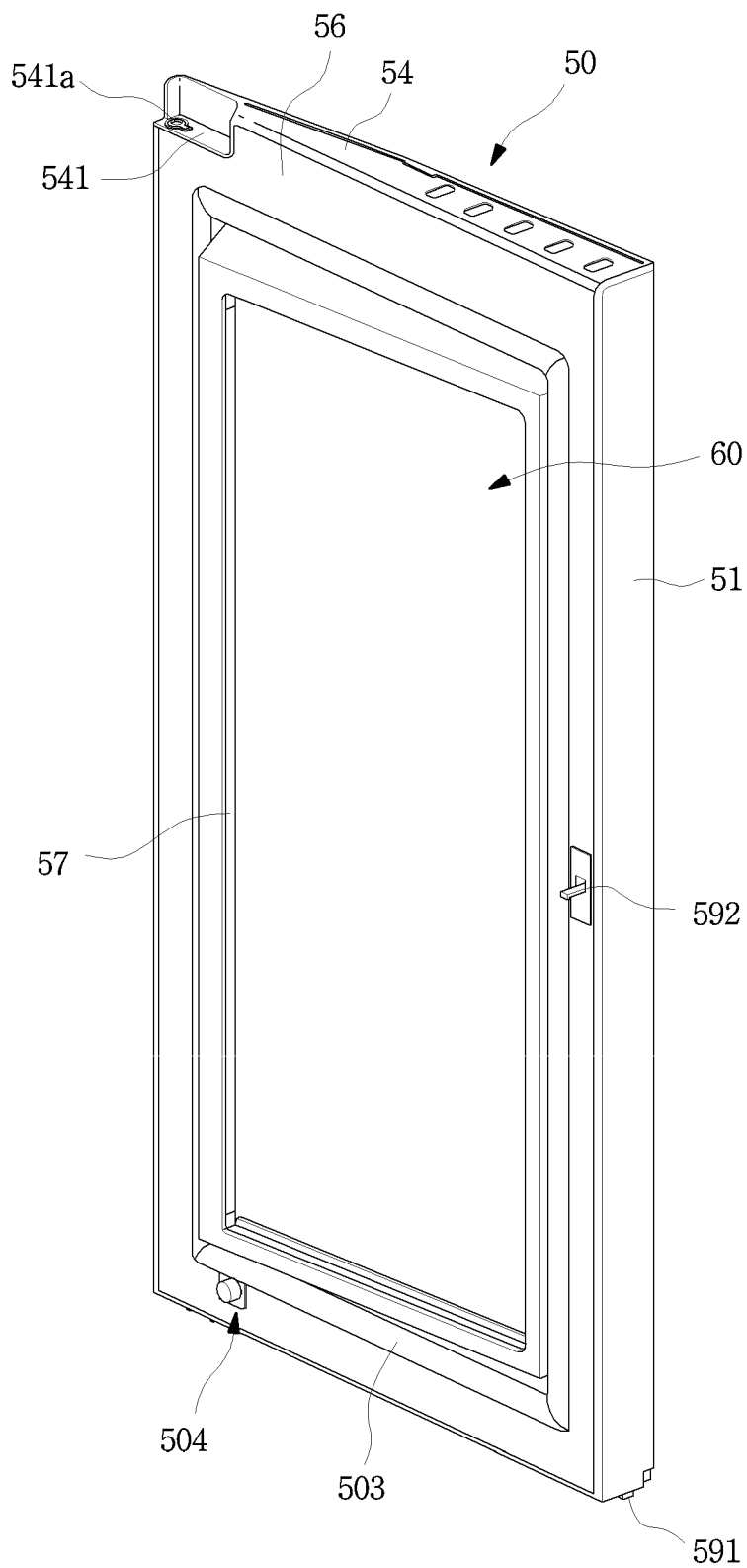
FIG. 11 is a perspective view of the sub door when viewed from a rear side.
Figure 12:
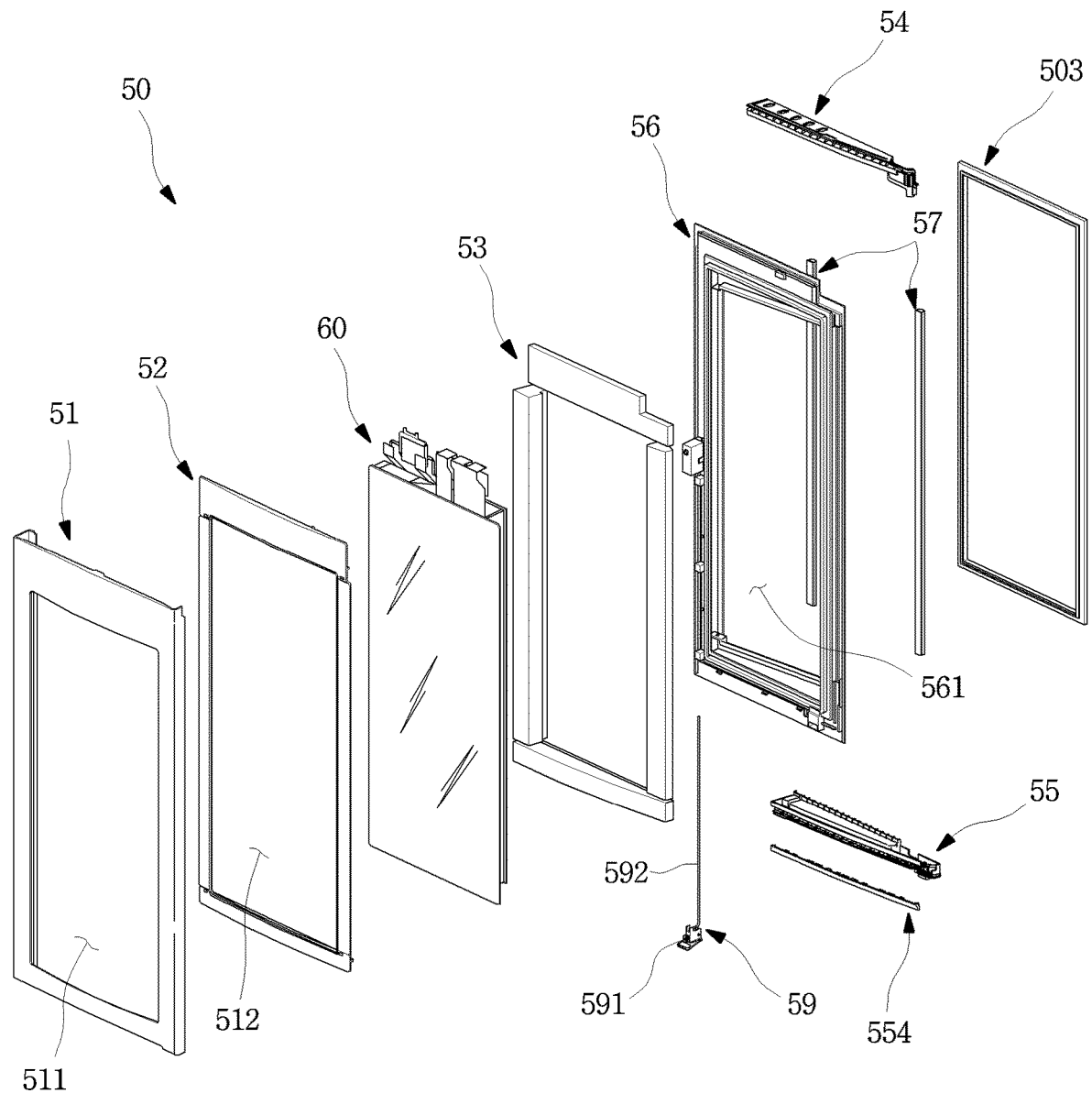
FIG. 12 is an exploded perspective view of the sub door.

FIG. 10 is a perspective view of the sub door when viewed from the front side. FIG. 11 is a perspective view of the sub door when viewed from the rear side. FIG. 12 is an exploded perspective view of the sub door.

As illustrated in the drawings, the sub door 50 may include an out plate 51 defining an outer appearance of the sub door 50, a door liner 56 mounted to be spaced apart from the out plate 51, the transparent panel assembly 60 mounted on an opening of the out plate 51 and the door liner 56, and upper and lower cap decors 54 and 55 defining the top and bottom surfaces of the sub door 50. The above-described constituents may be coupled to define the whole outer appearance of the sub door 50.

The out plate 51 may constitute an outer appearance of the front surface of the sub door 50 and a portion of a peripheral surface of the sub door 50 and be made of a stainless steel material. Also, a plate opening 511 in which the transparent panel assembly 60 is disposed may be defined in a center of the out plate 51. The plate opening 511 may be a space through which the inside of the opening 411 of the main door 40 is visible and have a size that is equal or similar to that of the opening 41.

The door liner 56 defines the rear surface of the sub door 50 and has a door liner opening 561 in the area on which the transparent panel assembly 60 is disposed. Also, a sub gasket 503 for sealing a gap between the sub door 50 and the main door 40 may be mounted on the rear surface of the door liner 56.

Also, a door light 57 may be provided on each of both sides of the door liner opening 561. The door light 57 may illuminate the rear surface of the sub door 50 and a rear side of the transparent panel assembly 60.

Thus, the door light 57 may illuminate an inner space of the accommodation case 43, and simultaneously, serve as an auxiliary backlight function of the transparent panel assembly 60 to more clearly output a screen of the transparent panel assembly 60. When the door light 57 is turned on, the inside of the accommodation case 43 may be brightened up, and thus, the inside of the refrigerator 1 may be more brightened up than the outside of the refrigerator 1 so that the inside of the refrigerator 1 may be visualized through the transparent panel assembly 60.

The door light 57 may be disposed on both sides of the transparent panel assembly 60 in directions facing each other. The mounted position of the door light 57 may variously vary as long as the door light 57 has sufficient brightness at the rear side of the sub door.

Also, the opening device 59 and the damping device 504 may be mounted on the door liner 56.

The upper cap decor 54 may define a top surface of the sub door 50 and be coupled to upper ends of the out plate 51 and the door liner 56. Also, a sub upper hinge mounting part 541 may be disposed on one end of the upper cap decor 54, and a hinge hole 541a into which a hinge shaft 401a of the upper hinge 401 is inserted may be defined in the sub upper hinge mounting part 541.

The lower cap decor 55 may define a bottom surface of the sub door 50 and be coupled to lower ends of the out plate 51 and the door liner 56.

The transparent panel assembly 60 may be disposed between the out plate 51 and the door liner 56. Also, the transparent panel assembly 60 may be configured to cover the plate opening 511 and the door liner opening 561. Also, the transparent panel assembly 60 may be selectively manipulated to one state of transparent, translucent, opaque, and screen output states by the user.

Thus, the user may selectively see through the inner space of the sub door 50 through the transparent panel assembly 60 and see the screen outputted through the transparent panel assembly 60.

The inner frame 52 is mounted between the out plate 51 and the transparent panel assembly 60. The transparent panel assembly 60 may be fixed to and mounted on the out plate 51 by the inner frame 52. A frame opening 521 may be defined in a center of the inner frame 52. The frame opening 521 may have a size and shape corresponding to those of the plate opening 511. Also, the inner frame 52 may have a coupling structure with the out plate 51. Here, the out plate 51 and the transparent panel assembly 60 may be sealed therebetween with respect to each other.

The insulation member 53 may be mounted on the out plate 51 in the state in which the inner frame 52 and the transparent panel assembly 60 are mounted. The insulation member 53 may be configured to insulate the sub door 50 and thus insulate the circumference of the transparent panel assembly 60.

In general, although the door of the refrigerator has a structure in which a foaming solution is injected to foam the insulation material, when the foaming solution is filled to foam the insulation material in the same manner as that according to the first embodiment of the present invention, the electronic components within the sub door 50 may be damaged by high-temperature heat. Particularly, the transparent panel assembly may be damaged by high-temperature heat and static electricity when being foamed. Thus, the sub door 50 according to the first embodiment of the present invention has a structure in which the insulation member 53 that is previously molded is assembled and mounted on the sub door 50.

The insulation member 53 may be molded to match the internal shape of the sub door 50. The previously molded insulation member 53 may be inserted and mounted along the circumference of the transparent panel assembly 60 while the insulation member 53 is assembled with the sub door 50. The insulation member 53 may be foam-molded by using a foamed polystyrene material and may be made of various materials that are inserted into the sub door 50 as necessary.

A space may be defined in a central portion of the insulation member 53. The transparent panel assembly 60 may be disposed in the space defined by mounting the insulation member 53. That is, the insulation member 53 may be configured to support at least a portion of an edge of the transparent panel assembly 60.

The insulation member 53 may have a rectangular frame shape in which the transparent panel assembly 60 is accommodated in a central portion thereof and be seated on the inner frame 52. Also, at least one or more insulation members 53 may be provided to be assembled with the inside of the sub door 50.

Also, the insulation member 53 may have a corresponding shape so as not to interfere with other constituents provided in the sub door 50. As necessary, the insulation members 53 may be assembled through a groove and a hole or a stepped portion so as not to interfere with each other.

Particularly, a predetermined space in which the plurality of electronic components are disposed may be defined in an upper region of the sub door 50, more particularly, above the transparent panel assembly 60. Thus, an upper end of the insulation member 53, which corresponds to the upper region of the sub door 50, may have a somewhat thin thickness to secure the space for locating the electronic component and releasing heat within the sub door 50.

After the insulation member 53 is assembled and mounted, the door liner 56 may be coupled to the out plate 51, and then, the upper cap decor 54 and the lower cap decor 55 may be assembled with each other. Also, the opening device 59 and the damping device 504 may be mounted on the door liner 56. Then, the door light 57 and the sub gasket 503 may be mounted on the door liner 56.

The opening device 59 may include a manipulation lever 591 disposed on the lower door of the sub door 50 and manipulated by the user and a latch 592 protruding from the rear surface of the sub door 50 backward to the main door. The latch 592 may move when the manipulation lever 591 is manipulated and be separated from the locking unit 42.

The locking unit 42 may be disposed on the rear surface of the main door 40 corresponding to the latch 592 and include a latch hole 421 into which the latch 592 is inserted. When the sub door 50 is closed, if the latch 592 is inserted into the latch hole 421, the latch 592 may be restricted within the latch hole 421. Also, when the user manipulates the manipulation lever 591, the latch 592 may move so that the restriction of the latch 592 within the latch hole 421 is released. Thus, the latch 592 may be separated from the latch hole 421.

The opening device 59 and the locking unit 42 may be variously provided to be selectively coupled to each other in addition to the structure according to the first embodiment of the present invention.

Figure 13:
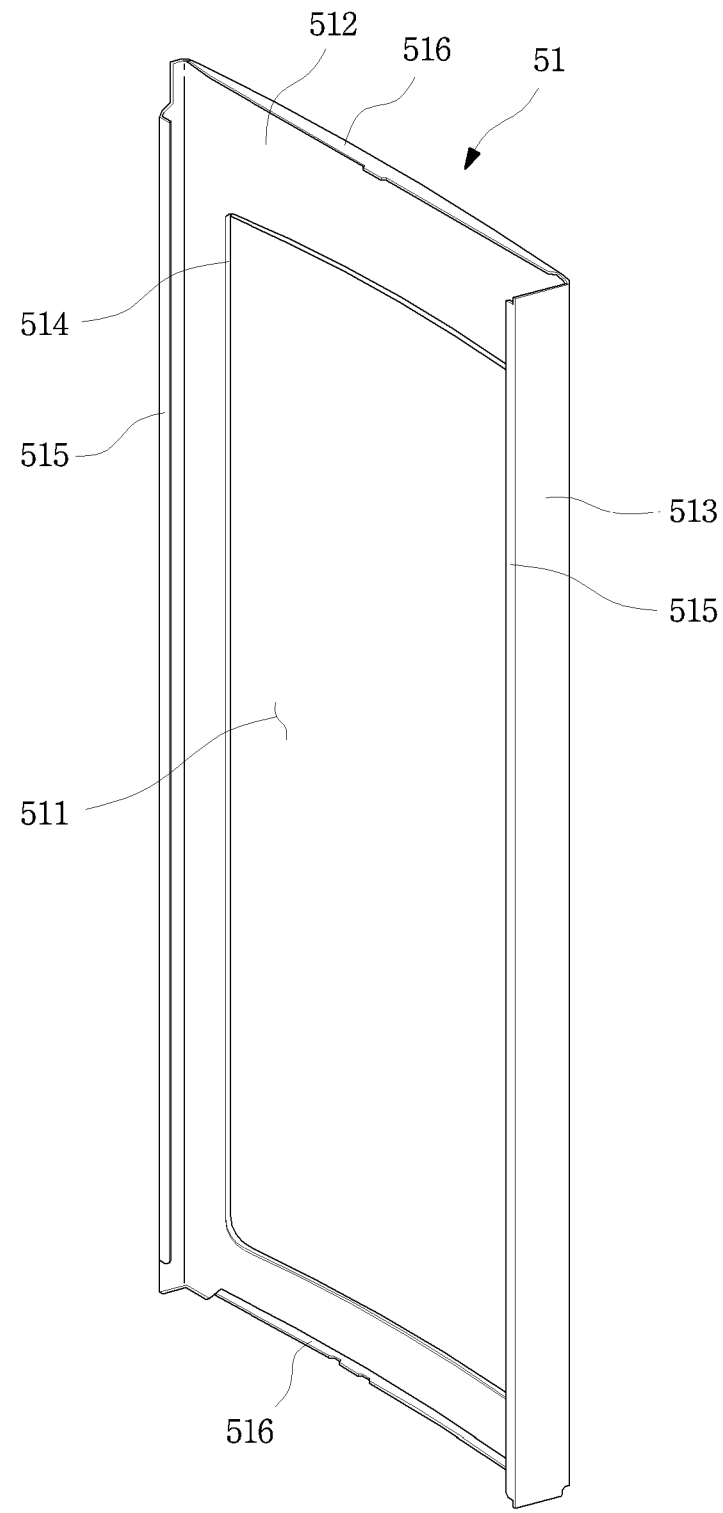
FIG. 13 is a perspective view of an out plate when viewed from the rear side according to a first embodiment of the present invention.

FIG. 13 is a perspective view of the out plate when viewed from the rear side according to the first embodiment of the present invention.

As illustrated in the drawing, the out plate 51 may be made of a plate-shaped metal material and constitute a portion of the outer appearance of the sub door 50 as well as the front surface of the sub door 50. Also, the out plate 51 may be made of the same material of the front surface of each of the refrigerating compartment door 20 and the freezing compartment door 30. Various surface treatments such as coating or film attachment so as to realize anti-fingerprint coating, hair lines, colors, or patterns may be performed on the front surface of the out plate 51.

The out plate 51 may include a front part 512 defining the outer appearance of the front surface and a side part 513 defining an outer appearance of the side surface that is exposed to the outside. Also, a plate opening 511 may be defined at a center of the front part 512. Here, the plate opening 511 may be covered by the transparent panel assembly 60. Also, since the inside of the refrigerator 1 is visible through the transparent panel assembly 60 covering the plate opening 511, the inside of the plate opening 511 is called the see-through part 21.

The front part 512 may have a curvature that gradually decreases outward from a central side of the refrigerator 1 as a whole. The front part 512 may be rounded to correspond to the front surface of the refrigerating compartment door 20, which is adjacent to the front part 512. Thus, the outer appearance of the front surface of the refrigerator 1 may be three-dimensionally viewed as a whole.

Also, an opening bent part 514 that is bent backward may be disposed on a circumferential surface of the plate opening 511. The opening bent part 514 may be disposed along a circumference of the plate opening 511 and extend by a predetermined length so as to be fixed to an inner frame 52. Thus, the plate opening 511 may be defined by the opening bent part 514.

The side part 513 that is bent backward may be disposed on each of both ends of the front part 512. The side part 513 may define an outer appearance of the side surface of the sub door 50 and have different widths on both left and right sides thereof. A side bent part 515 coupled to the door liner 56 may be disposed on each of upper and lower ends of the side part 513.

A bent part 516 may be further disposed on each of upper and lower ends of the out plate 51. The bent part 516 may be coupled to the upper cap decor 54 and the lower cap decor 55. Thus, the out plate 51 may define the outer appearance of the sub door 50 by being coupled to the door liner 56 and the upper and lower cap decors 54 and 55.

Figure 14:
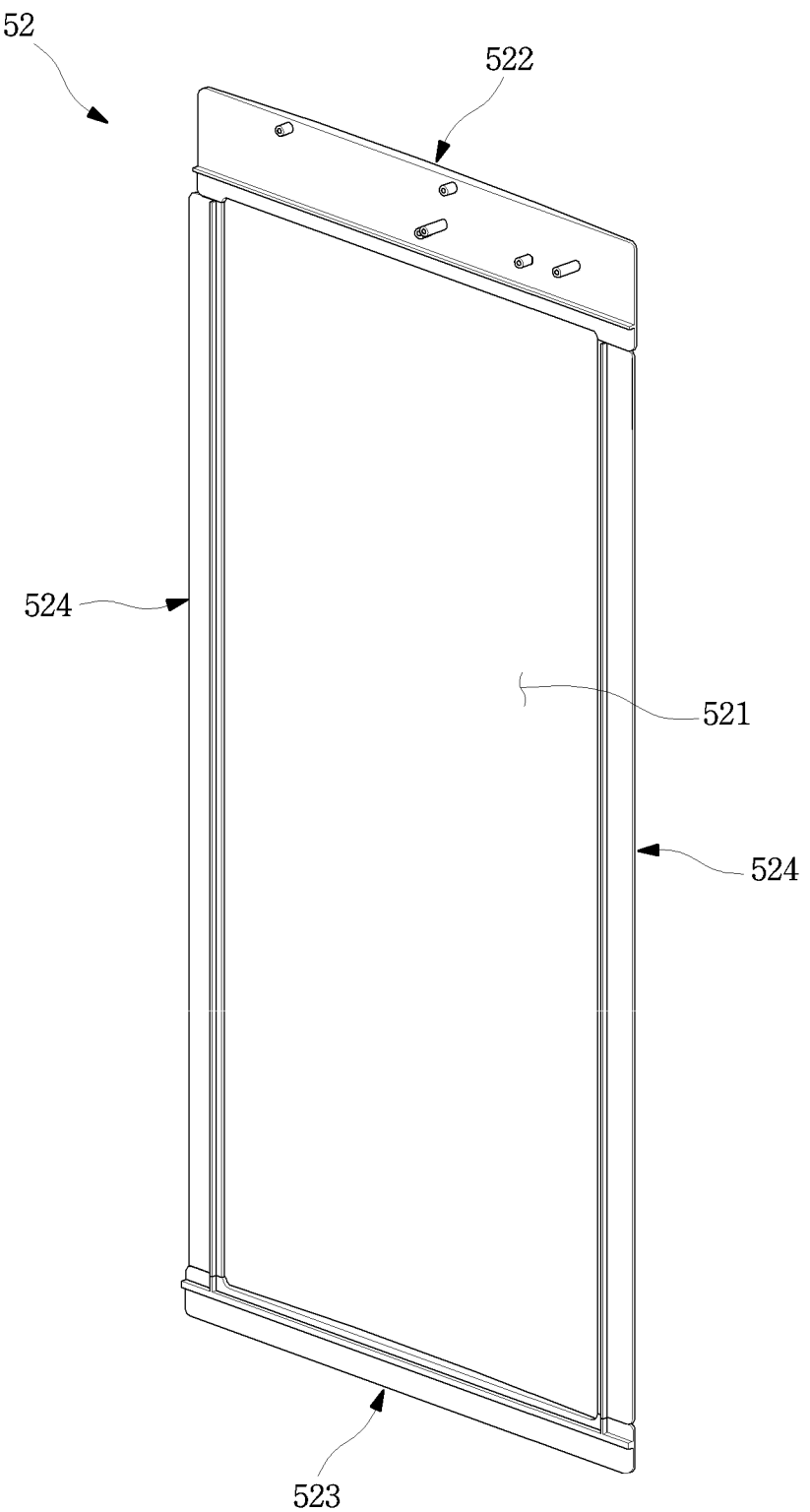
FIG. 14 is a perspective view of an inner frame when viewed from the rear side according to the first embodiment of the present invention.
Figure 15:
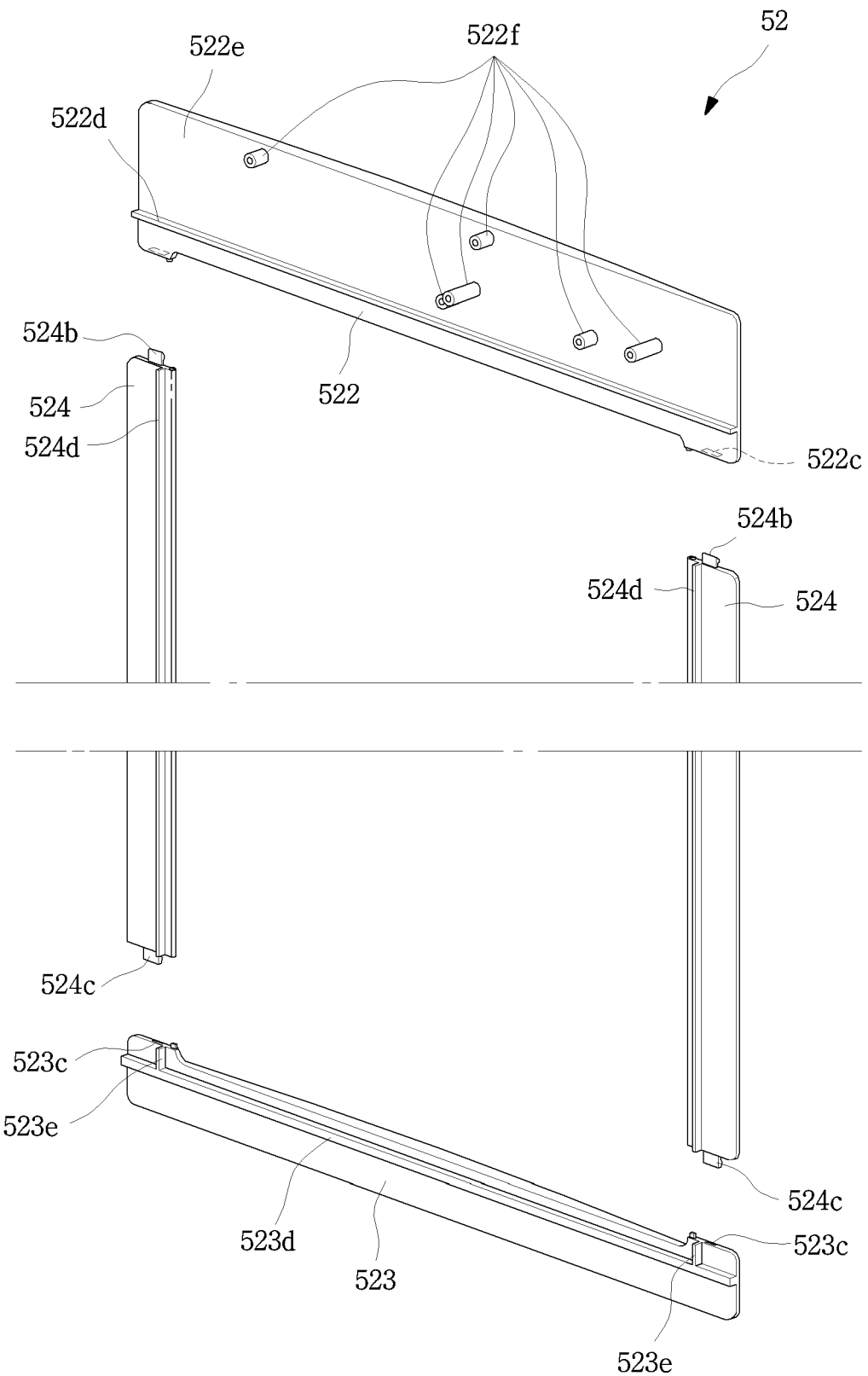
FIG. 15 is an exploded perspective view of the inner frame when viewed from the rear side.

FIG. 14 is a perspective view of the inner frame when viewed from the rear side according to the first embodiment of the present invention. FIG. 15 is an exploded perspective view of the inner frame when viewed from the rear side. FIG. 16 is an exploded perspective view of the inner frame when viewed from the front side.

As illustrated in the drawings, the inner frame 52 has a rectangular frame shape, and the frame opening 521 is defined in the center of the inner frame 52. Also, the inner frame 52 may have a plate shape having a predetermined width so as to easily adhere to the out plate 51 and to be easily coupled to the transparent panel assembly 60.

The inner frame 52 may have a front surface contacting the rear surface of the out plate 51. Here, since an adhesion member or an adhesive such as a double-sided tape is applied to the inner frame 52, the inner frame 52 may be attached and fixed to the out plate 51. Also, the transparent panel assembly 60 may be fixed and mounted on the rear surface of the inner frame 52. Thus, the transparent panel assembly 60 may be fixed inside the sub door 50 by the inner frame 52.

Also, the inner frame 52 may include an upper frame 522, a lower frame 523, and a pair of side frames respectively disposed both ends of the upper and lower frames 522 and 523 to connect both the ends of each of the upper and lower frames 522 and 523 to each other The upper frame 522, the lower frame 523, and the side frames 524 may be coupled to each other to form the same shape as a rectangular frame. Here, the frame opening 521 is defined in a center of the rectangular frame shape.

In more detail, the upper frame 522 may define an upper portion of the inner frame 52, and a bottom surface of the upper frame 522 may be closely attached to the upper portion of the out plate 51.

An upper accommodation groove 522a into which an upper end of the opening bent part 514 is inserted may be defined in a lower end of the upper frame 522. The upper accommodation groove 522a may be recessed at a position corresponding to the upper end of the opening bent part 514, which defines the plate opening 511.

Also, an upper coupling groove 522b may be defined in each of both sides of the upper accommodation groove 522a. An upper side protrusion 524b that will be described below may be hooked with and restricted by the upper coupling groove 522b. For this, an upper insertion groove 522c into which the upper side protrusion 524b is inserted may be defined in each of both sides of the lower end of the upper frame 522, and the upper insertion groove 522c and the upper coupling groove 522b may communicate with each other.

Thus, the upper side protrusion 524b having a hook shape may be inserted into the upper insertion groove 522c and then be restricted by the upper coupling groove 522b. Since the upper side protrusion 524b and the upper coupling groove 522b are coupled to each other, the coupled state between the upper fame 522 and the side frame 524 may be maintained.

An upper rib 522d for supporting the upper end of the front surface of the transparent panel assembly 60 may be disposed on the rear surface of the upper frame 522. The upper rib 522d extends from one end to the other end of the upper frame 522 to protrude backward.

Also, a PCB mounting part 522e on which a plurality of PCBs for driving the transparent panel assembly 60 are mounted may be disposed on the upper portion of the upper frame 522 with respect to the upper rib 522d.

The PCB mounting part 522e may be a portion on which at least one or more PCBs 601 of the PCBs 601 for driving the transparent panel assembly 26 and thus may be disposed at a portion corresponding to the upper end of the sub door 50.

The PCB mounting part 522e may be disposed on the upper portion of the rear surface of the upper frame 522, and a plurality of PCB supports 522f may be disposed on the PCB mounting part 522e. The PCB supports 522f may extend backward from the PCB mounting part 522e, and the PCBs 601 may be disposed at positions that are spaced apart from the rear surface of the upper frame 522 by the PCB supports 522f.

That is, the PCBs 601 may be disposed in an upper space of the sub door, i.e., a space between the out plate 51 and the upper frame 522. Thus, the PCBs 601 may be easily cooled by external air introduced through the upper cap decor 54 when heat is generated in the PCBs 601. The location and cooling structure of each of the PCBs 601 will be described below in more detail.

The lower frame 523 may define a lower portion of the inner frame 52, and a front surface of the lower frame 523 may be closely attached to the lower portion of the out plate 51.

A lower accommodation groove into which a lower end of the bent part of the out plate 51 is inserted may be defined in the upper end of the lower frame 523. The lower accommodation groove 523a may be recessed at a position corresponding to the upper end of the opening bent part 514, which defines the plate opening 511.

Also, a lower coupling groove 523b may be defined in each of both sides of the lower accommodation groove 523a. A lower side protrusion 524c that will be described below may be hooked with and restricted by the lower coupling groove 523b. For this, a lower insertion groove 523c into which the lower side protrusion 524c is inserted may be defined in each of both sides of the lower end of the lower frame 523, and the lower insertion groove 523c and the lower coupling groove 523b may communicate with each other. Here, the lower insertion groove 523c and the lower coupling groove 523b may have the same structures as the upper insertion groove 522c and the upper coupling groove 522b, respectively.

Also, the lower side protrusion 524c having a hook shape may be inserted into the lower insertion groove 523c and then be restricted by the lower coupling groove 523b. Since the lower side protrusion 524c and the lower coupling groove 523b are coupled to each other, the coupled state between the lower fame 523 and the side frame 524 may be maintained.

A lower rib 523d for supporting the lower end of the front surface of the transparent panel assembly 60 may be disposed on the rear surface of the lower frame 523. The lower rib 523d extends from one end to the other end of the lower frame 523 to protrude backward. Also, an auxiliary rib 524d extending upward from each of both sides of the lower frame 523 and connected to a side rib 524d disposed on the side frame 524 may be further provided.

The side frame 524 may be disposed between the upper frame 522 and the lower frame 523 and also be disposed on each of both sides therebetween. The side frame 524 may define both sides of the inner frame 52, and a front surface of the side frame 524 may be closely attached to both sides of the rear surface of the out plate 51.

A side accommodation groove 524a which extends vertically and into which both left and right ends of the opening bent part 514 may be defined in the front surface of the side frame 524. The side accommodation groove 524a may be recessed at a position corresponding to each of both side ends of the opening bent part 514, which defines the plate opening 511.

In the state in which the upper frame 522, the lower frame 523, and the side frame 524 are coupled to each other, the side accommodation groove 524a, the upper accommodation groove 522a, and the lower accommodation groove 523a may be connected to each other so as to have the same shape as the bent shape of the opening bent part 514.

Thus, in the state in which the inner frame 52 is assembled, the stably coupled state between the inner frame 52 and the out plate 51 may be realized to define an outer appearance of the circumference of the see-through part 21 without exposing the end of the out plate 51. Also, the circumference of the inside of the inner frame may serve as an edge covering a gap between the out plate and the front surface of the transparent panel assembly.

Although the front surface of the out plate 51 has a curved shape, the transparent panel assembly 60 has a planar shape. Thus, when the transparent panel assembly 60 is mounted, a space may necessarily occur between the out plate 51 and the transparent panel assembly 60. Since the front surface of the inner frame 52 is coupled to the out plate 51, and the rear surface of the inner frame 52 is coupled to the transparent panel assembly 60, the space between the out plate 51 and the transparent panel assembly 60 may be covered to form a circumference of the see-through part 21.

The upper side protrusion 524b and the lower side protrusion 524c may be disposed on upper and lower ends of the lower accommodation groove 523a, respectively. Thus, each of the upper frame 522 and the lower frame 523 may be coupled with respect to the side frame 524.

A side rib 524d may be disposed on the rear surface of the side frame 524. The side rib 524d may extend from the upper end to the lower end of the side frame 524 to support both left and right ends of the transparent panel assembly 60.

The side rib 524d may protrude backward and have the same height as each of the upper rib 522d and the lower rib 523d. In the state in which the inner frame 52 is assembled, the side rib 524d may be connected to the upper rib 522d and the lower rib 523d.

Figure 17:
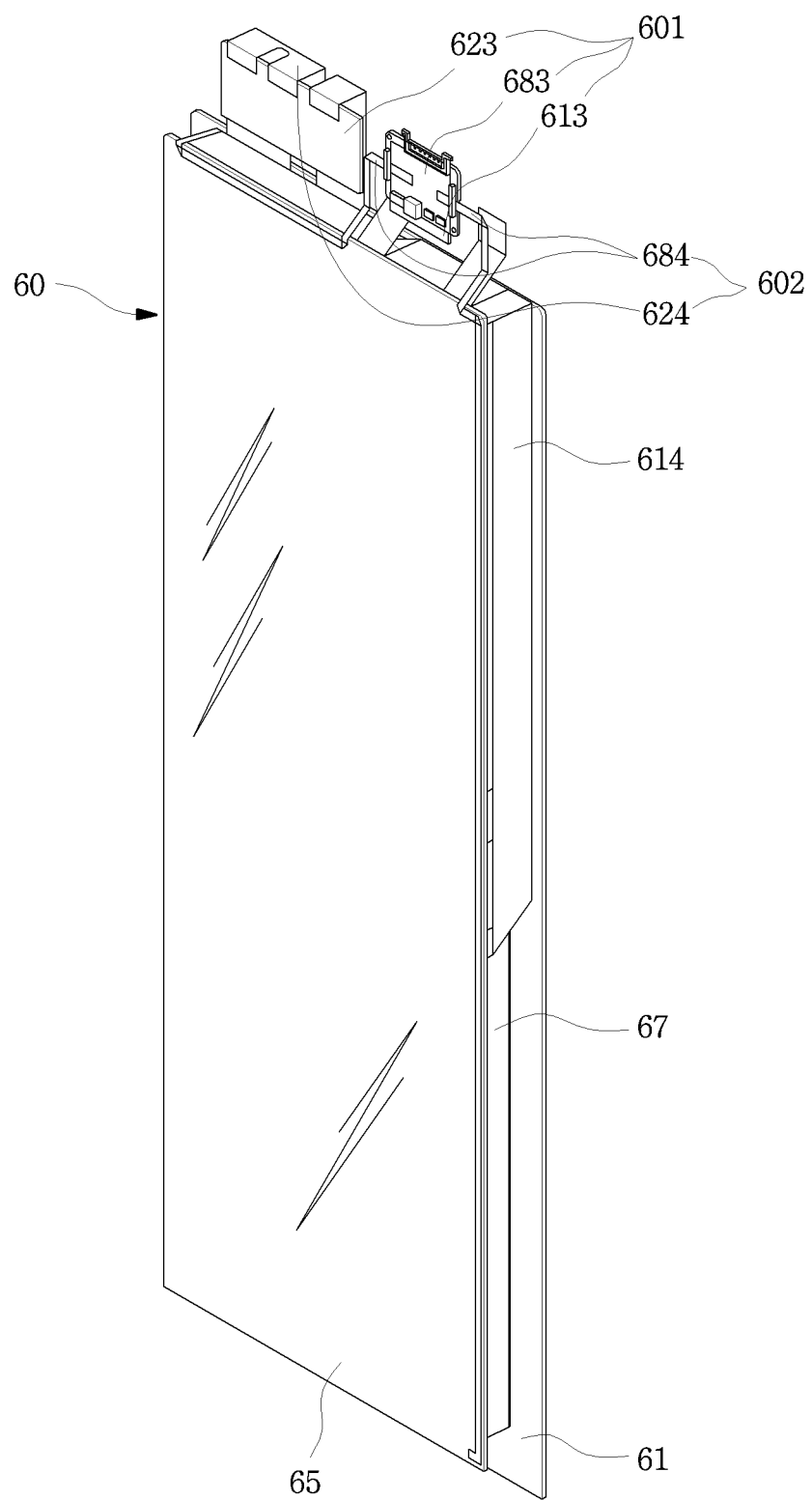
FIG. 17 is a perspective view of a transparent panel assembly according to the first embodiment of the present invention.
Figure 18:
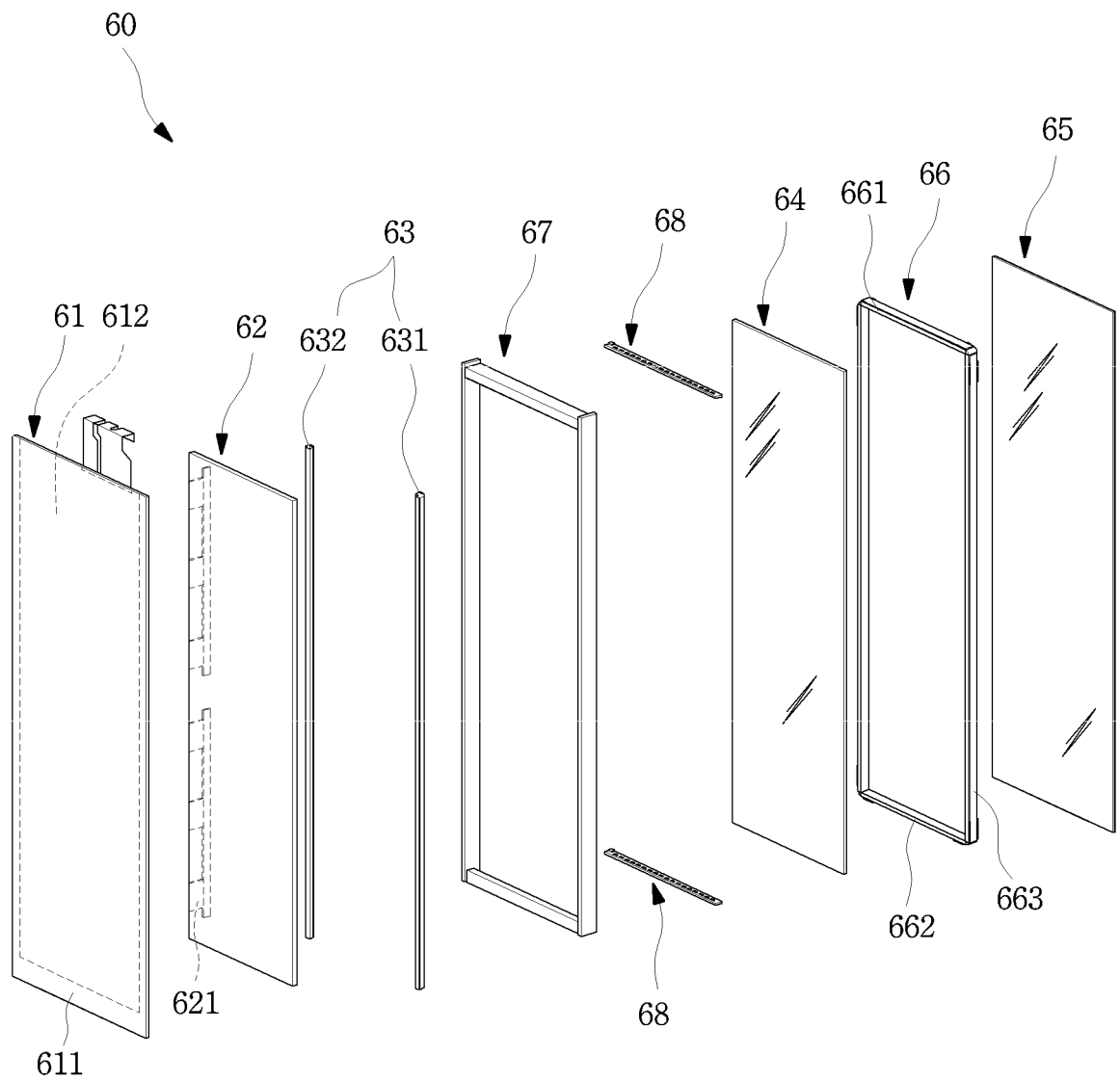
FIG. 18 is an exploded perspective view of the transparent panel assembly.
Figure 19:
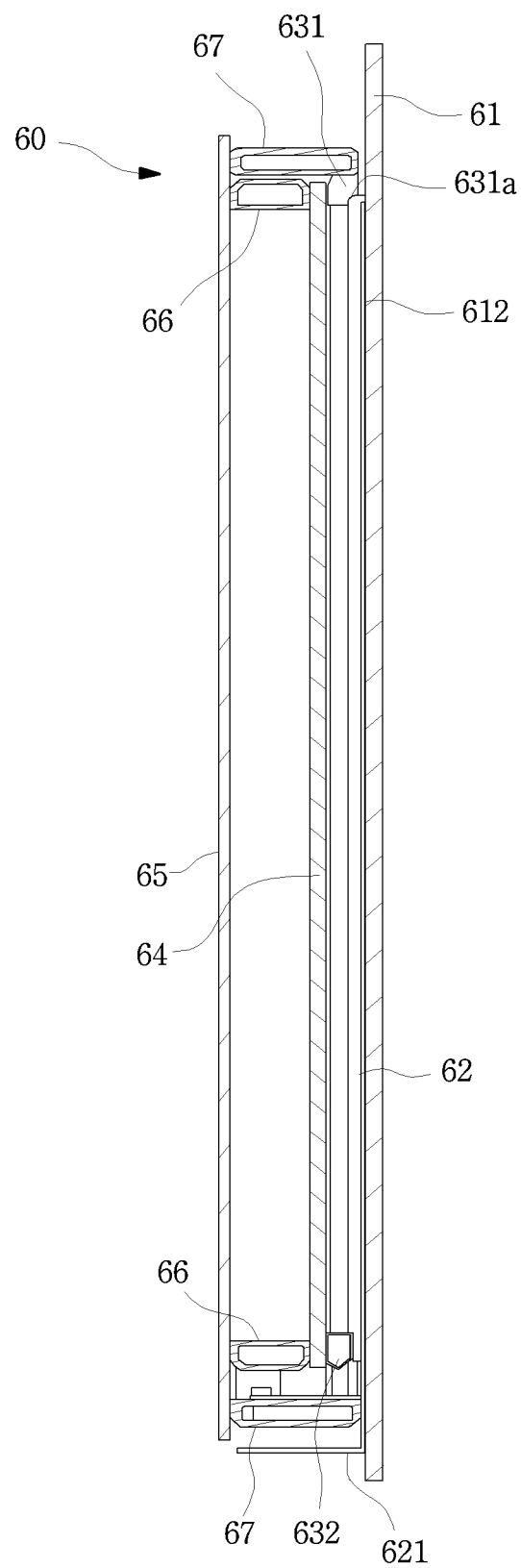
FIG. 19 is a cross-sectional view of the transparent panel assembly.

FIG. 17 is a perspective view of the transparent panel assembly according to the first embodiment of the present invention. Also, FIG. 18 is an exploded perspective view of the transparent panel assembly. Also, FIG. 19 is a cross-sectional view of the transparent panel assembly.

As illustrated in the drawings, the transparent panel assembly 60 may have a size that is enough to cover the plate opening 511 and the liner opening 561 inside the sub door 50. Also, the see-through part 21 may be provided in the transparent panel assembly 60 so that the inner space of the refrigerator is selectively visible, and a screen is outputted.

In more detail with respect to the transparent panel assembly 60, the transparent panel assembly 60 may have an outer appearance that is defined by the front panel 61 and the rear panel 65, which define the front and rear surfaces of the transparent panel assembly 60, and an outer spacer 67 connecting the front panel 61 to the rear panel 65.

Also, a display 62 and a light guide plate 64 may be disposed between the front panel 61 and the rear panel 65. In addition, a spacer 63 for supporting the display 62 and the light guide plate 64 may be further provided, and a display light 68 for emitting light to the light guide plate 64 may be provided.

In more detail, the front panel 61 may be made of a transparent glass material (e.g., blue glass) that defines an outer appearance of the front surface of the transparent panel assembly 60. The front panel 61 may be made of a different material through which the inside of the front panel 61 is visible, and a touch input is enabled.

The front panel 61 may have a size greater than that of the plate opening 511 and be supported by the inner frame 52. That is, when the transparent panel assembly 60 is assembled and mounted from the rear side, a circumferential portion of the front panel 61 may be supported by the rear surface of the inner frame 52.

In detail, the front panel may further protrude outward than the rear panel 65 and thus may have a longer length in all of vertical and horizontal directions. Also, the front panel 61 defining the front surface of the transparent panel assembly 60 may further extend outward from the plate opening 511 and then be stably fixed and mounted due to characteristics of the transparent panel assembly 60 mounted on at the rear side of the out plate 51.

Thus, when the transparent panel assembly 60 is mounted, each of the extending ends of the front panel 61 may be supported by the inner frame 52, and thus, the transparent panel assembly 60 may be stably maintained through the plate opening 511 in the mounted state without being the separated.

Also, when the front panel 61 may have a larger size greater than that of the display 62, the touch sensor 612 disposed on the front panel 61 may have an area corresponding to or greater than that of the display 62. Thus, the touchable area may be maximally secured through the front panel 61, and at least the area of the display 62 or the entire area of the see-through part 21 may be configured to be touchable.

A bezel 611 may be disposed on the circumference of the rear surface of the front panel 61. The bezel 611 may be printed with a black color and have a predetermined width so that the outer spacer 67 and the spacer 63 are covered without being exposed to the outside.

Also, a heater may be disposed along the bezel 611. The heater may be provided in the form a wire or a film and be disposed on the circumference of the front panel 61 along the bezel 611. The circumference of the front surface of the front panel 61 may be heated by the heater. Thus, dew condensation may be prevented from occurring on the front panel 61. Alternatively, the heater may be provided as a transparent heater so as to be disposed on the entire surface of the front panel 61.

The touch sensor 612 may be disposed on an inner area of the bezel 611. The touch sensor 612 may be formed on the rear surface of the front panel 61 in a printing manner and be configured to detect user's touch manipulation of the front panel 61. Alternatively, the touch sensor 612 may be formed in various manners such as an adhesion manner, rather than the printing manner, so that the user touches the front panel 61 to perform the touch input.

A touch PCB 613 connected to the touch sensor 612 may be disposed on the upper end of the front panel 61. The touch PCB 613 may include a flexible film-shaped cable 614 such as a flexible flat cable (FFC), a flexible print cable or flexible print circuit board (PFC), or the like.

The display 62 may be disposed on the rear surface of the front panel 61. The display 62 may be provided as an LCD module for outputting a screen. Also, the display 62 may be transparent so that the user sees the inside through the display 62 when the screen is not outputted.

A source board 621 may be disposed on one side of the display 62. The source board 621 may also include a flexible film-shaped cable structure. The source board 621 may extend along the side surface of the transparent panel assembly 60 and be connected to the T-CON board 623 at the upper portion of the sub door 50.

In detail, when the source board 621 is disposed on the rear surface of the display 62, the source board 621 may be exposed to the outside through the see-through part 21 due to the characteristics of the display 62 that is transparent. Thus, the source board 621 may be disposed on an end of a circumferential side of the display 62 and bent to come into contact with an outer surface of the outer spacer 67 outside the outer spacer 67. The source board 621 may have the FFC or FPC structure that is easily bent. Thus, the source board 621 may be disposed along the outer spacer 67. Also, the source board 621 may have a size corresponding to that of the outer spacer 67 without getting out of a region of the outer spacer 67 in a state of being closely attached to the outer spacer 67.

Alternatively, the source board 621 may be disposed on the upper or lower end of the display 62. However, when the horizontal width is greater than the vertical length, and thus, the source board 621 is disposed on one end of both left and right ends of the display 62 due to the structural characteristics of the display 62, a sufficient space in which the source board 621 is capable of being disposed may be provided.

Both ends of the display 62 may be supported by the spacer 63. The spacer 63 may have a rod shape that extending from an upper end to the lower end of the display 62 and be constituted by a first spacer 631 and a second spacer 632.

The first spacer 631 may have a stepped seating part 631*a* so that one end of the display 62 is seated on an edge. Thus, when the display 62 is supported by the first spacer 631, the display 62 and the light guide plate 64 may be maintained at a set distance therebetween.

The second spacer 632 may support the other end of the display 62, on which the source board 621 is disposed. The second spacer 632 may maintain a set distance between the first display 62 and the light guide plate 64 like the first spacer 631. The source board 621 may extend outward by passing through the second spacer 632 and also extend upward in a state of being closely attached to the outer spacer 67.

The light guide plate 64 may be disposed at a rear side of the display and disposed to be spaced a predetermined distance from the display 62 by the first spacer 631 and the second spacer 632. There may be a difference in depth feeling of the screen outputted from the display 62 according to the position of the light guide plate 64.

Thus, the light guide plate 64 may be disposed further forward than an intermediate point between the front panel 61 and the rear panel 65 so that the screen outputted by the display 62 is felt closer to the front panel 61. As a result, a height of each of the first spacer 631 and the second spacer 632 may be determined.

The light guide plate 64 may diffuse or scatter light emitted from the display light 68 and be made of various materials. For example, the light guide plate 64 may be made of a polymer material or formed by forming a pattern or attaching a film on a surface thereof. The light guide plate 64 may illuminate the display 62 from the rear side of the display 62 when the display light 68 is turned on. For this, the light guide plate 64 may have a plate shape having a size equal to or somewhat greater than that of the display 62. The display light 68 may be disposed at a position corresponding to each of upper and lower ends of the light guide plate 64.

The rear panel 65 may be disposed at a rear side of the light guide plate 64. The rear panel 65 may define the rear surface of the transparent panel assembly 60 and have a size greater than that of the light guide plate and less than that of the front panel 61. Also, the rear panel 65 may have a size greater than that of the liner opening 561 to cover the liner opening 561.

The rear panel 65 may be made of low-ε glass to realize thermal insulation. A low-emission coating layer may be formed on a surface of glass for general insulation to form the low-ε glass, and thus, the low-ε glass may have excellent thermal insulation. As a result, the rear panel 65 may prevent heat of cool air within the refrigerator from being transferred to the outside through the transparent panel assembly 60.

A spacer 66 may be disposed between the rear panel 65 and the light guide plate 64. The spacer 66 may have a rectangular frame shape disposed along a circumference of the light guide plate 64 and adhere to the light guide plate 64 and the rear panel 64 to maintain a predetermined distance between the light guide plate 64 and the rear panel 65.

The distance between the front panel 61 and the light guide plate 64 may be maintained in fixed distance so as to output the screen of the display 62. Also, the distance between the light guide plate 64 and the rear panel 65 may be determined according to a thickness of the sub door 50 or the total thickness of the transparent panel assembly 60. That is, the spacer 66 may be adjusted in thickness to determine the total thickness of the transparent panel assembly 60 so as to be mounted to match a specification of the sub door 50.

The rear panel 65 may come into contact with the door light 57. Thus, a distance between the display 62 and the door light 57 may be determined according to the position of the rear panel 65. In a state in which the door light 57 is turned on, the door light 57 may serve as an auxiliary backlight function of the display 62. Thus, the door light 57 may be disposed at a set position. Also, the position of the rear panel 65 and the total thickness of the transparent panel assembly 60 may be determined by the position of the door light 57.

In detail, a distance between the display 62 and the door light 58 may range from 5 cm to 15 cm. When the distance between the display 62 and the door light 57 is less than about 5 cm, a shade may occur. When the distance between the display 62 and the door light 57 exceeds 5 cm, the door light may not serve as the backlight. Thus, to maintain the distance between the display 62 and the door light 57, the rear panel 65 may also be maintained to be spaced a predetermined distance from the display 62, and thus, the width of the spacer 66 may be determined.

A gap between the light guide plate 64 and the rear panel 65 may be sealed by the spacer 66. Thus, a space between the spacer 66 and the light guide plate 64 may become to a vacuum state, or an insulative gas such as argon may be injected for the thermal insulation to more improve the thermal insulation performance.

In the state in which the rear panel 65 adheres to the spacer 66, an outer end of the rear panel 65 may further extend outward from the spacer 66. Also, the outer spacer 67 may be mounted on the outer end of the rear panel 65 so that the rear panel 65 and the front panel 61 are fixed to each other.

The outer spacer 67 may connect the rear surface of the front panel 61 to the front surface of the rear panel 65 and also define the circumferential surface of the transparent panel assembly 60. Also, a space in which the display light 68 is mounted may be provided inside the outer spacer 67.

Figure 20:
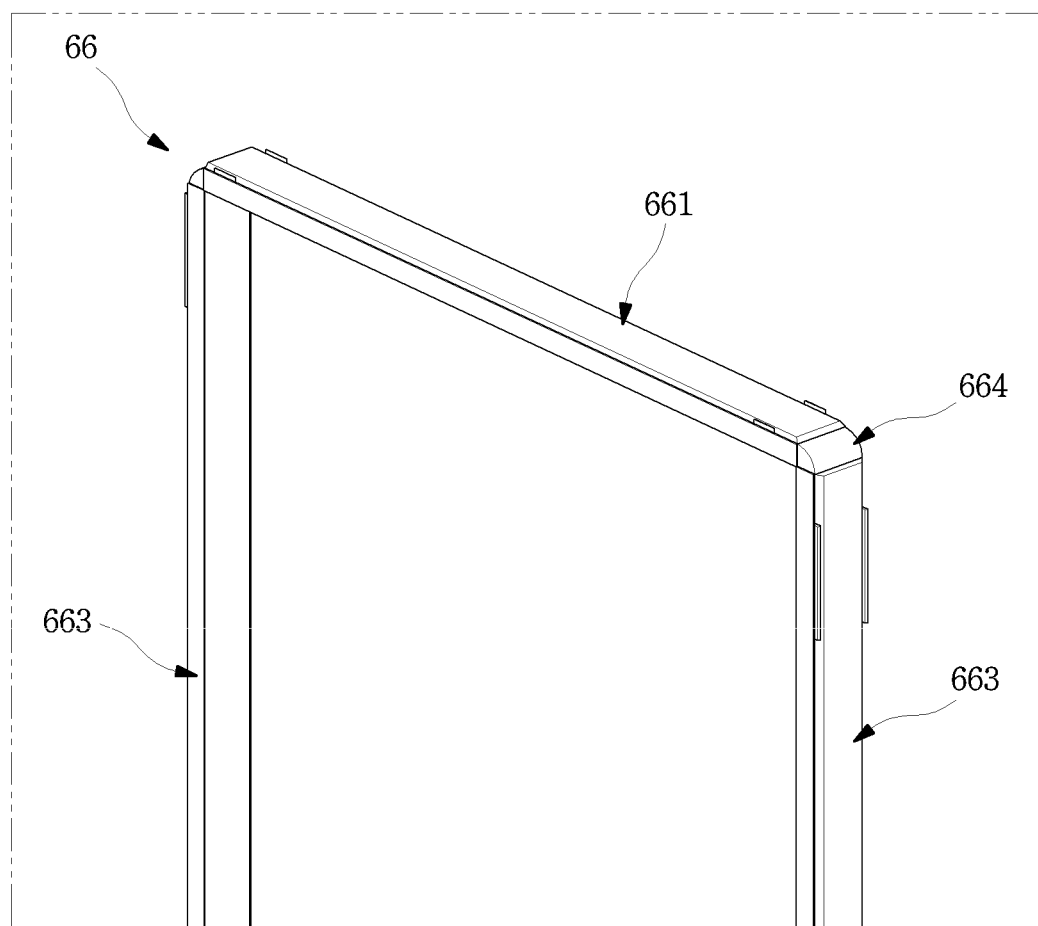
FIG. 20 is a perspective view of a spacer according to the first embodiment of the present invention.
Figure 21:
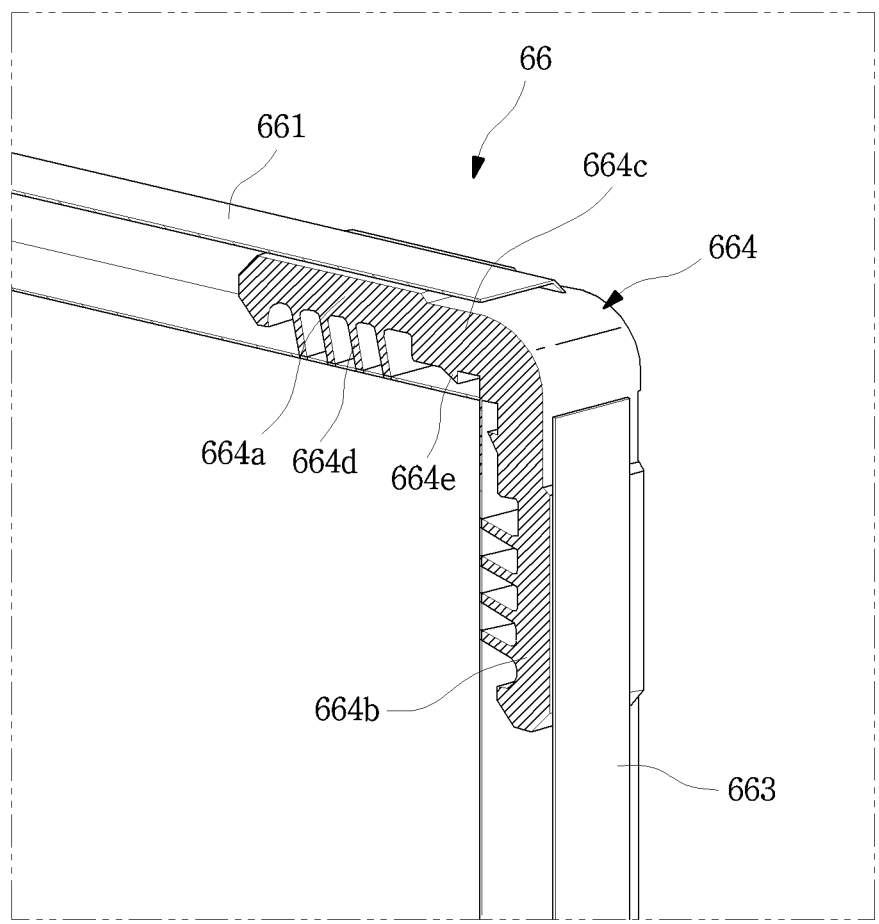
FIG. 21 is a cross-sectional view of the spacer.

FIG. 20 is a perspective view of the spacer according to the first embodiment of the present invention. Also, FIG. 21 is a cross-sectional view of the spacer.

As illustrated in the drawings, the spacer 66 may include a side spacer 663 disposed on each of both sides of the spacer 66 and upper and lower spacers 661 and 662 disposed in a vertical direction. The side spacer 663, the upper spacer 661, and the lower spacer 662 may have the same cross-sectional shape, i.e., a polygonal shape. Thus, each of a surface on which the light guide plate 64 and the rear panel 65 contact each other, a surface disposed between the light guide plate 64 and the rear panel 65, and an outer surface facing the surface between the light guide plate 64 and the rear panel 65 may have a planar shape.

Also, each of the side spacer 663 and the upper or lower spacer 661 or 662 may have a hollow and be made of a lightweight material to decrease in weight of the sub door 50.

The side spacer 663 may have opened upper and lower ends, and both side ends of the upper and lower spacers 661 and 662 may be opened. Here, the side spacer 663 may have the same cross-section as that of each of the upper and lower spacers 661 and 662.

Also, a corner connection member 664 may be disposed on each of four corners of the spacer 66. The corner connection member 664 may connect the side spacer 663 to the upper or lower spacer 663 or 661. The corner connection member 664 may be inserted into the side spacer 663 and the upper or lower spacer 661 or 662, and the side spacer 663 and the upper or lower spacer 661 or 662 may be disposed at a right angle.

The corner connection member 664 may be constituted by a first insertion part 664a extending in one direction, a second insertion part 664b extending in a direction perpendicular to the first insertion part 664a, and an intermediate part 664c disposed between the first insertion part 664a and the second insertion part 664b.

The first insertion part 664a and the second insertion part 664b may have the same structure and shape except that the first and second insertion parts 664a and 664b extend in different directions. Thus, the first insertion part 664a and the second insertion part may be inserted into openings of the side spacer 663 and the upper or lower spacer 661 or 662, which have the same shape, respectively.

Also, a plurality of support ribs 664d may be disposed on the first insertion part 664a and the second insertion part 664b. The first insertion part 664a and the second insertion part 664b may be inserted into the side spacer 663 and the upper or lower spacer 661 or 662 to support inner surfaces of the side spacer 663 and the upper or lower spacer 661 or 662. The support rib 664*d* may be provided in plurality at equal intervals. A protrusion 664*e* having a size and shape different from those of the support rib 664*d* may be further disposed at a position adjacent to the opening of each of the side spacer 663 and the upper or lower spacer 661 or 662.

The intermediate part 664*c* may be disposed between the first insertion part 664*a* and the second insertion part 664*b* to extend in a direction crossing each of the first insertion part 664*a* and the second insertion part 664*b*. Also, the intermediate part 664*c* may have a rounded outer surface and be exposed to the outside between the side spacer 663 and the upper or lower spacer 661 or 662. Thus, the intermediate part 664*c* may define an outer appearance of the edge of the spacer 66.

Figure 22:
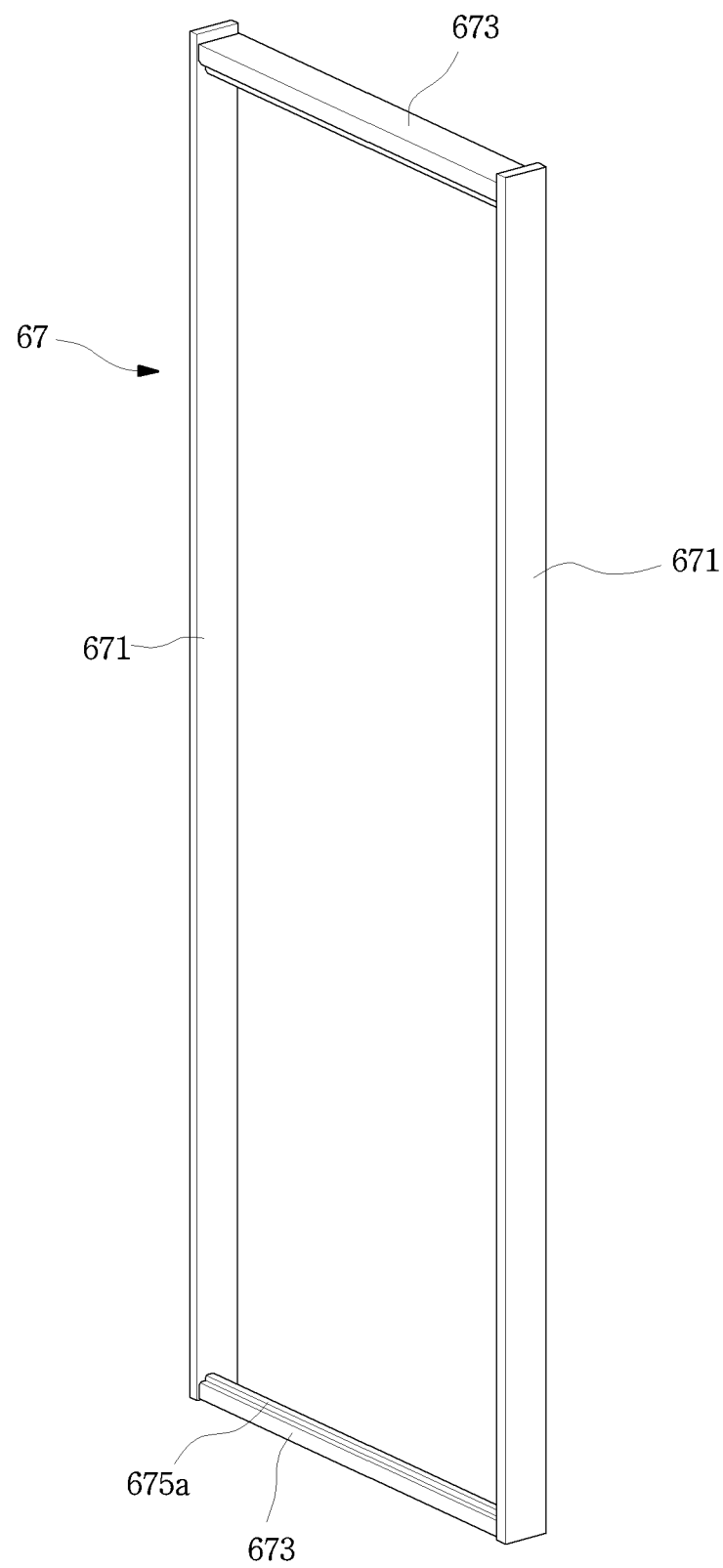
FIG. 22 is a perspective view of an outer spacer according to the first embodiment of the present invention.
Figure 23:
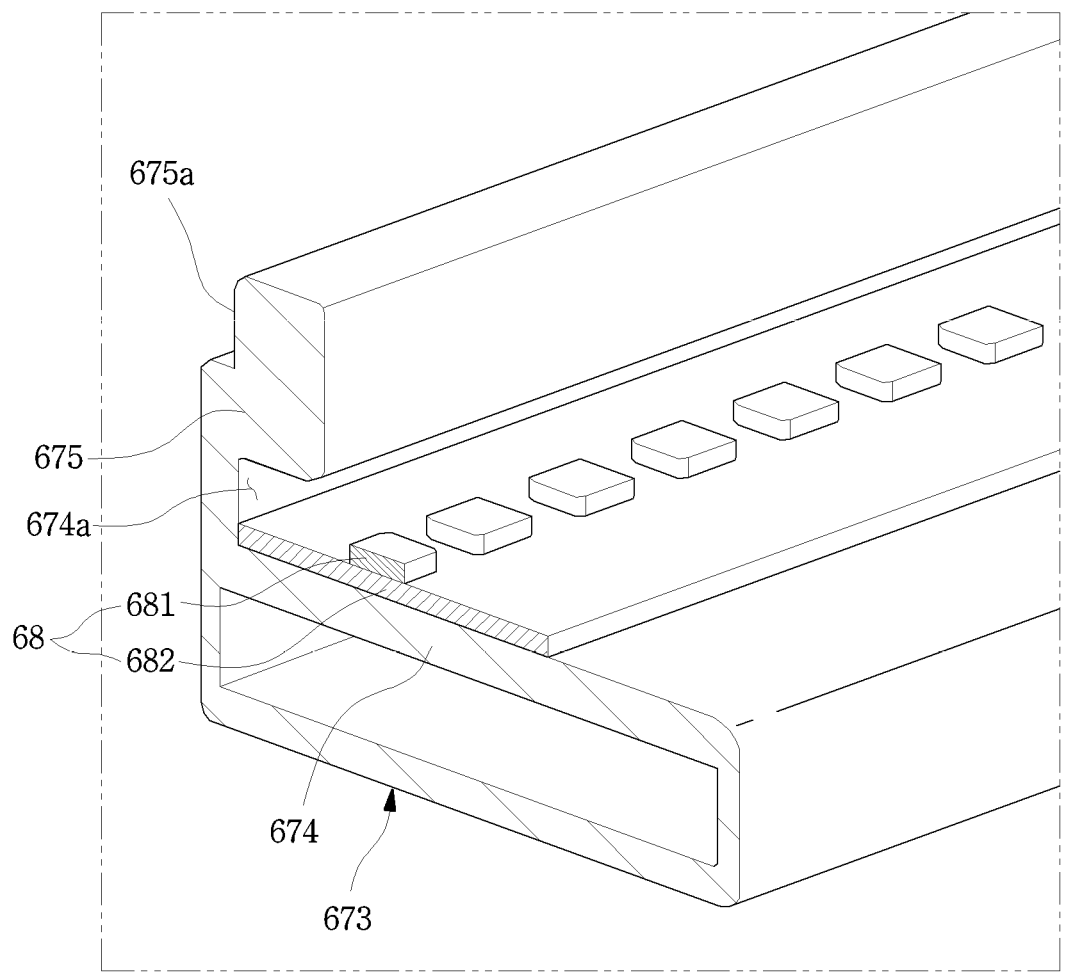
FIG. 23 is a cross-sectional view of the outer spacer.

FIG. 22 is a perspective view of the outer spacer according to the first embodiment of the present invention. FIG. 23 is a cross-sectional view of the outer spacer.

As illustrated in the drawings, the outer spacer 67 may have a rectangular frame shape. Also, the outer spacer 67 may have a size in which the light guide plate 64 and the spacer 63 are accommodated. The outer spacer 67 includes a pair of side frames 671 spaced apart from each other to define both left and right surfaces thereof and an upper frame 672 and a lower frame 673 connecting upper and lower ends of the pair of side frames 671 to each other. The outer spacer 67 may have a hollow therein to decrease in weight thereof and be made of a lightweight metal material such as aluminum.

The side frame 671 may connect the front panel 61 to the rear panel 65 and also define both the side surfaces of the transparent panel assembly 60. The upper frame 672 and the lower frame 673 may also connect the front panel 61 to the rear panel 65 and also define the shapes of the top and bottom surfaces of the transparent panel assembly 60. The upper frame 672 and the lower frame 673 may have the same shape except for vertical mounted positions thereof.

The lower frame 523 may include a light mounting part 674 and a spacer part 675. The light mounting part 674 connects the front panel 61 to the rear panel 65 and also provides a light accommodation part 674*a*, in which the display light 68 is mounted, in a top surface thereof.

The display light 68 may be longitudinally disposed along the light mounting part 674 and include a plurality of first LEDs 681 and a first LED board 682 on which the first LEDs 681 are continuously mounted at predetermined intervals. Alternatively, the display light 68 may have a different structure for emitting light except for the LED.

The first LED 681 may be disposed at a position corresponding to a lower end of the light guide plate 64. Thus, light emitted through the first LED 681 may be directed to an end of the light guide plate 64 and then move along the light guide plate 64 so that the entire surface of the light guide plate 64 emits light.

When the display light 68 is mounted, the first LED board 682 may be closely attached to the spacer part 675 so that the first LED 681 is accurately disposed at the lower end of the light guide plate 64. That is, in the state in which the first LED board 682 is closely attached to the spacer part 675, the first LED 681 may be disposed right below the light guide plate 64. Also, for this, the light accommodation part 674*a* may be recessed to inside of the spacer part 675.

The spacer part 675 may extend upward from one end of the light mounting part 674. Here, the spacer part 675 may be disposed between the front panel 61 and the light guide plate 64 so that the rear surface of the front panel 61 and the front surface of the light guide plate 64 may adhere to each other. Here, the spacer part 675 may have the same thickness of each of the first spacer 631 and the second spacer 632.

Thus, both left and right sides of the front panel 61 and the light guide plate 64 may be supported in a sealed state by the first spacer 631 and the second spacer 632, and upper and lower sides of the front panel 61 and the light guide plate 64 may be supported in a sealed state by the spacer part 675. As described above, the upper frame 672 and the lower frame 673 may adhere to each other so that the front panel 61 and the rear panel 65 are sealed with respect to each other and also may be fixed so that the front panel 61 and the light guide plate 64 are sealed with respect to each other.

A display support 675*a* on which an end of the display 62 is seated may be disposed on an edge of the upper end of the spacer part 675. The display support 675*a* may be configured so that the upper and lower ends of the display 62 are seated to allow the display 62 to be mounted at an accurate position in the rear side of the front panel 61.

The upper frame 672 may have the same structure as the lower frame 673 except for the arrangement thereof. Thus, the light guide plate 64 may be illuminated by the display light 68 provided in the upper and lower frames 672 and 673, and thus, the screen outputted on the display 62 may be more clear.

Figure 24:
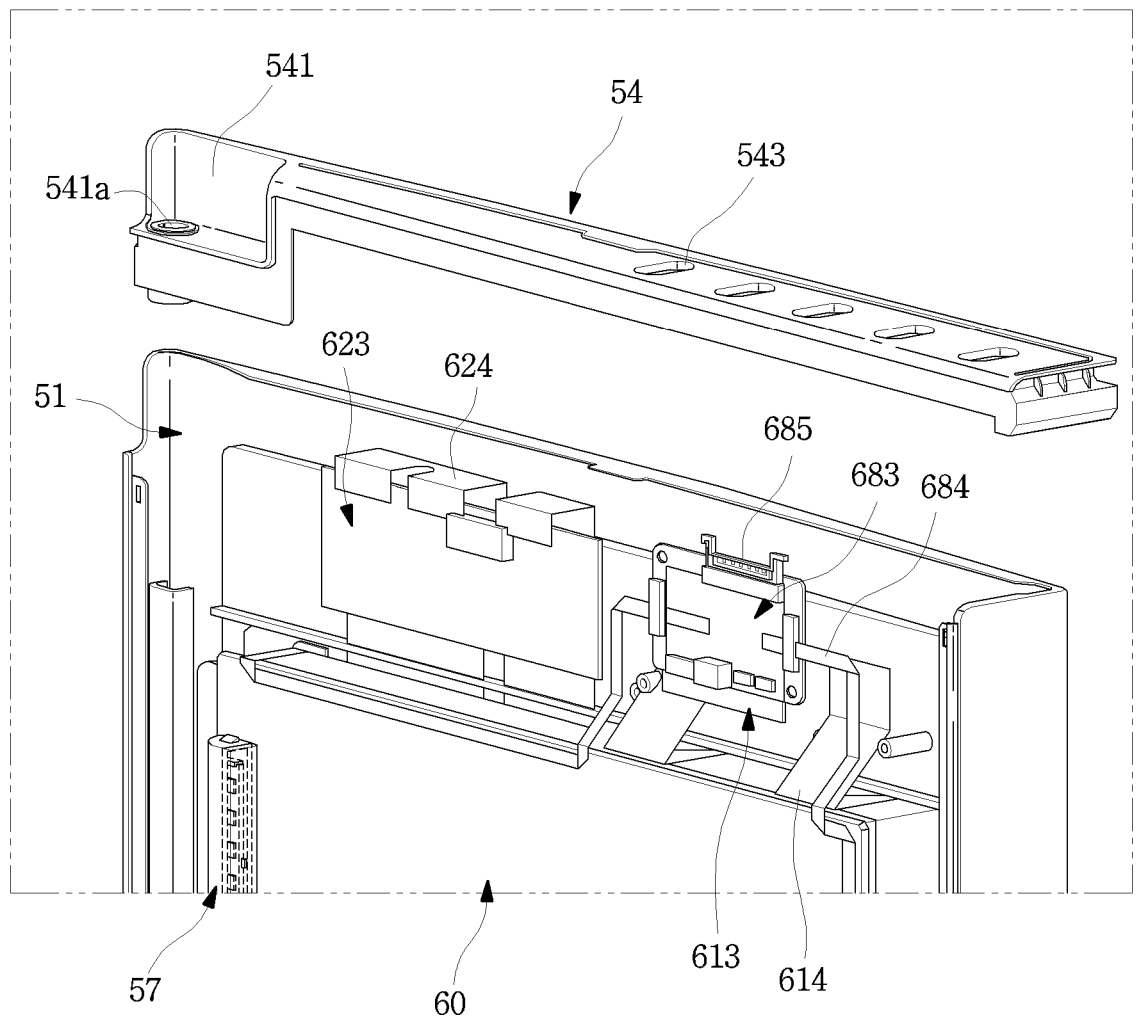
FIG. 24 is an exploded perspective view illustrating an arranged structure of a PCB on an upper portion of the sub door.
Figure 25:
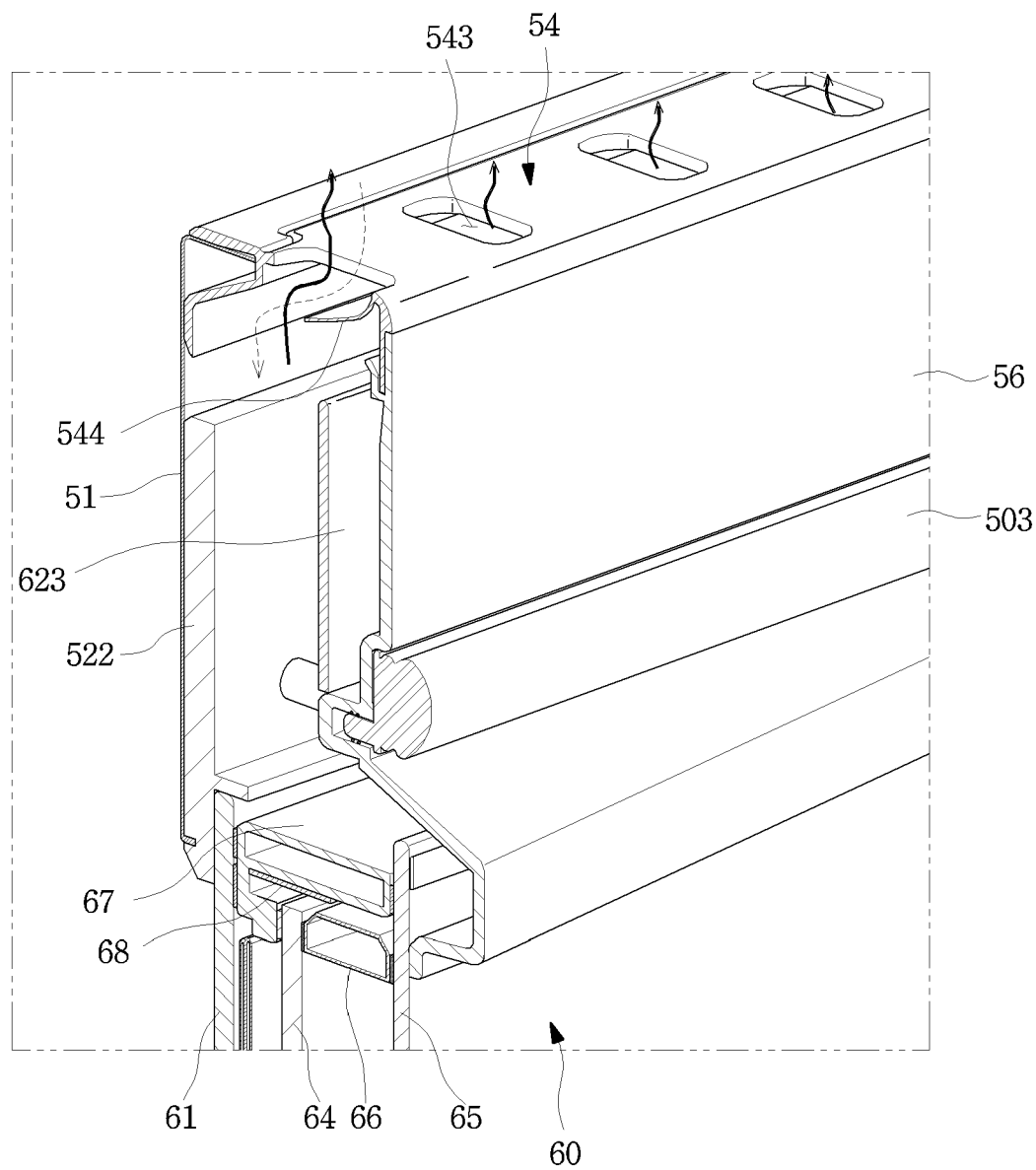
FIG. 25 is a cross-sectional view illustrating an upper portion of the sub door.

FIG. 24 is an exploded perspective view illustrating an arranged structure of a PCB on the upper portion of the sub door. FIG. 25 is a cross-sectional view illustrating the upper portion of the sub door.

As illustrated in the drawings, in the state in which the transparent panel assembly 60 is mounted, a plurality of PCBs 601 for an operation of the display 62 may be disposed on an upper portion of the inside of the sub door 50. Thus, wires connected to the plurality of PCBs 601 may lead to the sub upper hinge 401 through the upper cap decor 54 at the shortest distance.

In more detail, a T-CON board 613, a touch PCB 613, and a light PCB 683 may be disposed on the upper portion of the sub door 50. The T-CON board 623 may include a cable 614 for driving the display 62. The touch PCB 613 may process a touch input signal of the touch sensor 612 and include a cable 624 connected to the touch sensor 612. The light PCB 683 may be configured to control the display light 68 and include a cable 684 connected to each of the display lights 68 that are vertically disposed.

Each of the cables connecting the plurality of PCBs 601 may be provided in a flexible film type of FFC or FPC. Thus, the cables 602 may be disposed without occupying a large space inside the sub door 50 and also disposed along the edge of the transparent panel assembly 60, more particularly, the outer surface of the outer spacer 67. Thus, the connection structure of the PCBs may also be simplified, and when the insulation member 53 is assembled, the PCBs may not interfere with each other.

Particularly, all of the cables 602 may be disposed along the circumference of the transparent panel assembly 60 or the edge of the transparent panel assembly 60. For this, the cables 602 may be bent or curved.

Also, the plurality of PCBs may be connected to an electric wire having a wire shape. For this, a connector that is capable of being converted from the connection structure into the general wire type structure. Thus, the wires L connected to the plurality of PCBs 601 may be gathered to be guided to the outside through wire holes 542 opened in the rear surface of the sub door 50, more particularly, the upper cap decor 54. That is, each of the plurality of cables 602 connected to the PCBs 601 may have a very large width, and thus, the hole for guiding the plurality of cables 602 to the outside of the sub door 50 at once may be very large to deteriorate efficiency. Thus, the wire L may be connected to an output-side of the PCB 601 and guided to the outside of the sub door 50 to reduce a volume and space for guiding the wire L.

All of the T-CON board 623, the touch PCB 613, and the light PCB 693 may be disposed above the transparent panel assembly 60 and also be disposed on the upper portion of the sub door 50. Also, the T-CON board 623, the touch PCB 613, and the light PCB 693 may be disposed on the PCB mounting part 522e of the inner frame 52 and also be disposed to be spaced apart from each other on the PCB mounting part 522e by the PCB support 522.

Also, the insulation member corresponding to an area, on which the PCBs 601 are mounted, of the insulation members within the sub door 50 may have an upper end having a thin thickness to provide a space in which the PCBs 601 disposed on the upper portion of the sub door 50 are mounted to release heat.

To mount all of the T-CON board 623, the touch PCB 613, and the light PCB 683 in the limited space in the upper portion of the sub door 50, at least a portion of the plurality of PCBs 601 may be disposed to overlap each other. Here, the PCB supports 522f respectively supporting the PCBs 601 may have heights different from each other. Here, air may flow between the PCBs 601 overlapping each other to effectively dissipate the PCBs 601.

A plurality of heat dissipation holes 543 may be defined in the upper cap decor 54 defining the top surface of the sub door 50. Thus, heat generated in the T-CON board 623, the touch PCB 613, and the light PCB 683, which are provided inside the sub door 50, may be released through the heat dissipation hole 543.

The heat dissipation hole 543 may be defined in the top surface of the upper cap decor 54. Thus, when the heat is released to the outside of the sub door 50, the heat may be prevented from being transmitted to the user. Also, a heat dissipation hole guide 544 may be disposed in the heat dissipation hole 543. The heat dissipation hole guide 544 may be disposed along a portion of a circumference of the heat dissipation hole 543 and be inclined or rounded downward. Thus, the heat within the sub door 50 may be released, and dusts or foreign substances may be prevented from being introduced through the heat dissipation hole 543.

Particularly, the heat dissipation hole guide 544 may be opened to a side that is far away from the disposed positions of the PCBs 601, i.e., the front surface of the sub door 50 and also may extend to the front surface of the sub door 50 to prevent water or foreign substances, which damage the PCBs 601, from directly dropping into the PCBs 601.

Figure 26:
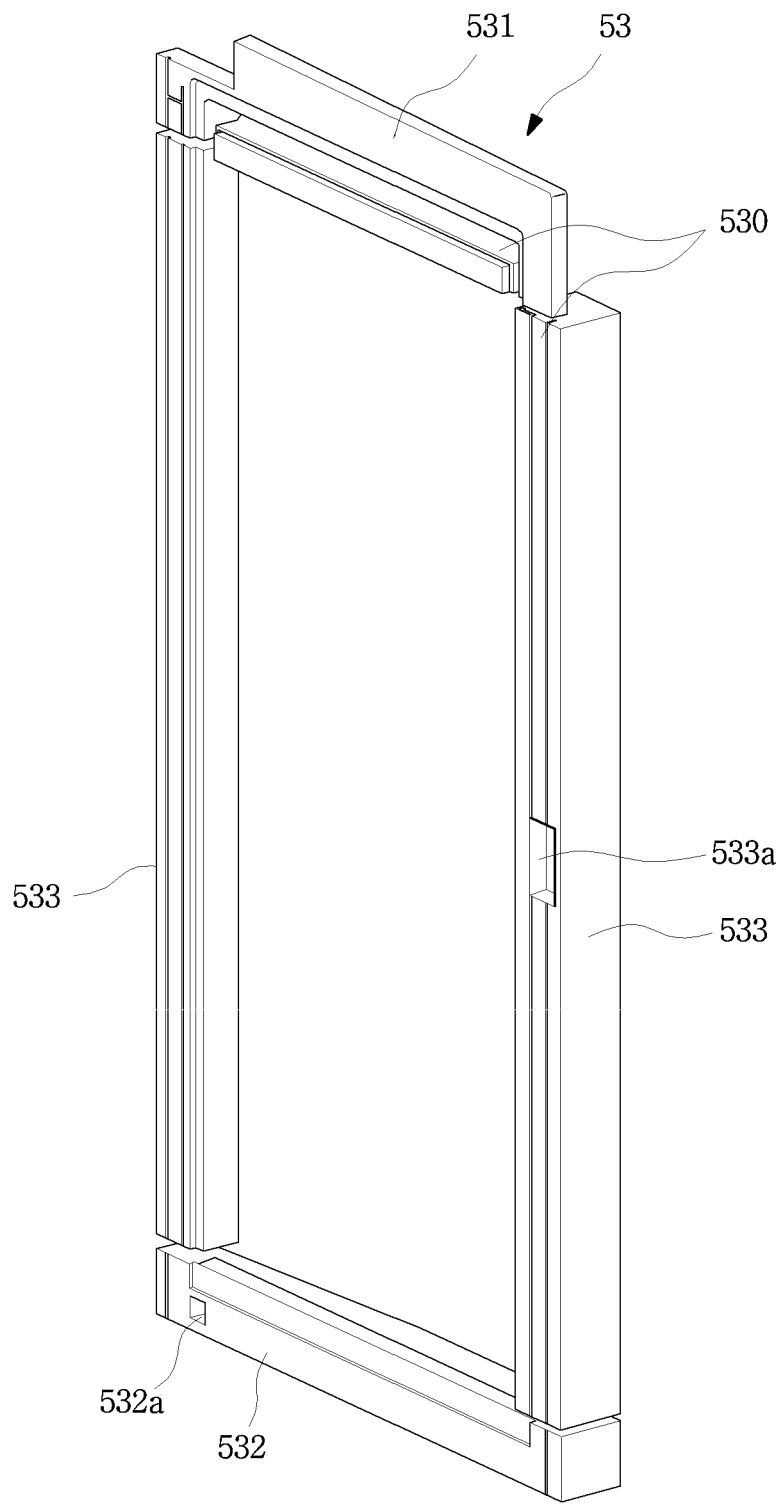
FIG. 26 is a perspective view of an insulation member according to the first embodiment of the present invention.

FIG. 26 is a perspective view of the insulation member according to the first embodiment of the present invention.

As illustrated in drawing, the insulation member 53 may have a shape corresponding an internal shape of the sub door 50 so as to be mounted in the sub door 50 along the circumference of the transparent panel assembly 60. The insulation member 53 may be assembled and mounted inside the sub door 50 in the state of being foam-molded.

The insulation member 53 may be constituted by an upper insulation member 531, a lower insulation member 532, and a pair of side insulation members 533 so as to be more easily mounted inside the sub door 50. Each of the upper insulation member 531, the lower insulation member 532, and the pair of side insulation members 533 may be separately molded and may adhere to each other in the state of being mounted on the sub door 50 to provide a rectangular frame shape.

The upper insulation member 531 may be disposed above the transparent panel assembly 60. Here, the upper insulation member may have a somewhat thin thickness to provide a space in which the plurality of PCBs 601 mounted on the upper portion of the sub door 50 are disposed and a space in which the PCBs 601 is cooled.

The lower insulation member 532 may be disposed below the transparent panel assembly 60. Also, the lower insulation member 532 may have a corresponding shape to fill a space between the out plate 51 and the door liner 56. Here, a first molded end 532a for avoiding the damping device 504 or the constitute for mounting the damping device 504 may be disposed on a portion corresponding to the portion on which the damping device 504 is mounted.

The side insulation members 533 may be disposed on both sides of the transparent panel assembly 60, respectively. Also, the lower insulation member 532 may have a corresponding shape to fill a space between the out plate 51 and the door liner 56. Here a second molded end 533a for avoiding the opening device 59 or the constitute for mounting the opening device 59 may be disposed on a portion corresponding to the portion on which the opening device 59 is mounted.

Also, a surface of the insulation member 53, which contacts the door liner 56, may have a shape corresponding to that of the door liner 56. Thus, the insulation member 53 may be coupled in a state of being closely attached to the door liner 56. For example, a third molded end corresponding to a liner protrusion 566 disposed on the door liner 56 may be disposed on a rear surface of the insulation member 53. The third molded end 530 may have a shape corresponding to that if the door liner. Thus, when the insulation member 53 is mounted, the third molded end 530 and the linear protrusion 566 may be coupled to each other.

Figure 27:
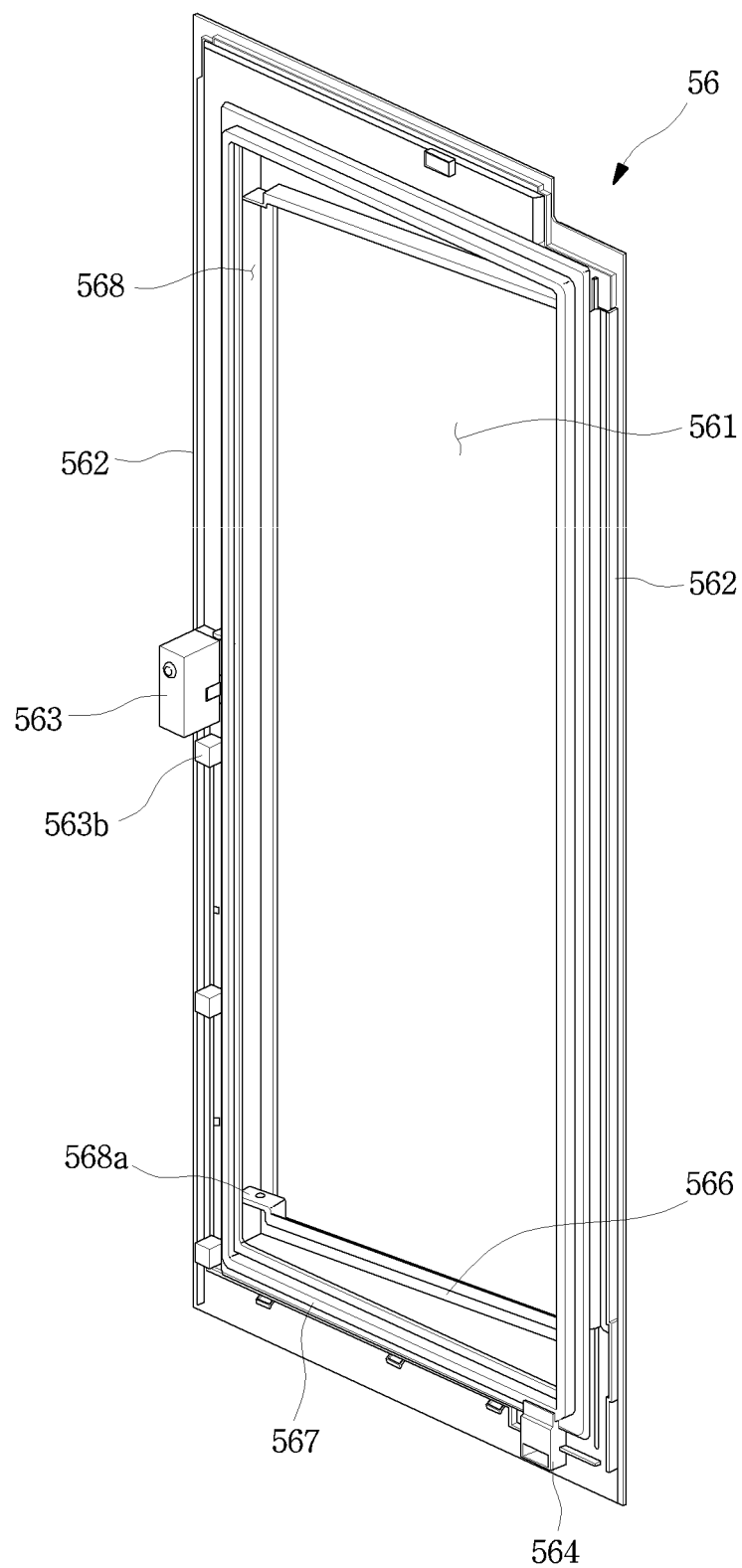
FIG. 27 is a perspective view of a door liner when viewed from the front side according to the first embodiment of the present invention.
Figure 28:
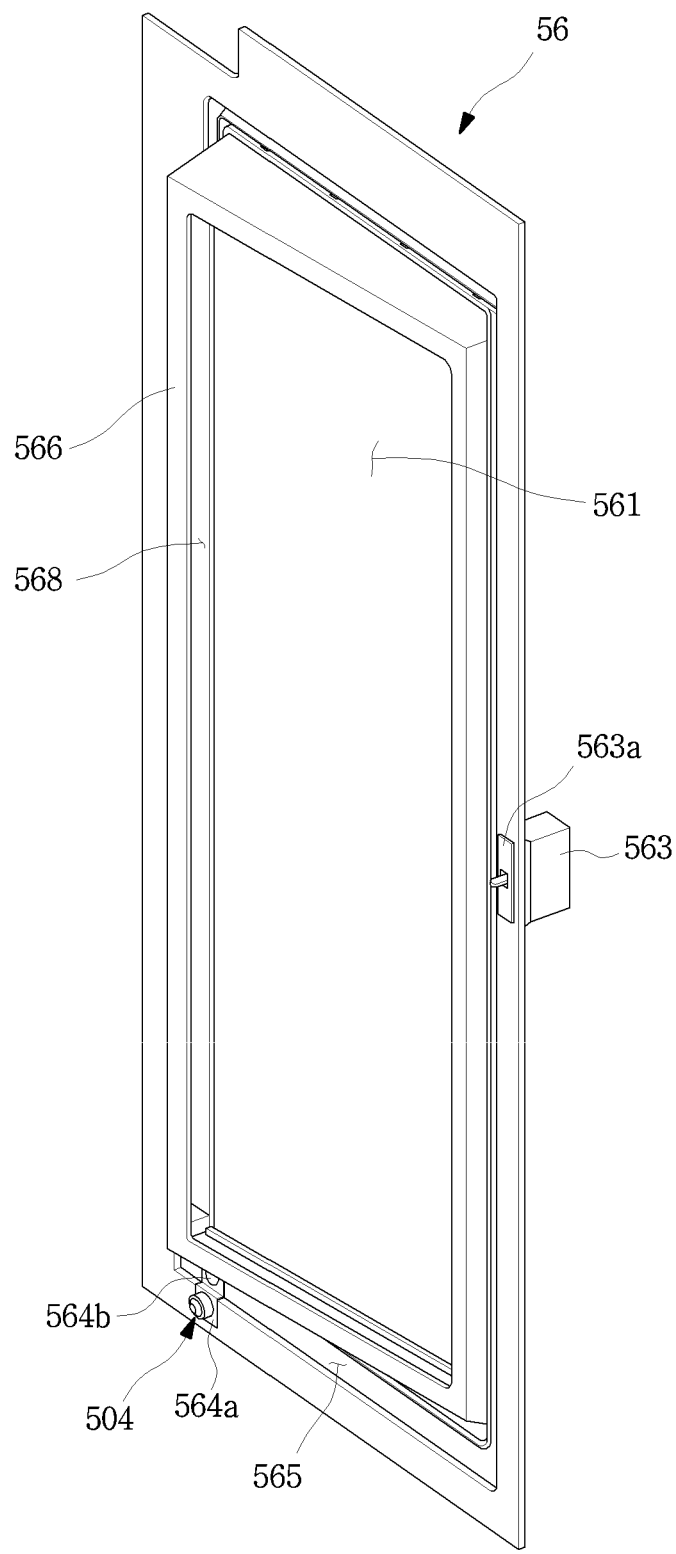
FIG. 28 is a perspective view of the door liner when viewed from the rear side.

FIG. 27 is a perspective view of the door liner when viewed from the front side according to the first embodiment of the present invention. FIG. 28 is a perspective view of the door liner when viewed from the rear side.

As illustrated in the drawings, the door liner 56 may be injection-molded by using a plastic material and molded to define an outer appearance of the rear surface of the sub door 50. Also, a structure in which the plurality of constituents mounted on the door liner 56 are capable of being mounted may be provided.

In detail, the door liner 56 may have a rectangular frame shape, and a liner opening 561 may be defined in a center of the door liner 56. The liner opening 561 may be covered by the transparent panel assembly 60.

A liner coupling part 562 coupled to both side ends of the out plate 51 may be disposed on each of both side ends of the front surface of the door liner that is directed to the out plate 51. That is, the liner coupling part 562 may extend up to an upper end of the door liner 56 so as to be coupled to a rear end of the side surface of the out plate 51.

Also, the upper and lower ends of the door liner 56 are coupled to the upper cap deco 54 and the lower cap deco 55, respectively.

Also, a latch accommodation part 563 is defined at one side of the door liner 56, which is far away from the rotation shaft of the sub door 50. The latch accommodation part 563 may be disposed at a central position in a vertical length of the door liner 56. The latch accommodation part 563 may be configured to accommodate a latch 592 constituting the opening device 59 so that the latch 592 is rotatable.

The latch accommodation part 562 may be opened through the rear surface of the door liner 56, and the opening of the latch accommodation part 593 may be covered by an accommodation cover 563*a*. The latch 592 may protrude by passing through a cover opening defined in the accommodation cover 563*a* and vertically rotate to be selectively coupled to the locking unit 42.

Also, a rod guide 563*b* may be disposed below the latch accommodation part 563. The rod guide 563*b* may be provided in plurality at equal intervals up to a lower end of the door liner 56. A connecting rod 592 connected to the manipulation member 591 of the opening device 59 may pass through the rod guide 563*b*.

The connecting rod 592 may have an upper end connected to the latch 592 inside the latch accommodation part 563 and a lower end connected to the manipulation member disposed on a lower end of the lower cap decor 55. Thus, when the manipulation member 591 is manipulated, the latch 592 may rotate by the connecting rod 592.

A damper mounting part 564 may be disposed on the lower end of the door liner 56 that is close to the rotation shaft of the sub door 50. The damper mounting part 564 may be recessed from the rear surface of the door liner 56 so that the damping device 504 is inserted and mounted. The damping device 504 may pass through a damper cover covering the damper mounting part 564 to protrude. The damping device 504 may be supported by an elastic member such as a spring so as to be accessible inside the damper mounting part 564.

Thus, while the sub door 50 is closed, the damping device 504 may contact the front surface of the main door 40 to relieve an impact. Also, while the sub door 50 is opened, elastic force may be provided so that the sub door 50 rotates in a direction in which the sub door 50 is opened.

Also, a portion of the damper cover 564*a* may be disposed on the gasket groove 565 and be fixed and mounted on the door liner 56 by a coupling member 564*b* such as a screw. Also, the coupling member 564*b* may be covered by the sub gasket 503 mounted on the gasket groove 565.

The gasket groove 565 recessed along a circumference of the liner opening 561 may be defined in the rear surface of the door liner 56. The sub gasket 503 may be fixed and mounted on the gasket groove 565 and be disposed on a circumference of a liner protrusion 566 protruding from the rear surface of the door liner 56.

A display accommodation part 567 having a size corresponding to that of the transparent panel assembly 60 may be provided in the front surface of the door liner 56. The display accommodation part 567 may be recessed to accommodate at least a portion of the transparent panel assembly 60 from a rear side thereof. Also, the inside of the display accommodation part 567 may be stepped. Thus, when the door liner is coupled, the circumference and a portion of the rear surface of the transparent panel assembly 60 may be supported by the display accommodation part 567. That is, when the door liner 56 and the out plate 51 are coupled to each other, the transparent panel assembly 60 may be maintained in the state of being stably fixed inside the display accommodation part 567.

The liner opening 561 may be defined in an inner region of the display accommodation part 567. Also, the liner protrusion 566 may be disposed on a circumference of the liner opening 561. The liner protrusion 566 may protrude backward from the rear surface of the door liner 56 and have a size and shape corresponding to those of the opening 41 of the main door 40.

When the sub door 50 is closed, the liner protrusion 566 may be inserted into the opening of the main door 40 to contact an inner surface of the opening 41, thereby primarily preventing cold air within the opening 41 from leaking.

Also, the sub gasket 503 disposed on the circumference of the liner protrusion 566 may be closely attached to the circumference of the opening to secondarily prevent the cold air within the opening 41 from leaking.

Also, the liner protrusion 566 may have a shape in which a side of the liner protrusion 566, which is close to the rotation shaft of the sub door 50 further protrudes than a side of the liner protrusion 566, which is far away from the rotation shaft and thus may be inclined or rounded. The liner protrusion 566 may be opposite to the rounded or inclined shape of the front surface of the sub door 50 and thus be closely attached to the front surface of the main door 40, which has the planar shape.

A door light mounting part 568 on which the door light 57 is mounted may be disposed on each of both left and right sides of an inner surface of the liner protrusion 566. The door light 57 may be configured to illuminate the rear region of the transparent panel assembly 60 and be mounted on the door light mounting part 568.

The door light mounting part 568 may be recessed from each of both the left and right surfaces of the inner surface of the liner protrusion 566. Also, in the state in which the door light 57 is mounted on the door light mounting part 568, an outer surface of the door light 57 may cover an opened surface of the door light mounting part 568 to define a portion of the inner surface of the liner protrusion 566.

Also, a door light fixing part 568*a* for fixing the door light 57 may be disposed on each of top and bottom surfaces of the door light mounting part 568. The door light fixing part 568*a* may be recessed so that a fixing protrusion disposed on each of upper and lower ends of the door light is inserted.

Figure 29:
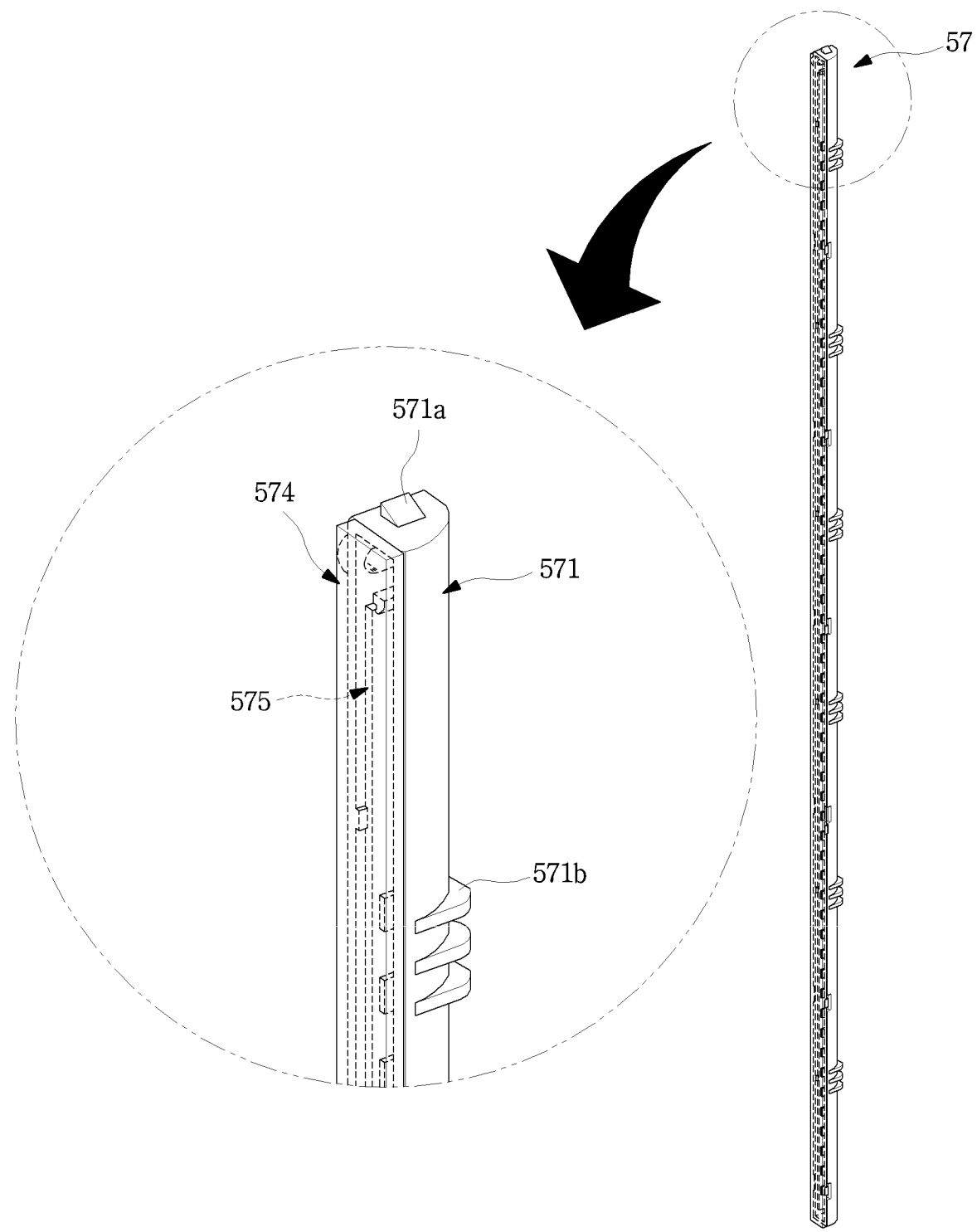
FIG. 29 is a perspective view of a door light according to the first embodiment of the present invention.
Figure 30:
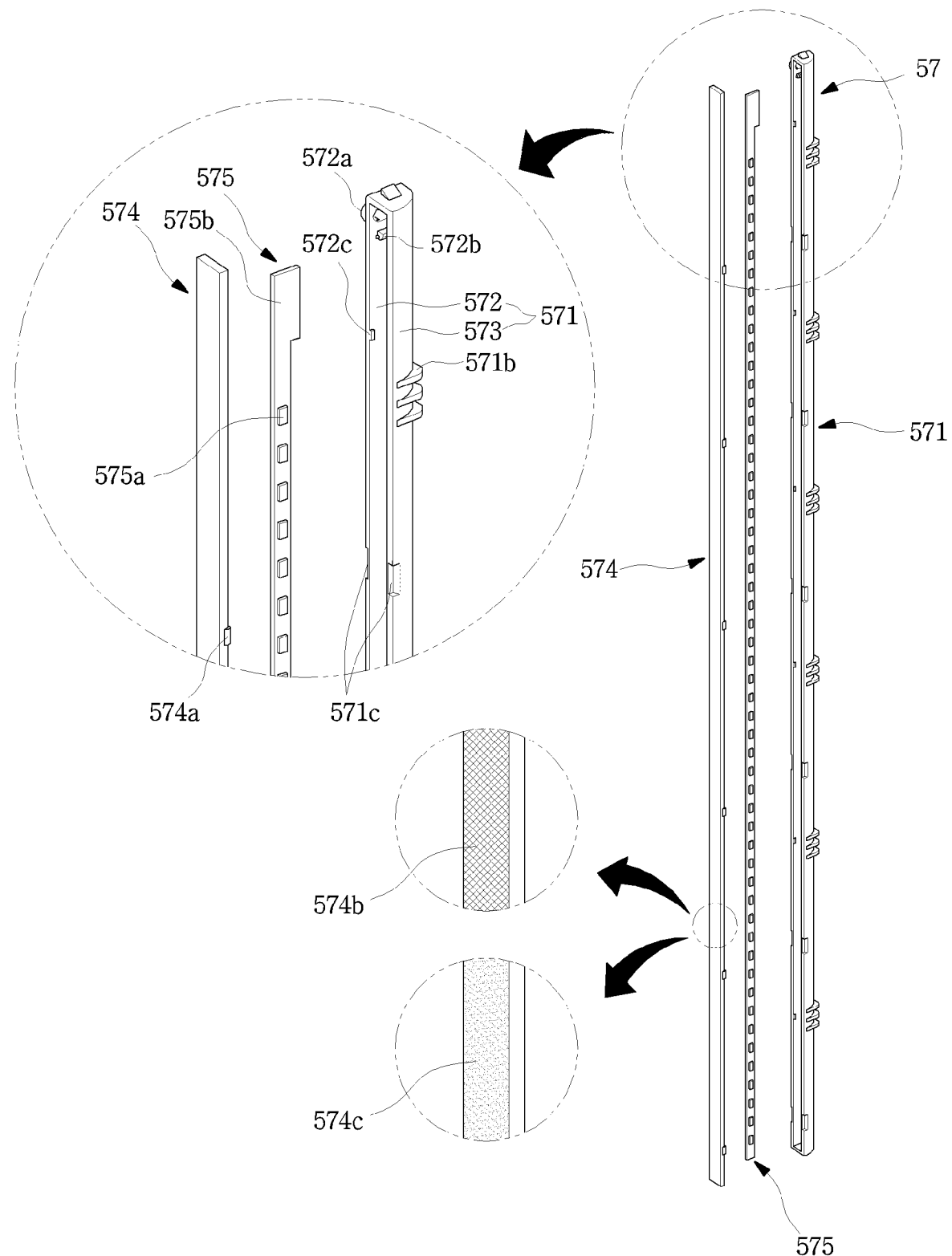
FIG. 30 is an exploded perspective view of the door light.

FIG. 29 is a perspective view of the door light according to the first embodiment of the present invention. FIG. 30 is an exploded perspective view of the door light.

As illustrated in the drawings, the door light 57 may have a size that is enough to be inserted into the door light mounting part 568 and be lengthily disposed in a vertical direction. The door light 57 may have a vertical length corresponding to that of the transparent panel assembly 60 to uniformly illuminate the entire rear surface of the transparent panel assembly 60.

In more detail, the door light 57 may include a light housing 571, a lighting module 575, and a light cover 574.

The light housing 571 may provide a space in which the lighting module 575 is accommodated and be inserted into the door light mounting part 568. The light housing 571 may have a box shape having an opened one surface. Here, the opened surface may be disposed on the opening of the door light mounting part 568.

A fixing protrusion 571*a* may be disposed on each of top and bottom surfaces of the light housing 571 and inserted into a door light fixing part 568*a* inside the door light mounting part 568. An inclined surface may be provided on the top surface of the fixing protrusion 571*a*. When the door light 57 is mounted, the inclined surface may be inserted while contacting the inner surface of the door light mounting part 568.

The light housing 571 may include a mounting surface 572 on which the lighting module 575 is mounted and a reflection surface 573 disposed on a surface facing the mounting surface 572. The mounting surface 572 may have a planar shape so that the lighting module 575 is mounted.

Also, the reflection surface 573 may extend from one end of the mounting surface 572 to extend in an inclined or rounded shape in a direction facing the mounting surface 572. The reflection surface 573 may be configured to reflect light emitted from the lighting module 575. The light emitted from the lighting module 575 may be reflected to proceed to the light cover 574. For this, the inside of the reflection surface 573 may be painted, coated, or surface treated to enhance the light reflection efficiency.

A wire entrance 572a through which the wire L connected to the lighting module 575 is accessible may be provided in one surface of the light housing 571. The wire entrance 572a may pass through an upper end of the mounting surface 572 to extend outward. Thus, the wire L connected to the lighting module 575 may be easily disposed.

Also, a fixing hook 572b and a side protrusion 572c for fixing and mounting the lighting module 575 may be disposed on the mounting surface 572. The fixing hook 572b may have a hook shape to restrict an outer end of the lighting module 575 and be disposed at a position corresponding to each of upper and lower ends of the lighting module 575. Also, the fixing hook 572b may be configured so that the lighting module 575 is press-fitted and fixed when the lighting module 575 is mounted. Also, the side protrusion 572c may contact both side ends of the lighting module 575 so that the lighting module 575 is disposed at its regular position. The side protrusion 572c may be continuously disposed in the vertical direction to fix the light module 575 at its regular position as a whole.

A reinforcement rib 571b may be disposed on an outer surface of the light housing 571. The reinforcement rib 571b may be disposed on an outer surface of the reflection surface 573 along a curvature of the reflection surface 573. Also, the reinforcement rib 571b may be provided in plurality that are continuously disposed and disposed at predetermined intervals in the vertical direction of the light housing 571.

The reinforcement rib 571b may allow the light housing 571 to contact the inner surface of the door light mounting part 568. Thus, the reinforcement rib 571b may be maintained in the stably mounted state without deformation or movement of the light housing 571 inside the door light mounting part 568.

Also, a plurality of cover grooves 571c may be defined in the opened end of the light housing 571. The cover protrusion 574a of the light cover 574 may be coupled to the cover groove 571c to allow the light cover 574 to be fixed and coupled to the opening of the light housing 571.

The light cover 574 may cover the opening of the housing and allow the light emitted from the lighting module 575 to be transmitted after being reflected by the reflection surface 573. For this, the light cover 574 may be made of a material through the light is transmitted or diffused. Also, a plurality of grooves or protrusions may be disposed on a surface of the light cover 574 so that the transmitted light is more effectively diffused. Alternatively, an unevenness or pattern may be disposed on the surface, a film may be attached to the surface, or coating is performed on the surface. Also, as necessary, when the light cover 574 is injection-molded, particles or materials 574c for diffusing the light may be added.

Also, the cover protrusion 574a may be disposed on a circumference of the light cover 574 and coupled to the cover groove 571c of the light housing 571 to cover the opened surface of the light housing 571. Also, the light cover 574 may be disposed on the opening of the door light mounting part 568.

The lighting module 575 may include a plurality of second LEDs 575a emitting light and a second LED board 575b on which the plurality of second LEDs 575a are mounted. The plurality of second LEDs 575a may be continuously disposed along the second LED board 575b at predetermined intervals. Also, the second LED board 575b may be configured to be mounted on the mounting surface 572 of the light housing 571 and fixed to the mounting surface 572 by the fixing hook 572b.

Thus, the lighting module 575 may be disposed in a direction crossing the light cover 574. Also, the light emitted from the second LEDs 575a may be emitted to the reflection surface 573, and the light emitted to the reflection surface 573 may pass through the light cover 574 and be emitted to the outside.

As described above, the light emitted from the lighting module 575 may be reflected to pass through the light cover 574, thereby preventing the light from being locally illuminated at the position of the second LEDs 575a on the light cover 574. When the whole of the light cover 574 is brightly illuminated so as to be seen as a surface emission when viewed from the outside.

In a state in which the door light 57 is turned on, the rear surface of the transparent panel assembly 60 may be brightened, and also, the inside of the accommodation case 43 may be brightened. Here, the door light 57 may have brightness that is enough to distinguish the inside of the accommodation case 43 from the outside through the transparent panel assembly 60.

In detail, the door light 57 may be selectively turned on/off according to user's manipulation. When the door light 57 is turned on, an accommodation space defined in the accommodation case 43 may be brightened. When the door light 57 is turned on to allow the accommodation space of the main door 40, i.e., the inside of the refrigerator to be more brightened than the outside of the refrigerator, the light emitted by the door light 57 may pass through the transparent panel assembly 60. Thus, the user may transparently recognize the transparent panel assembly 60 and see the storage space inside the main door 40 through the sub door 50 from the outside.

Hereinafter, the turn-on/off states of the display light and the door light will be described in more detail with reference to the accompanying drawings.

Figure 31:
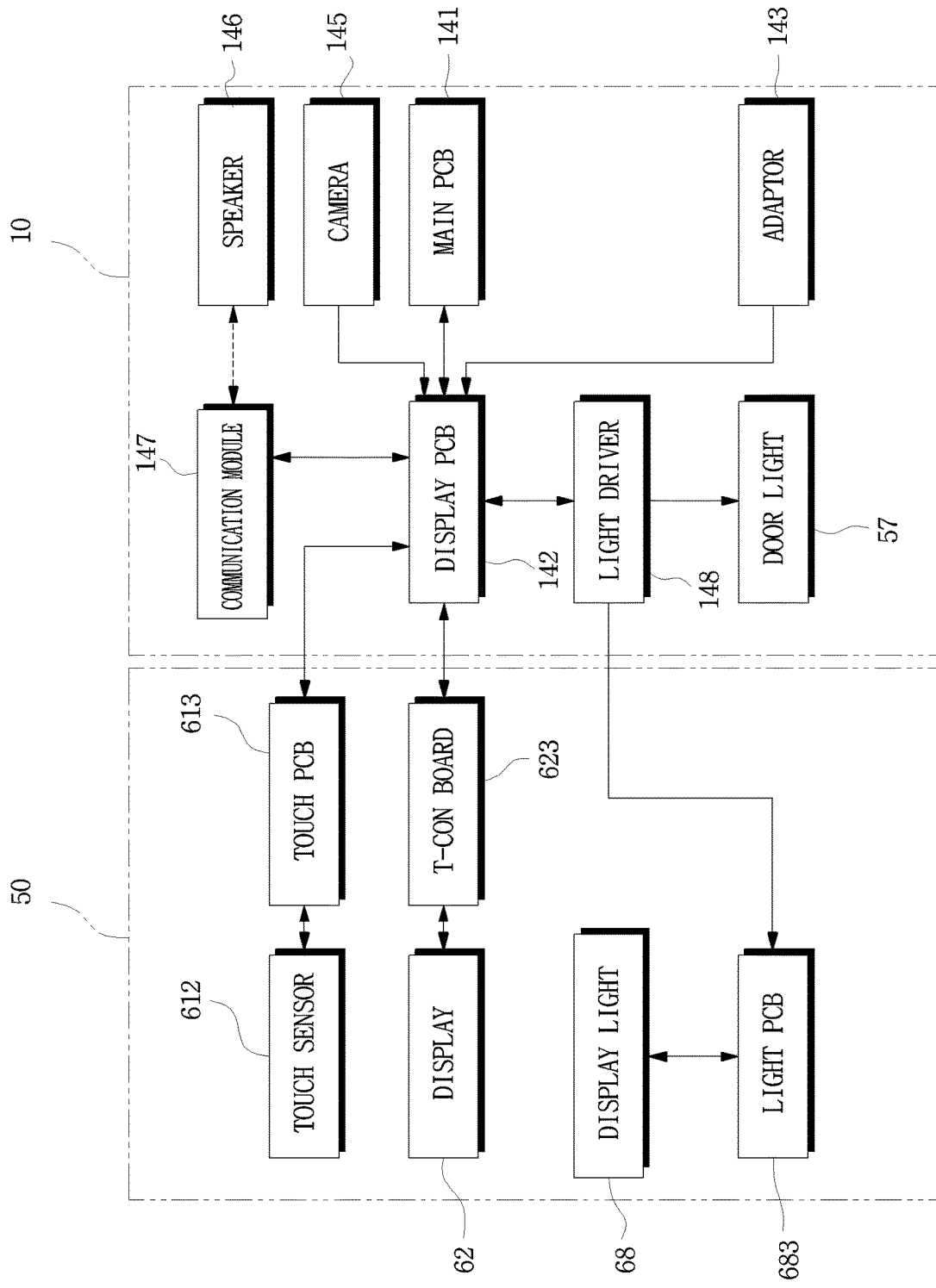
FIG. 31 is a block diagram illustrating a flow of a control signal of the refrigerator.
Figure 32:
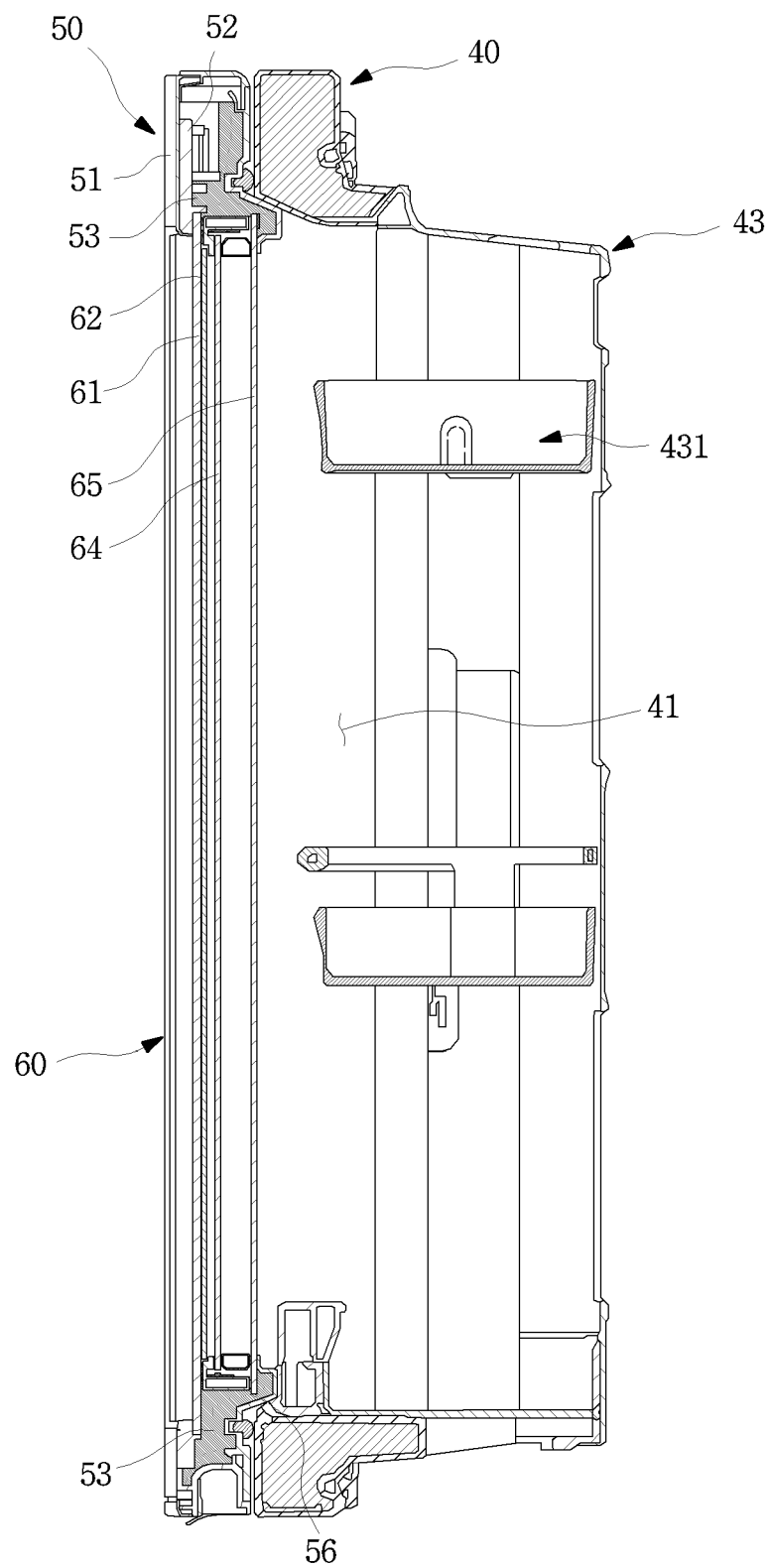
FIG. 32 is a longitudinal cross-sectional view of a refrigerating compartment door.
Figure 33:
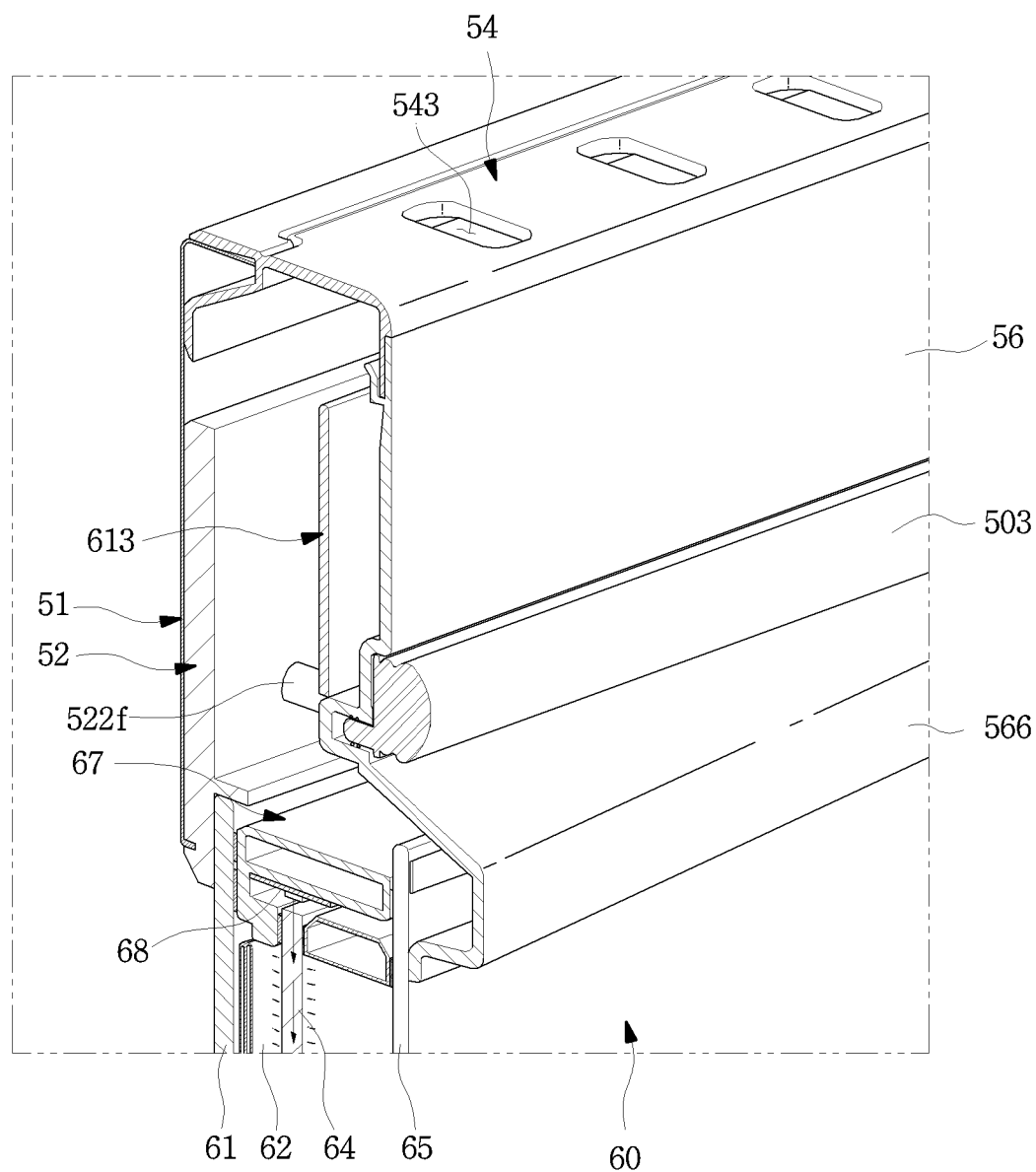
FIG. 33 is a cross-sectional view taken along line 33-33' of FIG. 10.

FIG. 31 is a longitudinal cross-sectional view of a refrigerating compartment door. FIG. 32 is a sectional view taken along line 32-32' of FIG. 10. Also, FIG. 33 is a cross-sectional view taken along line 33-33' of FIG. 10.

As illustrated in the drawings, in the state in which the display light 58 is turned off, and the display 62 is turned off, the light guide plate 64 and the display 62 may be transparent. Also, since the front panel 61 and the rear panel 65 are transparent, the transparent panel assembly 60 may be in a state in which the inside of the transparent panel assembly 60 is visible.

In this state, when the door light 57 is turned on to illuminate the inner space of the accommodation case 43, the user may see the inner space of the accommodation case 43 through the see-through part 21.

Also, when the user manipulates the front panel 61 disposed on the front surface of the refrigerator 1, the transparent panel assembly 60 may output a screen. Here, the manipulation of the front panel 61 may be inputted as one of a specific position, the touch number, or a pattern. As occasion demands, a separate physical button or sensor may be used to detect the user's manipulation.

The display 62 may be turned on to output the screen by manipulating the front panel 61. A set specific screen may be outputted on the display 62. The user may additionally manipulate the front panel 61 to output various screens through the display 62. The screen output through the display 62 according to various embodiments will be described below.

The display light 69 disposed on each of the upper and lower ends of the light guide plate 64 may be turned on together with the display 62 by the user's manipulation. The display light 68 may be disposed along the outer spacer 67 and also disposed to correspond to a width of the light guide plate 64. Also, the display light 68 may be disposed close to upper and lower ends of the light guide plate 64. Thus, the light guide plate 64 may irregularly reflect and diffuse light of the display light 68 by the turn-on of the display light 68 to emit light having generally uniform brightness to the front display 62.

Also, light may be emitted to the display 62 from the rear side of the display 62 by the light guide plate 64, and simultaneously, a screen based on inputted image information may be outputted on the display 62. Thus, the user may confirm the clearly outputted screen through the see-through part 21.

In the state in which a screen is being outputted through the display 62, the inner space of the refrigerator 1, i.e., the rear space of the sub door 50 may be selectively seen through the see-through part 21. To allow the rear space of the sub door 50 to be visible through the see-through part 21, the door light 57 may be turned on.

A turn on/off combination of the display light 68 and the door light 57 may be variously realized according to a degree of seeing of the inside of the accommodation case 43 through the see-through part 21. A difference in transparency by this combination will be described in more detail below.

Figure 34:
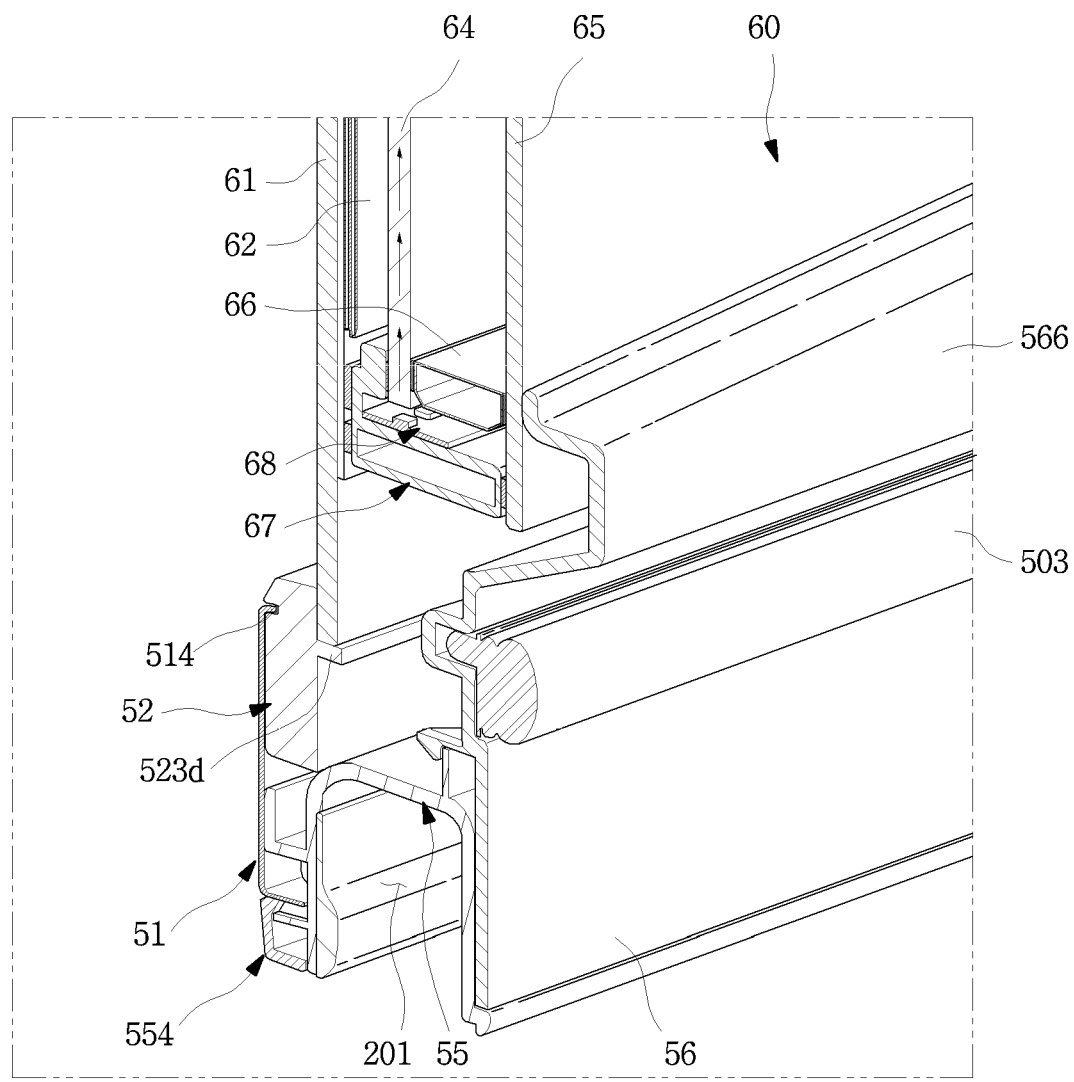
FIG. 34 is a cross-sectional view taken along line 34-34' of FIG. 11.
Figure 35:
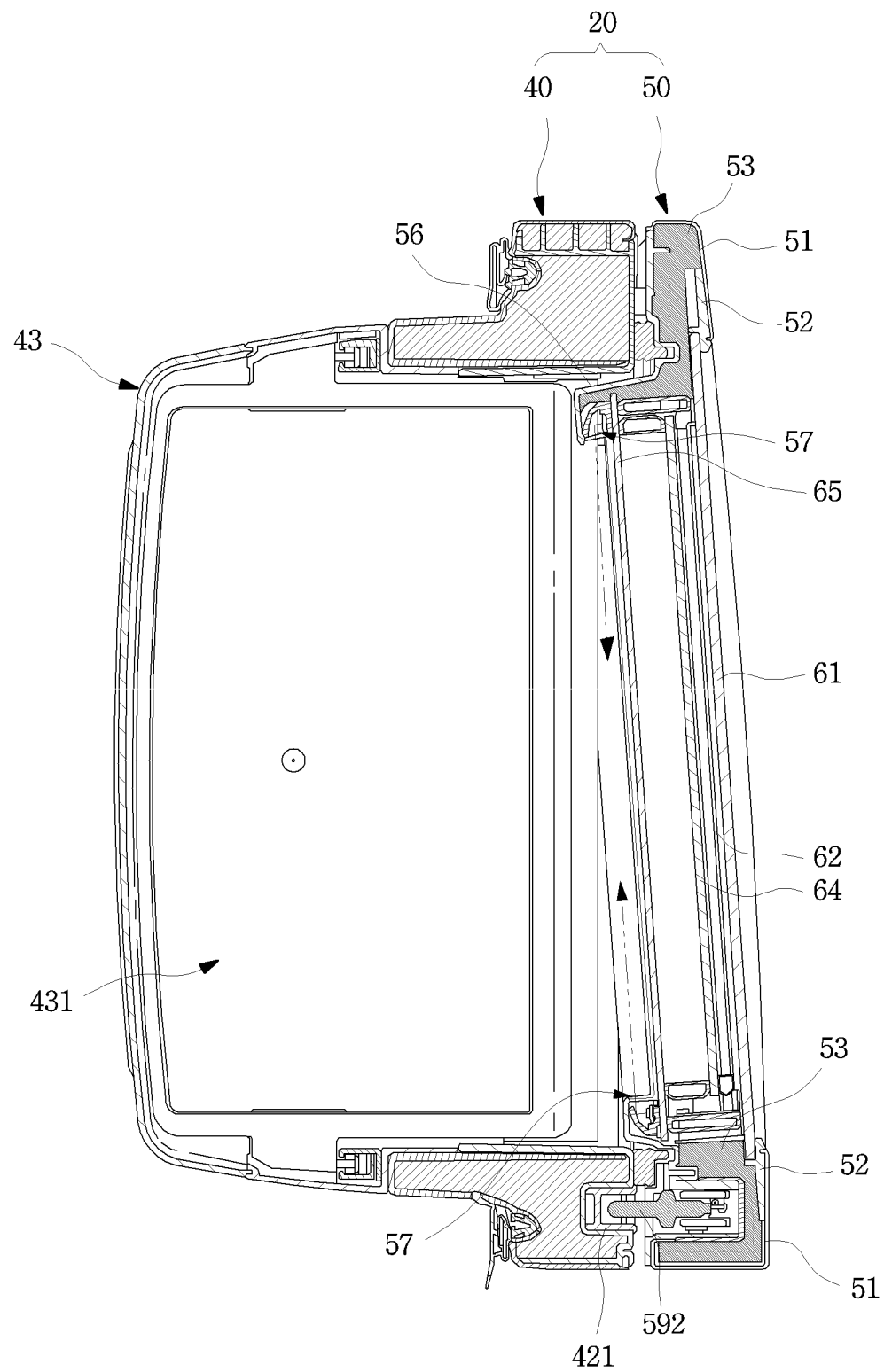
FIG. 35 is a transversely cross-sectional view of the refrigerating compartment door.
Figure 36:
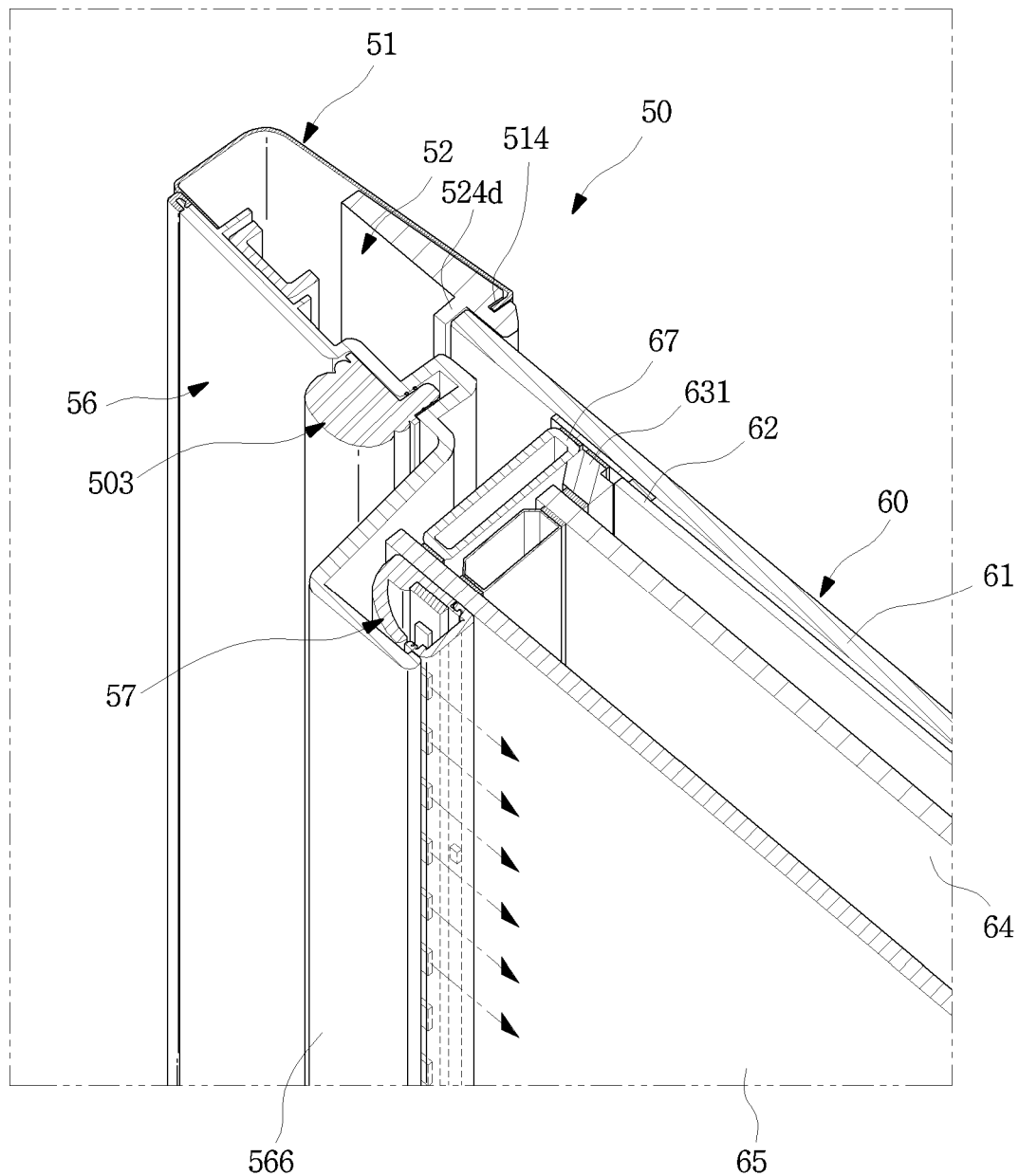
FIG. 36 is a cross-sectional view taken along line 36-36' of FIG. 10.

FIG. 34 is a transversely cross-sectional view of the refrigerating compartment door. FIG. 35 is a sectional view taken along line 35-35' of FIG. 10. Also, FIG. 36 is a cross-sectional view taken along line 36-36' of FIG. 10.

As illustrated in the drawings, in a state in which the latch 592 of the opening device 59 is inserted into the latch hole 421 of the locking unit 42, the sub door 50 may be maintained in a closed state. In this state, the door light 57 may be maintained in a turn-off state. An opened or closed state of the sub door 50 may be detected through a door switch that is separately provided.

In the turn-off state of the door light 57, the rear space of the sub door 50 may be dark, and thus, the inside of the refrigerator 1 may not be seen through the see-through part 21. Thus, in the closed state of the sub door 50, if separate manipulation is not performed, the door light 57 may be maintained in the turn-off state, and the interior of the refrigerator 1 may not be visible through the see-through part 21.

In this state, the user may manipulate the front panel 51 to turn on the door light 57. When the door light 57 is turned on, light emitted from a lighting module 575 may be emitted to positions of both rear left and right sides of the rear panel 65, which face each other.

The door light 57 may extend from the upper end to the lower end of the rear panel 65. That is, the light emitted by the door light 57 may illuminate the entire rear region of the rear panel 65 from both the left and right sides of the rear panel 65.

Here, when the display light 68 is in the turn-on state together with the door light 57, light may be emitted upward and downward by the display light 68, and thus the light may be emitted from left and right sides by the door light 57. As a result, the light may be emitted to the see-through part 21 in all directions to maximally illuminate an area of the see-through part 21.

Also, the light emitted by the door light 57 may be emitted in directions facing each other, and a surface onto which light is emitted, i.e., the light cover 574 may be disposed perpendicular to the rear panel 65. In this state, when the door light 57 is turned on to emit light, the light cover 574 may be exposed when viewed from the outside.

The lighting module 575 may be disposed in parallel to the rear panel 65, and the light cover 574 may be disposed perpendicular to the rear panel 65. Thus, the light emitted from the lighting module may be reflected by the reflection surface 573 to proceed to the light cover 574 so that the light emitted from the lighting module 575 is emitted to the rear panel 65.

In the indirect emission manner as described above, a phenomenon in which the portion locally brightened by the second LEDs 575a when the user sees the see-through part 21 in the state in which the door light 57 is turned on is formed in a droplet shape on the light cover 574 may be prevented. That is, the surface of the light cover 574 seen through the see-through part 21 is in an evenly bright state, and thus, the same effect as the surface emission may be expected.

The door light 57 may emit light in directions facing each other in a state of being close to the rear panel 65. The light emitted by the door light 57 may brighten up an inner case of the accommodation case 43 and also illuminate the front region over the rear panel 65. Thus, the door light 57 may serve as a lighting for illuminating the inner space of the refrigerator 1, which is visible through the see-through part 21 and also serve as an auxiliary backlight for allow the display 62 to be more clearly displayed.

Figure 37:
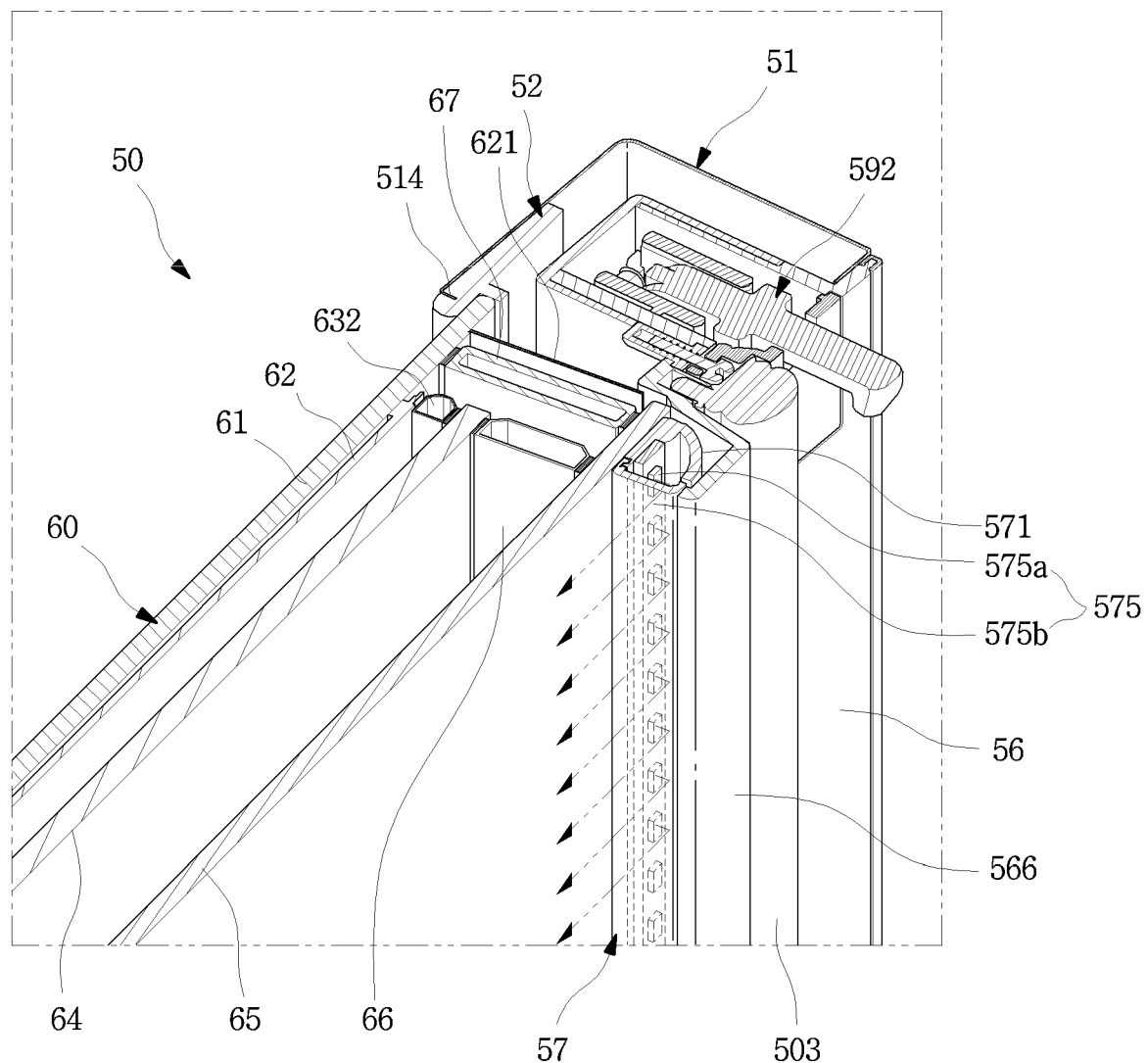
FIG. 37 is a cross-sectional view taken along line 37-37' of FIG. 11.

FIG. 37 is a cross-sectional view taken along line 37-37' of FIG. 11.

As illustrated in the drawing, an overall operation of the refrigerator 1 may be controlled by the main control unit 14. The main PCB 141 may be provided in the main control unit 14, and the main PCB 141 may be connected to the display PCB 142 to receive operation information of the transparent panel assembly 60.

Also, a plurality of constituents such as a compressor, a fan motor, a valve, and the like, which constitute a refrigeration cycle, may be connected to the main PCB 141 and controlled in operation. Also, a camera 145 for photographing the inside of the refrigerator 1 so as to utilize image information may be connected to the main PCB 141. Also, a speaker 146 for outputting a voice may be connected to the main PCB 141. Here, the speaker 146 may be connected to the main PCB 141 by wireless communication such as Bluetooth. Also, a separate communication module 147 for communication with an external device and a server may be connected to the main PCB 141.

Also, the display PCB 142 may constitute the main control unit 14 together with the adaptor 143 and be disposed on the top surface of the cabinet 10. The display PCB 142 may be configured to control the operation of the display 62. The display PCB 142 may output an image, a picture, an Internet screen, and a preset system screen through the display 62.

Also, the main control unit 14 may further include a light driver 148 for controlling an operation of the display light 68 and/or the door light 57. Here, the light driver 148 may be integrated with the display PCB 142.

The touch PCB 613 connected to the touch sensor 612, the T-CON board 623 connected to the display 62, and the light PCB 683 connected to the display light 68 may be provided in the sub door 50. Also, each of the touch PCB 613, the T-CON board 523, and the light PCB 683 may have a structure that is connected to the display PCB 142 by passing through the sub door 50.

In this structure, the selective viewing and screen output of the inside of the refrigerator through the transparent panel assembly 60 may be enabled by combination of the operations of the display 62, the display light 68, and the door light 57.

Hereinafter an operation of the refrigerator having the above-described structure will be described.

Figure 38:
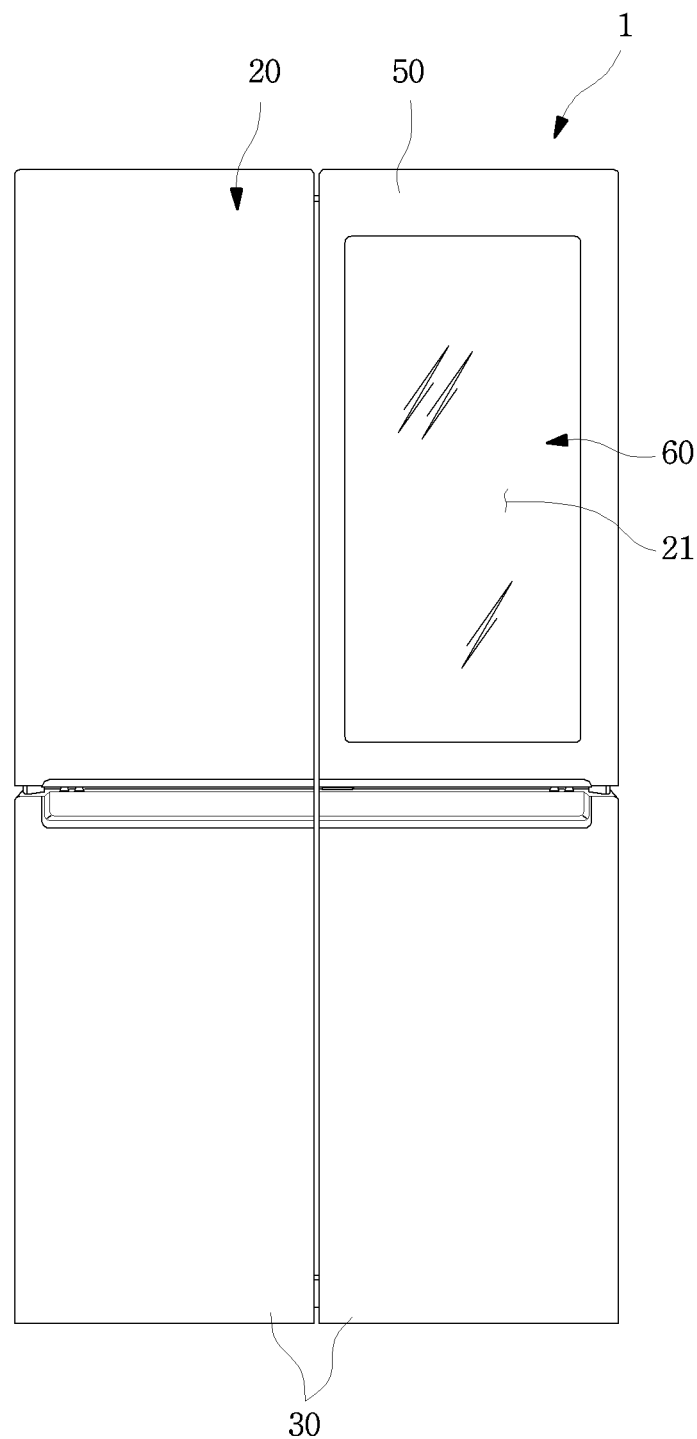
FIG. 38 is a front view when the refrigerator is in an opaque mode.

FIG. 38 is a front view when the refrigerator is in an opaque mode.

As illustrated in the drawing, the refrigerator 1 may operate in an opaque mode in which the inside of the accommodation case 43 is invisible when viewed from the outside by the user's manipulation.

The user may touch the front panel 51 to be converted into the opaque mode. Also, the refrigerator 1 may automatically operate in the opaque mode when a predetermined time elapses without a separate input in the closed state of the sub door 50.

In the opaque mode, since the inside is not seen through the see-through part 21, the overall outer appearance may be clearly seen, and the see-through part 21 may be expressed in a black color to form a portion of the front surface of the refrigerator 1 in which the inside of the refrigerator 1 is not viewed.

In this state, it may mean a standby state in which the user does not use the refrigerator 1 and does not perform an external operation from the outside. Also, this state may include a state in which an opaque screen is outputted through the transparent panel assembly 60.

Figure 39:
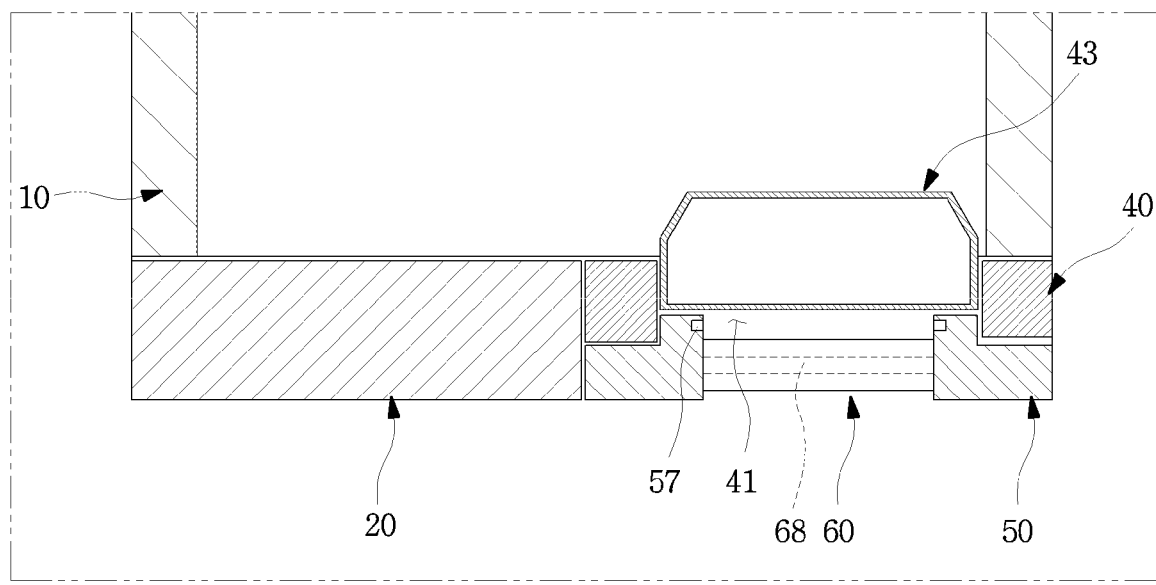
FIG. 39 is a transversely schematic cross-sectional view illustrating an example of a turn-on state when the refrigerator is in the opaque mode.

FIG. 39 is a transversely schematic cross-sectional view illustrating an example of a turn-on state when the refrigerator is in the opaque mode.

As illustrated in the drawing, in the opaque mode, both the door light 57 and the display light 68 may be turned off. That is, the screen may not be outputted on the see-through part 21 in the state in which all of the door light 57 and the display light 68 are turned off.

When all of the door light 57 and the display light 68 are turned off, the rear region of the sub door 50, i.e., the inside of the accommodation case 43 may not be visible through the see-through part 21.

Also, since power consumption of the refrigerator 1 is minimized when all of the door light 57 and the display light 68 are turned off, in the case in which it is not necessary to check the internal state, it is desirable to maintain such a state to reduce the power consumption.

However, in the state in which all of the door light 57 and the display light 68 are turned off, when the transparent panel assembly 60 is blocked to be completely invisible by 100%, the inner space of the accommodation case 43 may be blurredly seen when a portion of external light is penetrated into the refrigerator, or the user the inside of the refrigerator at a position that is very close to the see-through part 21. Alternatively, in this state, the see-through part 21 may be opaque at the manipulation distance of a general refrigerator, and in fact, the inside of the accommodation case 43 may be invisible.

Figure 40:
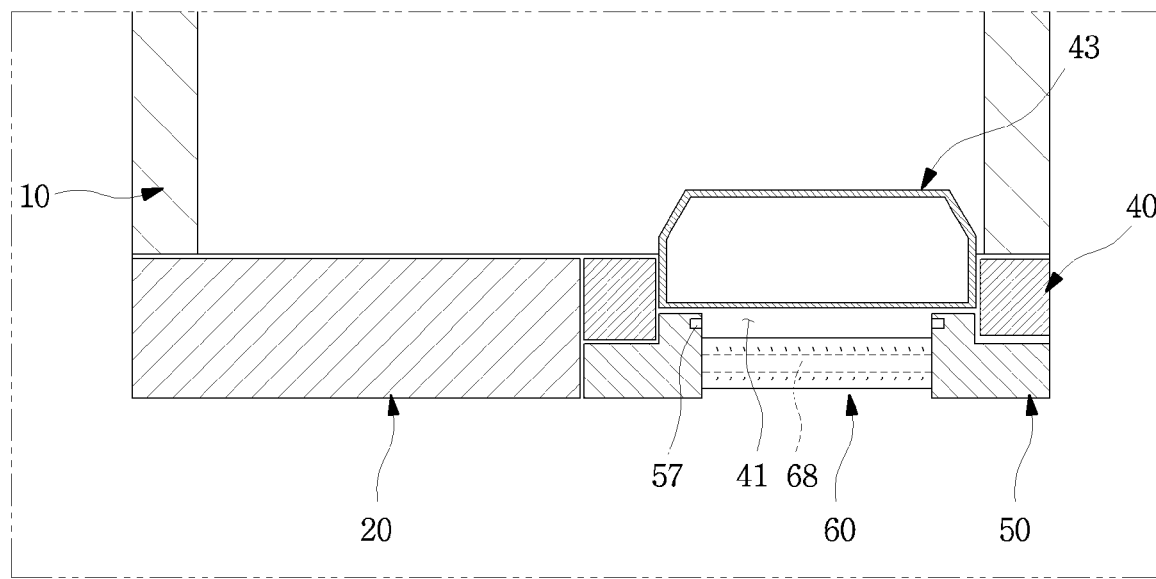
FIG. 40 is a transversely schematic cross-sectional view illustrating another example of a turn-on state when the refrigerator is in the opaque mode.

FIG. 40 is a transversely schematic cross-sectional view illustrating another example of a turn-on state when the refrigerator is in the opaque mode.

As illustrated in the drawing, in the opaque mode, the door light 57 may be turned off, and the display light 68 may be turned on. That is, although the display light 68 may be turned on, a black color or another dark color may be outputted on the display 62 so that the inside of the accommodation case 43 is not visible through the see-through part 21.

In this state, the display light 68 may be turned on to illuminate the display 62 and output a screen to the outside. Here, if the outputted screen is black monochrome, the display 62 may be seen as the black color as a whole. Thus, the display 62 having the black color may be seen only when viewing the see-through part 21 from the outside, and the inside of the accommodation case 43 may not be visible.

In FIGS. 39 and 40, the inner space of the accommodation case 43 may be actually invisible through the see-through part 21 in a normal use state because of the opaque state. However, in FIG. 40, the see-through part 21 may have a completely black color so that the inside of the accommodation case 43 is completely invisible through the see-through part 21. Also, the inner space of the accommodation case 43 may not be visible when the display 62 outputs a dark color but the black color.

In the case of FIG. 40, even in the opaque mode, since the display light and the display are turned on, there is a disadvantage in that more power is consumed compared to the state shown in FIG. 39.

However, as illustrated in FIG. 40, when the display light 68 is turned on, heat may be generated at the portion at which the display unit 68 is disposed. That is, when the display light 68 is driven, dew condensation may be prevented from occurring on the upper and lower ends of the transparent display 62 by the generated heat.

Thus, to prevent the dew condensation from occurring, the display light 68 may be turned on, and the display 62 may output the block color so that the see-through part 21 is opaque. Also, to improve the power consumption, the display light 68 may be periodically turned on. In this case, the state of FIG. 39 and the state of FIG. 40 may be alternately and repeatedly performed.

Also, while the display 62 outputs the black color, even though the door light 57 as well as the display light 68 is turned on, the see-through part 21 may be opaque due to the screen outputted on the display 62. Thus, this state may be a state in which all of the display light 68 and the door light 57 are turned on. In this case, both left and right ends of the transparent panel assembly 60 may be heated by the heat generated when the door light 57 is driven. Thus, the whole of the circumference of the see-through part 21 may be heated to effectively prevent the dew condensation from occurring.

Figure 41:
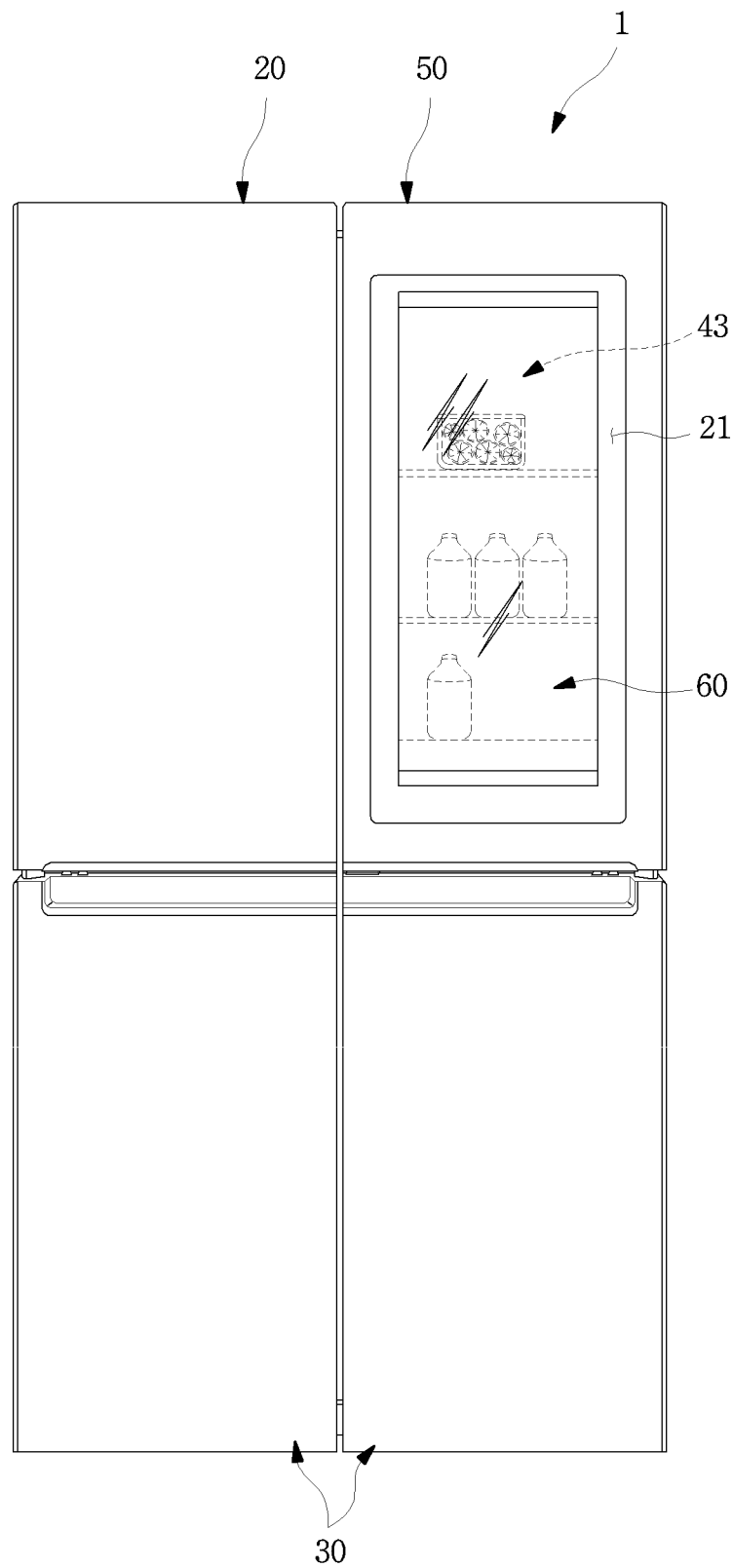
FIG. 41 is a front view when the refrigerator is in a transparent mode.

FIG. 41 is a front view when the refrigerator is in a transparent mode.

As illustrated in the drawing, the refrigerator may be converted into the transparent mode, in which the inside of the see-through part 21, i.e., the inner space of the accommodation case 43 is visible through the see-through part 21, by the user's manipulation.

In the transparent mode, since the inside of the accommodation case 43 is visible through the see-through part 21, the user may confirm foods accommodated in the accommodation case 43 from the outside.

After the user grasps the location and type of the foods from the outside, the user may quickly take out the desired food after opening the sub door 50, and an operation for storing other foods may be enabled.

In the transparent mode, the space behind the transparent panel assembly 60 may be illuminated to allow the see-through 21 to be visible. The transparent mode may be implemented in various forms according to the brightness of the inside of the refrigerator, which is visible through the see-through part 21.

Figure 42:
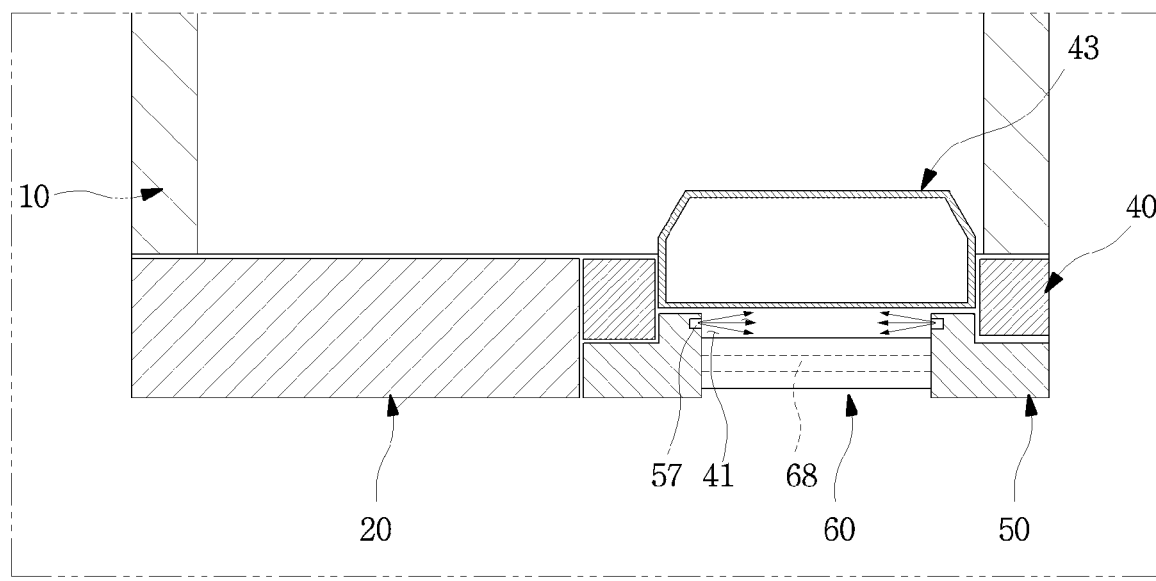
FIG. 42 is a transversely schematic cross-sectional view illustrating an example of a turn-on state when the refrigerator is in the transparent mode.

FIG. 42 is a transversely schematic cross-sectional view illustrating an example of the turn-on state when the refrigerator is in the transparent mode.

As illustrated in the drawing, when the refrigerator 1 is in the transparent mode, the door light 57 may be turned on, and the display light 68 may be turned off. In this state, the rear side of the sub door may be illuminated by the door light 57.

The inside of the accommodation case 43 may be illuminated by the light emitted from both sides of the rear surface of the sub door 50. Thus, when the see-through part 21 is viewed from the outside, the see-through part 21 may be clearly seen.

In this state, since the display light 68 is turned off, only the inside of the accommodation case 43 may be illuminated. Thus, the portion of the transparent panel assembly 60 inside the sub door 50 viewed from the outside may not be in the illuminated state. Thus, the see-through part 21 may be transparent so that the inside thereof is visible and also may be in a relatively dark state.

Figure 43:
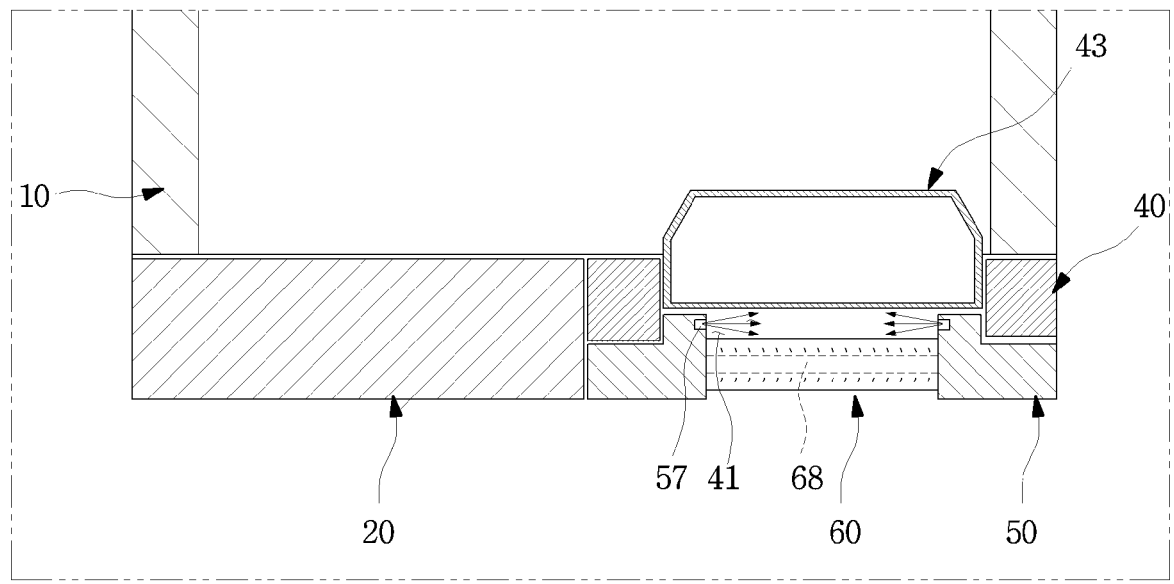
FIG. 43 is a transversely schematic cross-sectional view illustrating another example of a turn-on state when the refrigerator is in the transparent mode.

FIG. 43 is a transversely schematic cross-sectional view illustrating another example of the turn-on state when the refrigerator is in the transparent mode.

As illustrated in the drawing, when the refrigerator 1 is in the transparent mode, all of the door light 57 and the display light 68 may be turned on. In this state, the rear side of the sub door 50 may be illuminated by the door light 57, and simultaneously, the transparent panel assembly 60 itself may be illuminated by the display light 68.

The inside of the accommodation case 43 may be illuminated by the light emitted from both sides of the rear surface of the sub door 50. In addition, the see-through part 21 may be more illuminated by the emission of the light guide plate 64. Here, the display 62 may not output a separate screen because of the turned-off state.

Thus, when the see-through part 21 is viewed from the outside, the see-through part 21 may be clearly seen, and also, the transparent panel assembly 60 may be in the illuminated and clear state by the emission of the light guide plate 64. Although the brightness of the see-through part 21 itself more increases, since the see-through part 21 is visible through the light guide plate 64, the inner space of the accommodation case 43 may be somewhat blurred.

In FIGS. 42 and 43, the see-through part 21 may be transparent, and thus, the inside of the refrigerator may be visible. However, in the state of FIG. 42, the see-through part 21 may be clearly seen in the relatively dark state. On the other hand, in the state of FIG. 43, the see-through part 21 may be blurred in the relatively bright state. Such brightness and visibility may be selected according to the user's preference.

Figure 44:
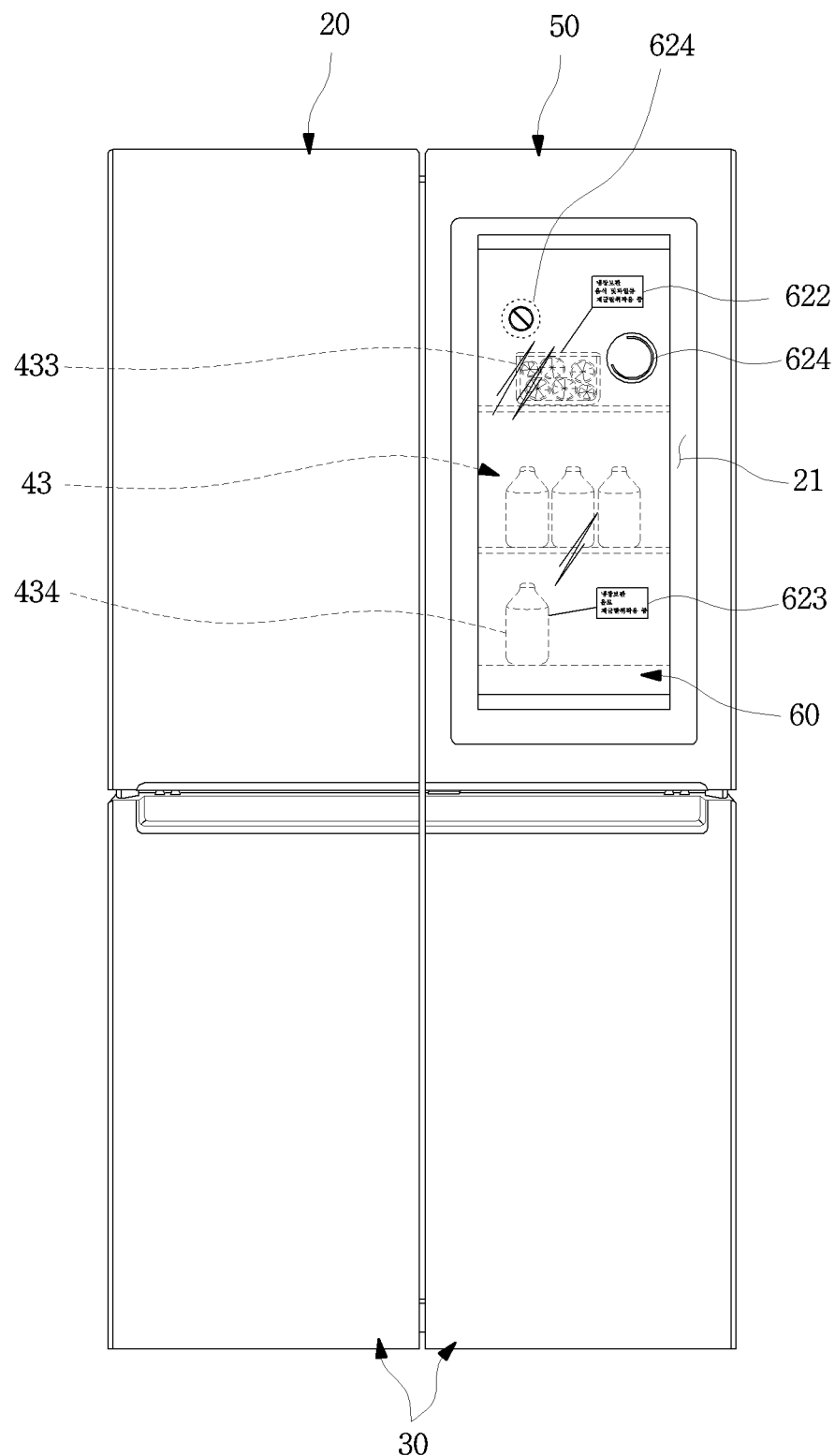
FIG. 44 is a front view when the refrigerator is in a transparent output mode.

FIG. 44 is a front view when the refrigerator is in a transparent output mode.

As illustrated in the drawing, the refrigerator 1 may operate in a transparent output mode in which a screen is outputted while the inner space of the accommodation case 43 is visible through the see-through part 21.

In the transparent output mode, the door light 57 may be turned on so that the inner space of the accommodation case 43 is visible, and the display light 68 may also be turned on for the output of the screen on the display 62. That is, as illustrated in FIG. 43, the display 62 may output the screen in the state in which all of the door light 57 and the display light 68 are turned on.

In this state, the foods stored in the accommodation case 43 may be visible, and also, information may be outputted on the display 62. Thus, the screen linked with the foods stored in the accommodation case 43 may be outputted by using the see-through part 21 to realize augmented reality.

For example, as illustrated in FIG. 44, information of the corresponding food may be displayed at a specific position in a state in which the foods stored in the accommodation case 43 is visible through the sight portion 21.

When the fruit 433 is stored in the accommodation case 43, a separate window 622 may be outputted on the display 62 at a position corresponding to the storage position of the fruit 433 to display various pieces of information such as a time limit, a recipe using fruits, and the like together with the fruit 433 stored through the see-through part 21.

Also, when a beverage 434 is stored, a separate window 623 may be displayed on the display 62 at a position corresponding to the beverage 434 to display a type of beverage 434 and an expiration date and a message to be transmitted to other users with the information of the beverage 434. For example, a message such as "Do not drink beverage of daddy" may be directly inputted through the touch of the see-through part 21 and then inputted to the corresponding screen.

Also, the display 62 may also output the window 624 for displaying other information that is not related to the stored fruit 433 or beverage 434. A general memo, a notice, or the like may be outputted on the window 624.

The outputted windows 622, 623, and 524 may move and be edited by the user's touch operation. Also, the food information outputted through the see-through part 21 may be inputted by a short distance communication, bar code, or QR code method or may be inputted by using the touch input function of the transparent panel assembly 60 itself. Various input methods through the front panel 61 such as a touch pen or a virtual keyboard may be used for the input method through the transparent panel assembly 60. Also, the inputting of the food information outputted through the see-through part 21 may be freely inputted and processed by a terminal or a PC connected to the communication module 147 through communication.

Figure 45:
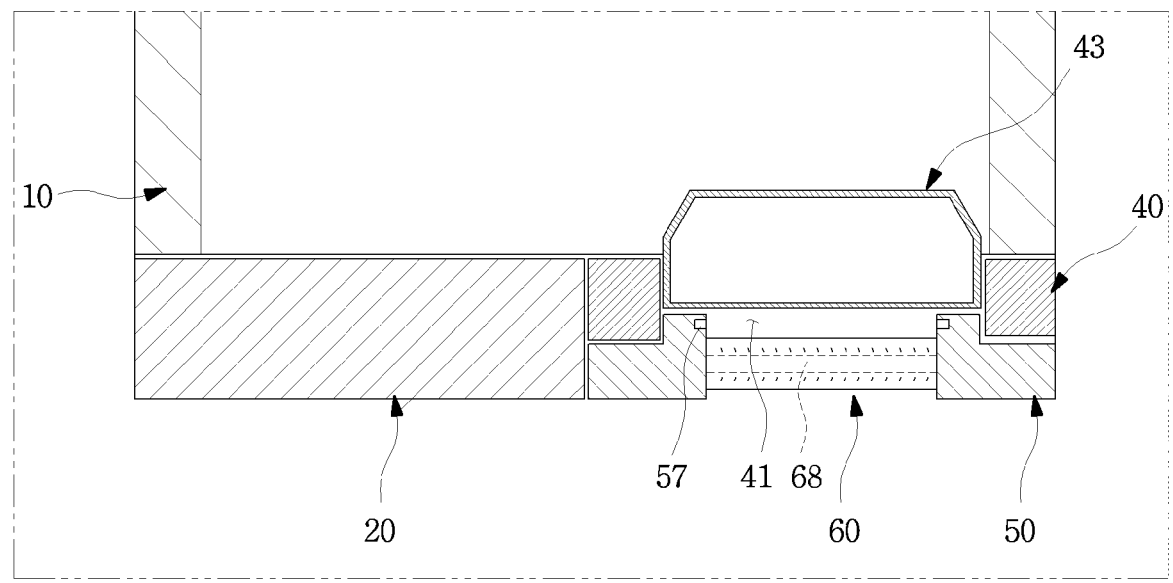
FIG. 45 is a transversely schematic cross-sectional view a turn-on state when the refrigerator is in a screen output mode.
Figure 46:
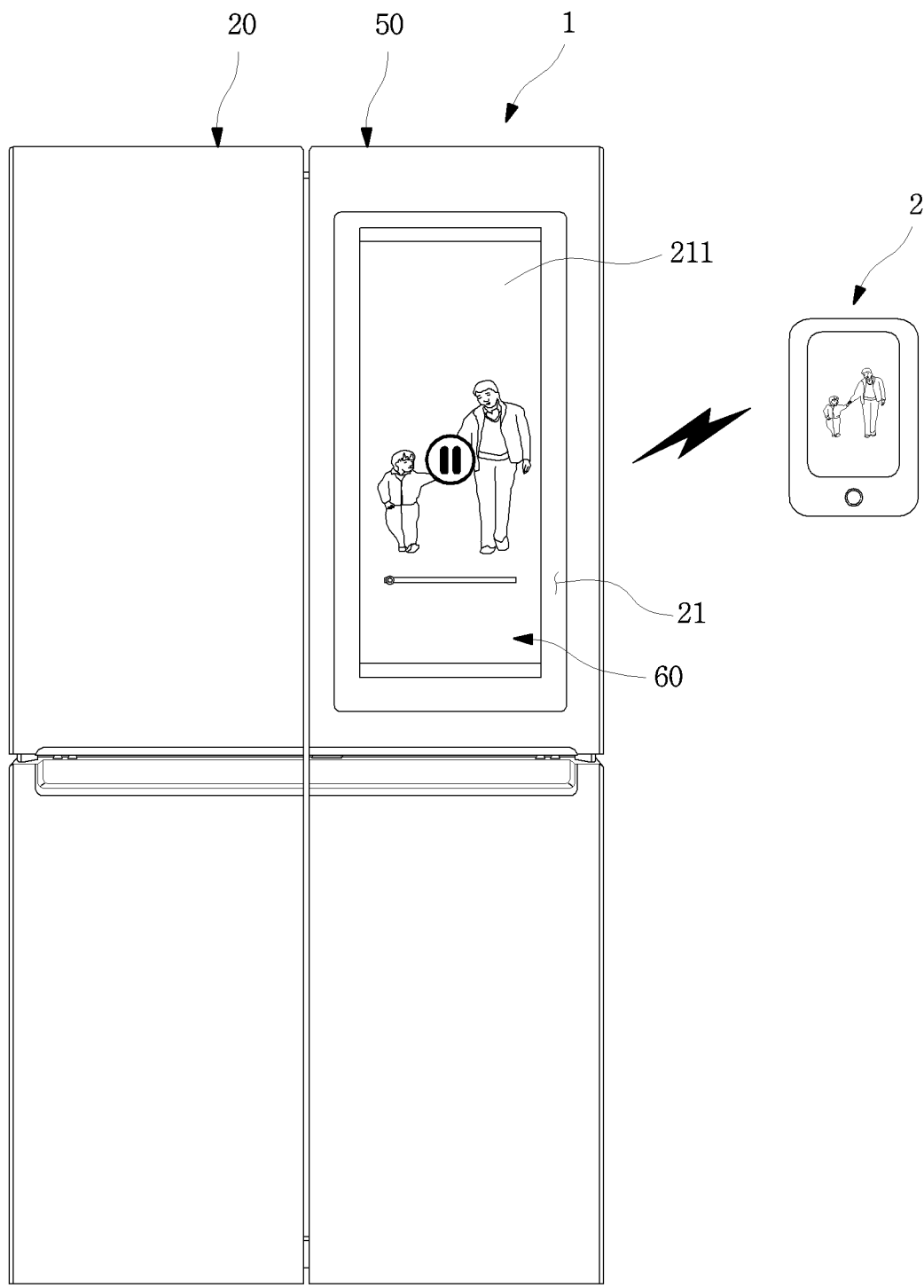
FIG. 46 is a front view of the refrigerator in a state in which an image is played in the screen output mode.

FIG. 45 is a transversely schematic cross-sectional view the turn-on state when the refrigerator is in a screen output mode. FIG. 46 is a front view of the refrigerator in a state in which an image is played in the screen output mode.

As illustrated in the drawings, the refrigerator may operate in the screen output mode in which a screen is outputted on a screen through the see-through part 21. The screen output mode may display a screen 211 outputted from the display 62 in a state in which the inside of the accommodation case 43 is not visible through the see-through part 21.

For the screen output mode, the display light 68 may be turned on, and the display 62 may output the screen in the state in which the door light 57 is turned off. Thus, the inner space of the accommodation case 43 may be a dark state and may not be visible through the see-through part 21. As a result, the screen 211 outputted from the display 62 by the emission of the light guide plate 64 may be clearly seen through the see-through part 21. The see-through part 21 may be used as a display 62 for displaying the screen 211 without visualizing the inside of the accommodation case 43.

As illustrated in FIG. 46, the screen 211 outputted through the see-through part 21 may output an image. The image may be an image on the communication module 147 and a portable terminal 2 or a remote PC by near field communication such as Internet or Zigbee, WiFi, NFC, or the like.

For example, an image stored in the user's portable telephone or the image being reproduced may be transmitted to the refrigerator 1 through the communication with the communication module 147 of the main control unit 14 and also be visible through the screen 211. Alternatively, the output image may be an image stored in the main control unit 14, or a separate storage device may be connected to the main control unit 14 to output the image stored in the storage device.

Hereinafter, various examples of screens outputted on the see-through part 21 in the screen output mode will be described.

Figure 47:
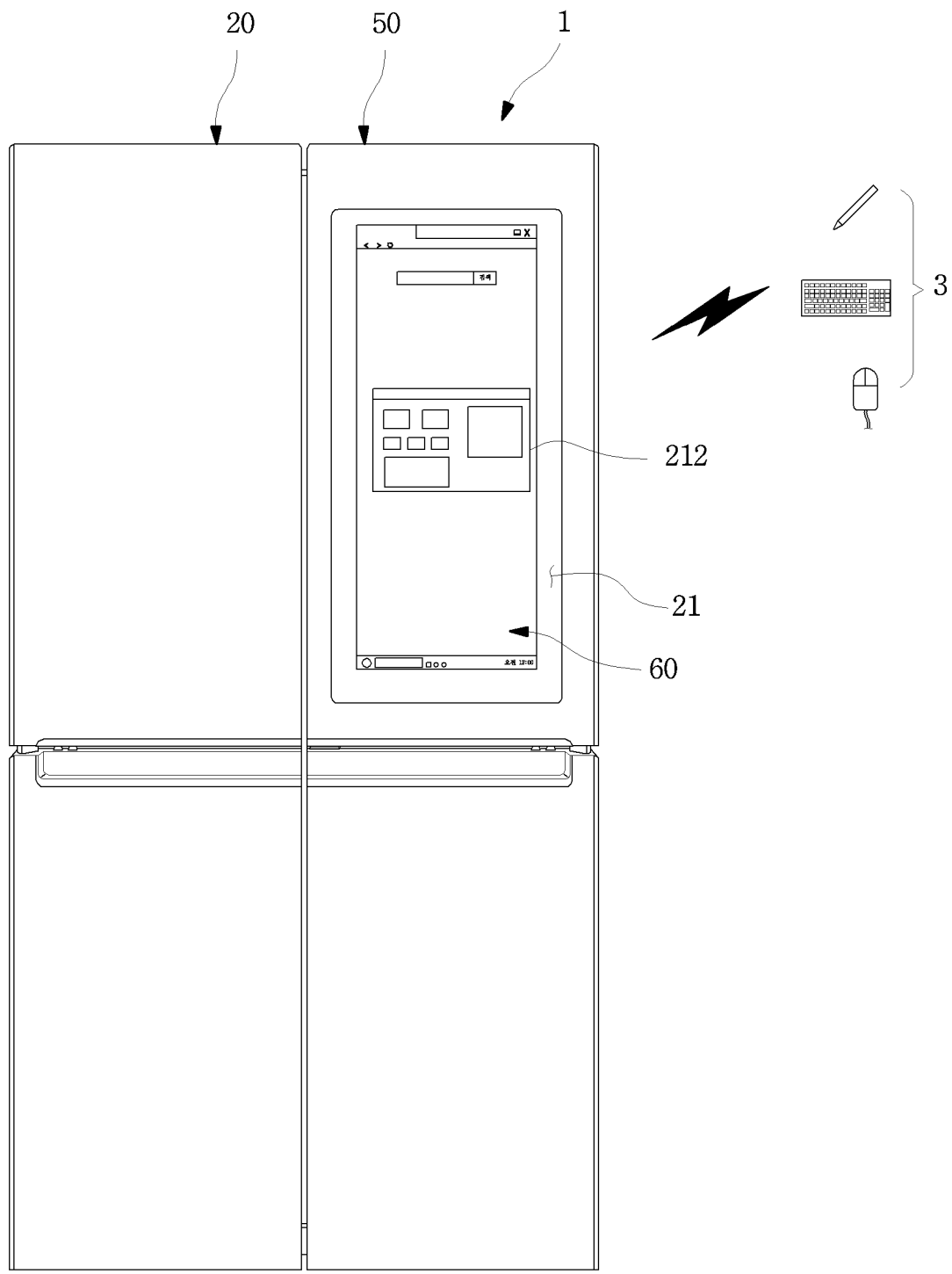
FIG. 47 is a front view of the refrigerator in a state in which an Internet connection page is shown in the screen output mode.

FIG. 47 is a front view of the refrigerator in a state in which an Internet connection page is shown in the screen output mode.

As illustrated in the drawing, in the screen output mode, the see-through part 21 may output an Internet screen 212. The Internet screen 212 may be outputted through a general PC or a portable terminal and may be outputted from the entire see-through part 21 or at least a portion of the see-through part 21.

The Internet screen 212 outputted through the see-through part 21 may be selected by the user's manipulation of the front panel 61 and may be connected to an input device 3 such as an external keyboard or a mouse by the wireless communication and then manipulated to be selected.

Figure 48:
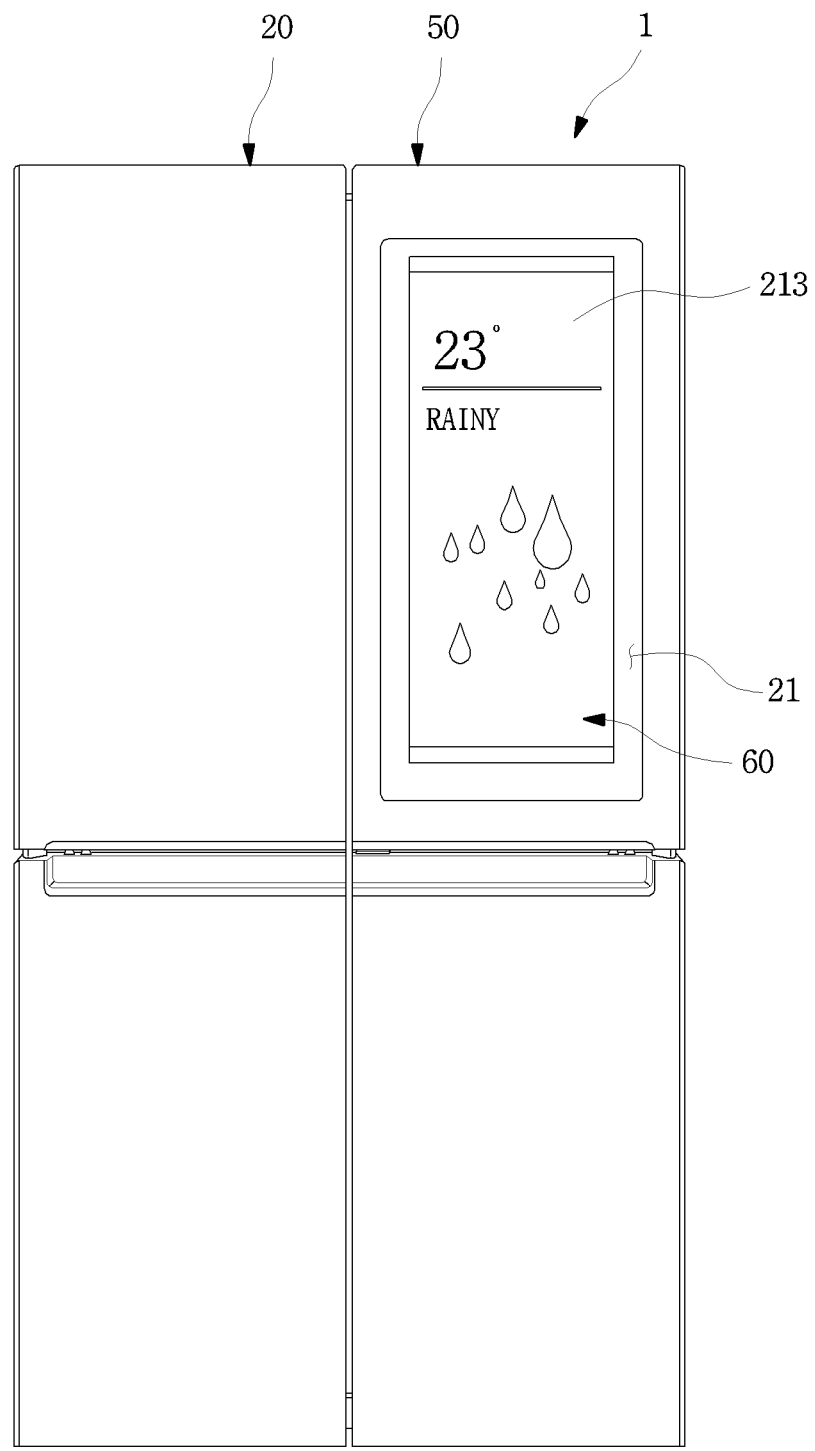
FIG. 48 is a front view of the refrigerator in a state in which a standby screen is outputted in the screen output mode.

FIG. 48 is a front view of the refrigerator in a state in which a standby screen is outputted in the screen output mode.

As illustrated in the drawing, in the screen output mode, the see-through part 21 may output a standby screen. The standby screen 213 may output an item set by the user on the screen displayed on the refrigerator 1 without any additional operation.

For example, general life information such as weather and temperature may be outputted, or a user-specified photograph may be output. A black screen may be outputted to prevent dew condensation from occurring on the see-through part 21.

The standby screen 213 may be periodically displayed to reduce power consumption, or the standby screen 213 and the opaque mode may be repeatedly and alternately realized.

Figure 49:
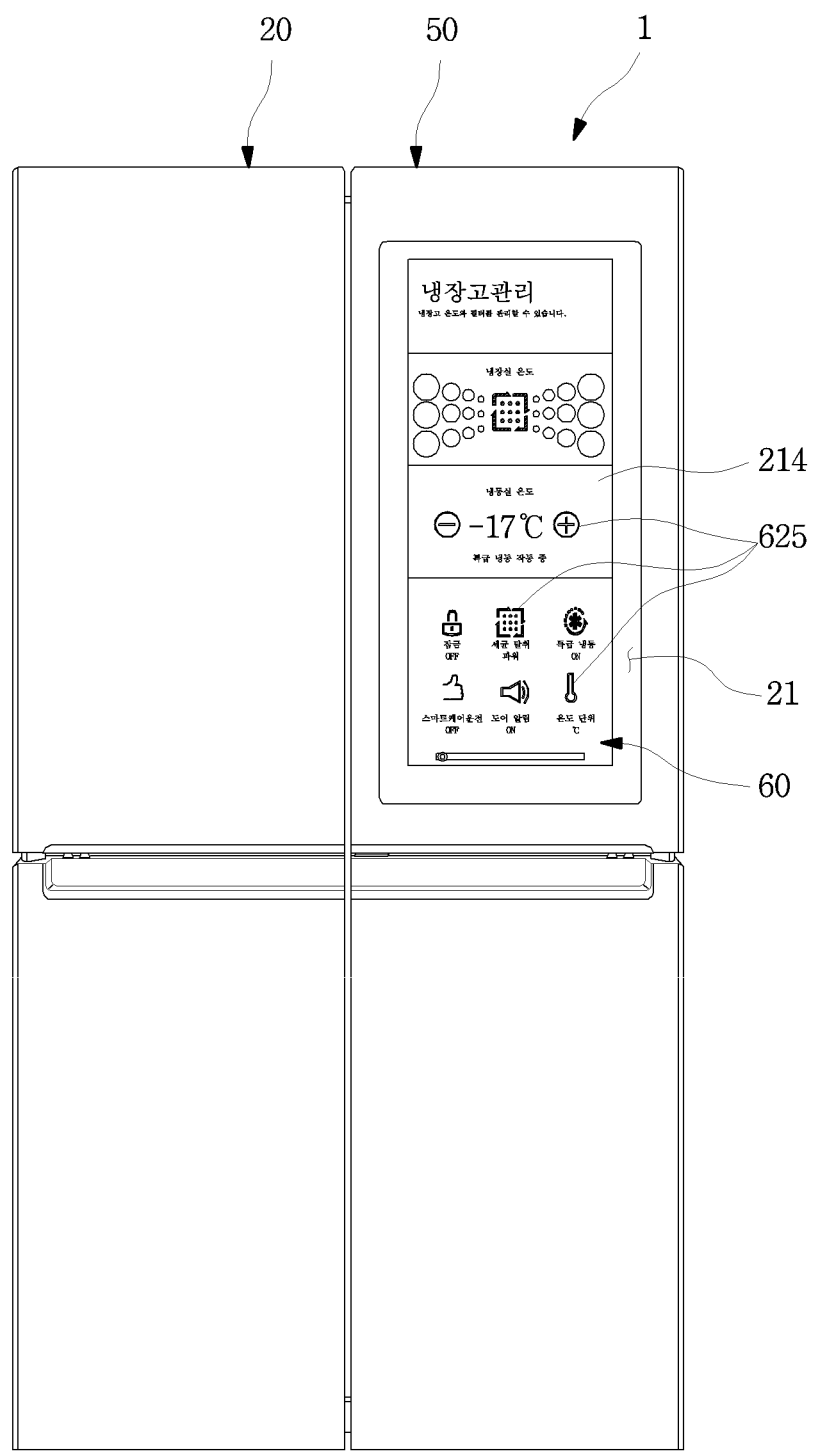
FIG. 49 is a front view of a state in which a refrigerator manipulation screen is outputted when the transparent display is in a screen output state.

FIG. 49 is a front view of a state in which a refrigerator manipulation screen is outputted when the transparent display is in a screen output state.

As illustrated in the drawing, in the screen output mode, a manipulation screen 214 for manipulating a general refrigerator may be outputted on the see-through part 21.

A separate button for displaying or manipulating may not be provided on the refrigerator 1, and an operation of the refrigerator 1 may be displayed through the see-through part 21 so that the see-through part 21 is touched to manipulate the operation of the refrigerator 1.

The temperature information and various functions of the refrigerator 1 may be displayed on the see-through part 21 and may be displayed in the form of an icon 625 so that the user performs the touch operation. Also, more information may be displayed through screen switching.

Figure 50:
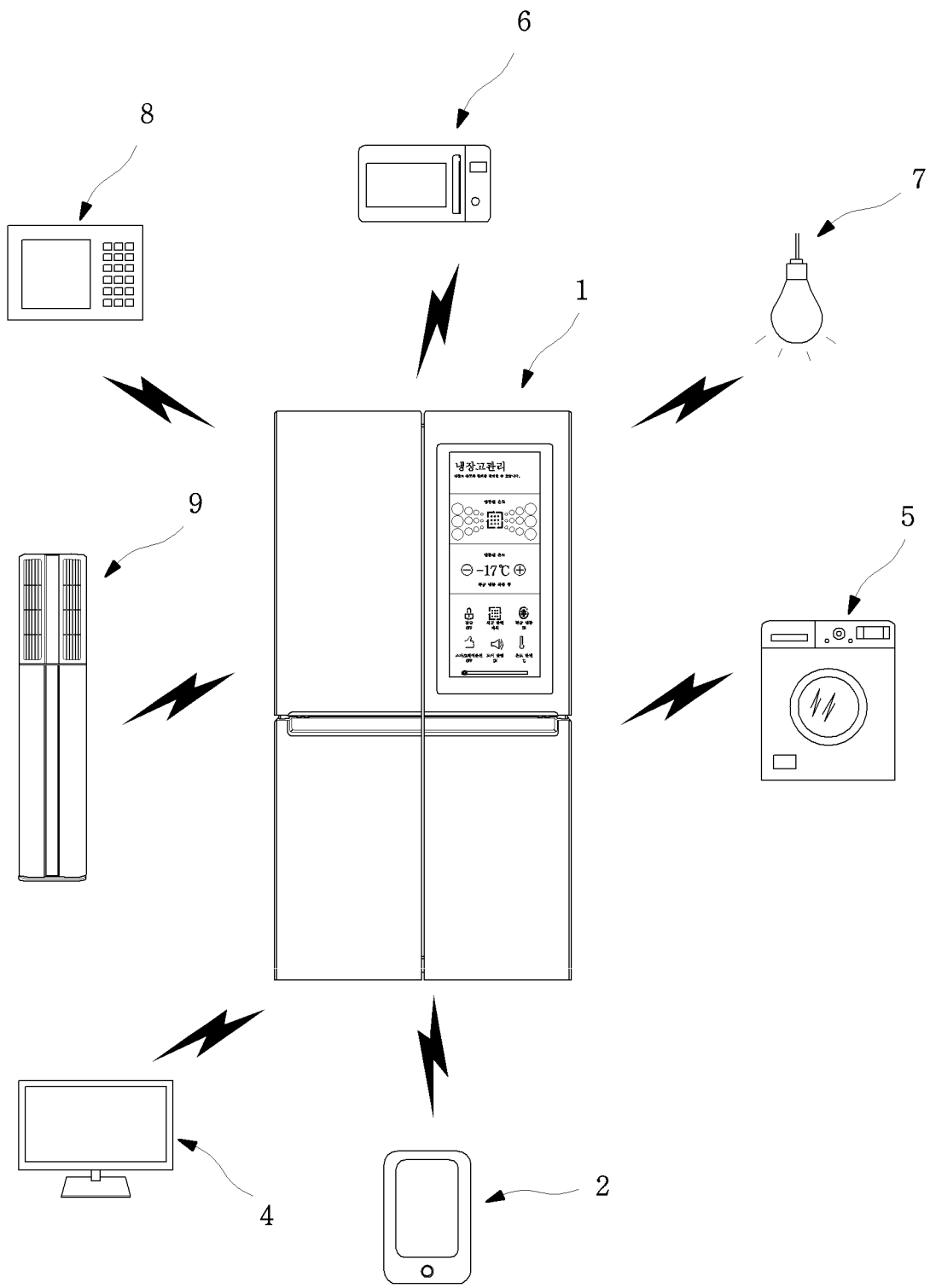
FIG. 50 is a schematic view of a home network constituted by using the refrigerator.

FIG. 50 is a schematic view of a home network constituted by using the refrigerator.

As illustrated in the drawing, the refrigerator 1 may constitute a home network with other electronic devices in the home.

The refrigerator 1 may be in a state in which the refrigerator communicates with other home appliances by the communication module 147. Thus, the manipulation screen 214 outputted through the see-through part 21 of the sub door 50 may output states of other home appliances connected to the communication module 147 of the refrigerator 1 or smart devices in the home in addition to the operation state and manipulation of the refrigerator 1. Also, operations of the electronic devices in the home may be controlled through the see-through part 21.

That is, since the refrigerator 1 is in a state of being supplied with power for 24 hours due to the characteristics in its use, the refrigerator 1 may function as a main controller of the home network. That is, the refrigerator 1 may be connected to the electronic device in the home to control an operation of each of the electronic devices, output states of the electronic devices, and process and output the related information.

For example, the refrigerator 1 may reserve a set operation at a designated time from the on/off of a television 4, a washing machine 5, a cooling appliance 6 such as microwave oven, a lighting 7, and the like, may be connected to an interphone 8 to open and close a door or a window, and may display a temperature or a degree of air pollution in the room to drive an air conditioner 9.

The manipulation screen 214 may be set as the standby screen and may be switched by a user's manipulation in a state of outputting another screen by the see-through part 21.

In addition to the first embodiment of the present inventions, various embodiments may be exemplified. Hereinafter, other embodiments of the present invention will be described with reference to the accompanying drawings. Since other embodiments of the present invention are the same as the first embodiment of the present invention except for some configurations, detailed description of the same configuration will be omitted, and also, the same configuration will be denoted by the same reference numerals.

Figure 51:
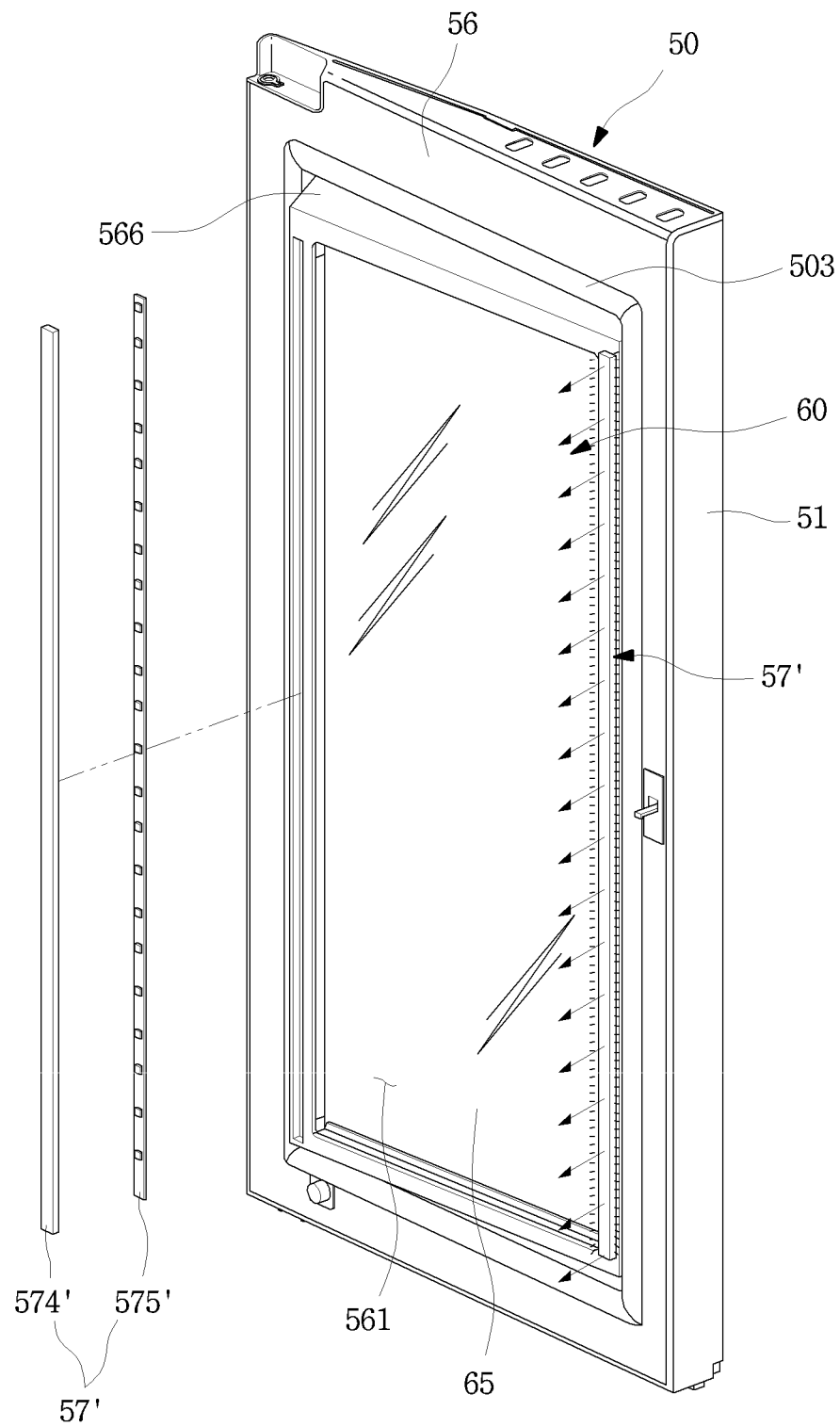
FIG. 51 is a perspective view of a sub door when viewed from a rear side according to a second embodiment of the present invention.

FIG. 51 is a perspective view of a sub door when viewed from a rear side according to a second embodiment of the present invention.

The second embodiment of the present invention will be the same as the foregoing first embodiment except for only a door light disposed in a sub door.

Referring to the drawing, a sub door 50 may be constituted by coupling a front panel 61 and a rear panel 65. A transparent panel assembly 60 may provide a see-through part 21 in a state of being mounted on the sub door 50, and a screen may be outputted through a display 62.

A liner opening 561 may be defined in a door liner 56, and a liner protrusion 566 may protrude along the liner opening 561. Also, a liner protrusion 566 contacting a main door 40 to seal a space between the main door 40 and the sub door 50 may be disposed on a circumference of the liner protrusion 566.

A door light 57' may be disposed on a rear surface of the liner protrusion 566. The door light 57' may be disposed on each of both left and right sides of a rear end of the liner protrusion 566. The door light 57' may extend from an upper end to a lower end of the liner protrusion 566. Also, as necessary, the door light 57' may be disposed along a circumference of the liner protrusion 566.

The door light 57' may emit light to a rear side of the liner protrusion 566 to illuminate the inside of an accommodation case 43. The door light 57' may concentratedly illuminate the accommodation case 43 rather than the above-described door light 57'.

Also, the door light 57' may include a lighting module 575' mounted on the liner protrusion 566 and a light cover covering the lighting module 575'. Light emitted from the lighting module 575' may pass through the light cover 574' and then be reflected and diffused to uniformly illuminate the inside of the accommodation case 43.

Figure 52:
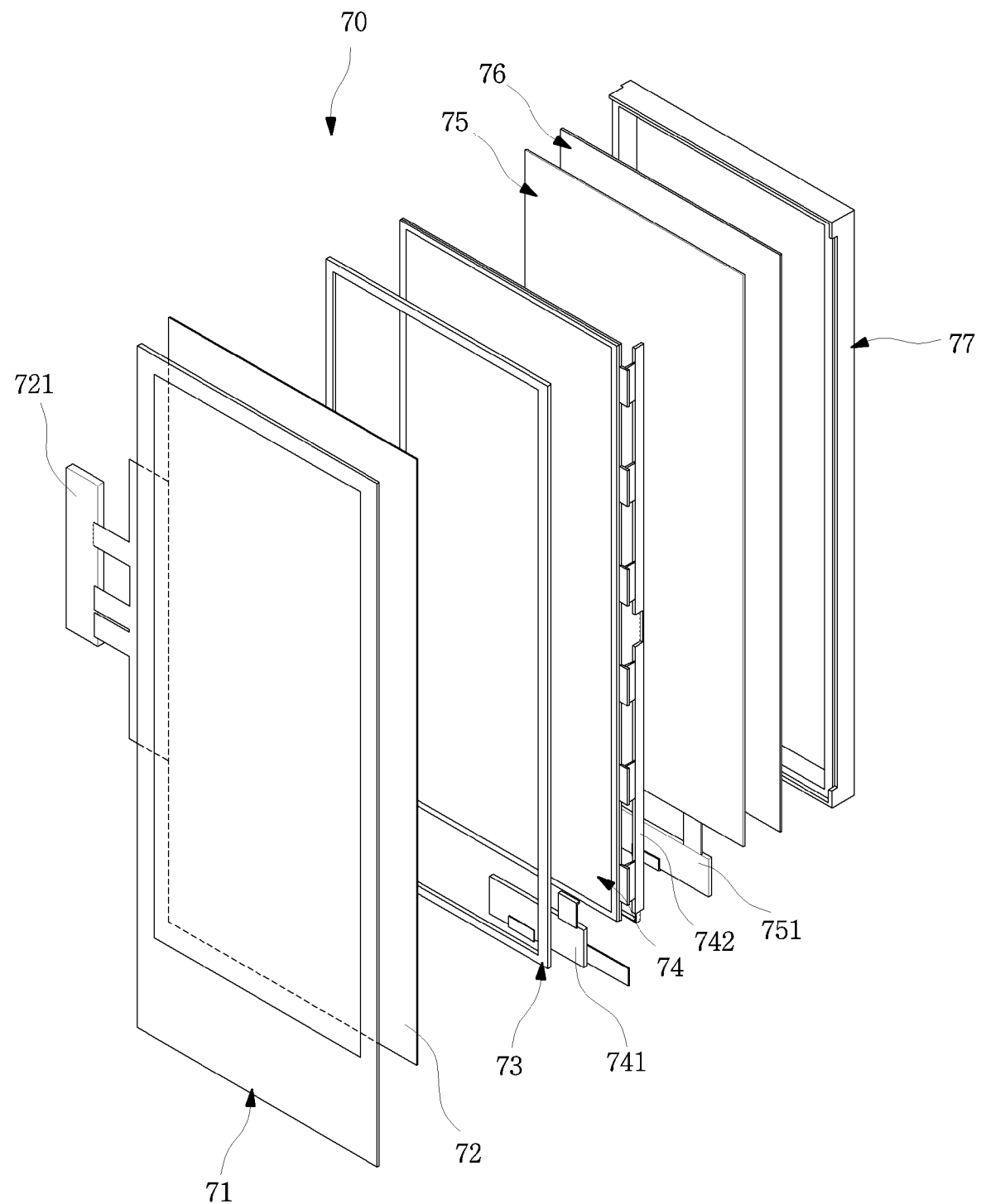
FIG. 52 is an exploded perspective view of a transparent panel assembly according to a third embodiment of the present invention.

FIG. 52 is an exploded perspective view of a transparent panel assembly according to a third embodiment of the present invention.

A third embodiment of the present invention is the same as the foregoing first embodiment except for a configuration of a transparent panel assembly.

As illustrated in the drawing, a transparent panel assembly 70 according to the third embodiment of the present invention may be mounted inside a sub door 50 to provide a see-through part 21. The see-through part 21 may include the transparent panel assembly 70. The inside of an accommodation case 43 may be visible through a see-through part 21, or an outputted screen may be displayed on the see-through part 21.

The transparent panel assembly 70 may include a front glass 71 defining an outer appearance of a front surface, a display 74 disposed at a rear side of the front glass 71, a rear glass to which a PDLC film 75 is attached to illuminate the display 74 at a rear side of the display 74, and an outer spacer 77 fixing the front glass 71, the display 74, and the rear glass 76.

In more detail, the front glass 71 may be disposed at a front side of the transparent display 74 and exposed to the outside through a see-through part 21. The front glass 71 may be provided as a blue glass, and a touch film 72 may be attached to a rear surface of the front glass 71. Thus, when a user touches the front glass 71, the front glass 71 may recognize the user's touch. Also, a touch PCB 721 may be mounted on one side of the touch film 72.

The display 74 may be mounted on the rear side of the front glass 71 to which the touch film 72 is attached. Also, the display frame 73 may be disposed between the display 74 and the front glass 71. The display frame 73 may have a rectangular frame shape disposed along a circumference of the display 74. Also, the display frame 73 may adhere between the display 74 and the front glass 71 to maintain a predetermined distance between the front glass 71 and the display 74 and support the display 74.

The display 74 may be provided as a transparent LCD display. Thus, although the display 74 does not output a screen, the inside of the refrigerator 1 may be visible through the display 94 as if glass. Also, a T-CON board 741 for controlling the display 74 may be mounted on one end of the display 74. Also, a source board 742 for outputting the display 74 may be disposed on one end of the display 74.

The rear glass 76 may define an outer appearance of a rear surface of the transparent panel assembly 70 and be exposed to the door liner 56. The rear glass 76 may be made of low-ε glass to realize thermal insulation.

The PDLC film 75 may be attached to the front surface of the rear glass 76. The PDLC film 75 may be selectively transparent or opaque according to applying of power. Thus, the user may selectively see the inside of the refrigerator according to the state of the PDLC film 75. Also, a PDLC PCB 751 may be disposed on one side of the PDLC film 75 to control an operation of the PLDC film 75.

The outer spacer 77 may define a circumferential surface of the transparent panel assembly 70. Also, the outer spacer 77 may fix the front glass 71, the display 74, and the rear glass 76 to maintain a preset space between the front glass 71, the display 74, and the rear glass 76. Also, the transparent panel assembly 70 may be fixed and mounted on a sub door 50 when the transparent panel assembly 70 is completely assembled.

Also, in a state in which the display 74 does not output a screen, and the PDLC film 75 is transparent, a see-through part 21 may be transparent. In this state, when a door light 57 is turned on, a space inside the accommodation case 43 may be visible through the see-through part 21 from the outside.

In the state in which the display 74 does not output the screen, the PDLC film 75 may be opaque. Then, the door light may also be turned off, and the see-through part 21 may be opaque. Thus, an inner space of the accommodation case 43 may be visible.

The see-through part 21 may output a screen by driving the display 74. In this case, in the state in which the door light 57 is turned on, and the PDLC film 75 is transparent, the door light 57 may serve as a backlight that illuminates the display 74 so that the display 74 is more clearly displayed.

Figure 53:
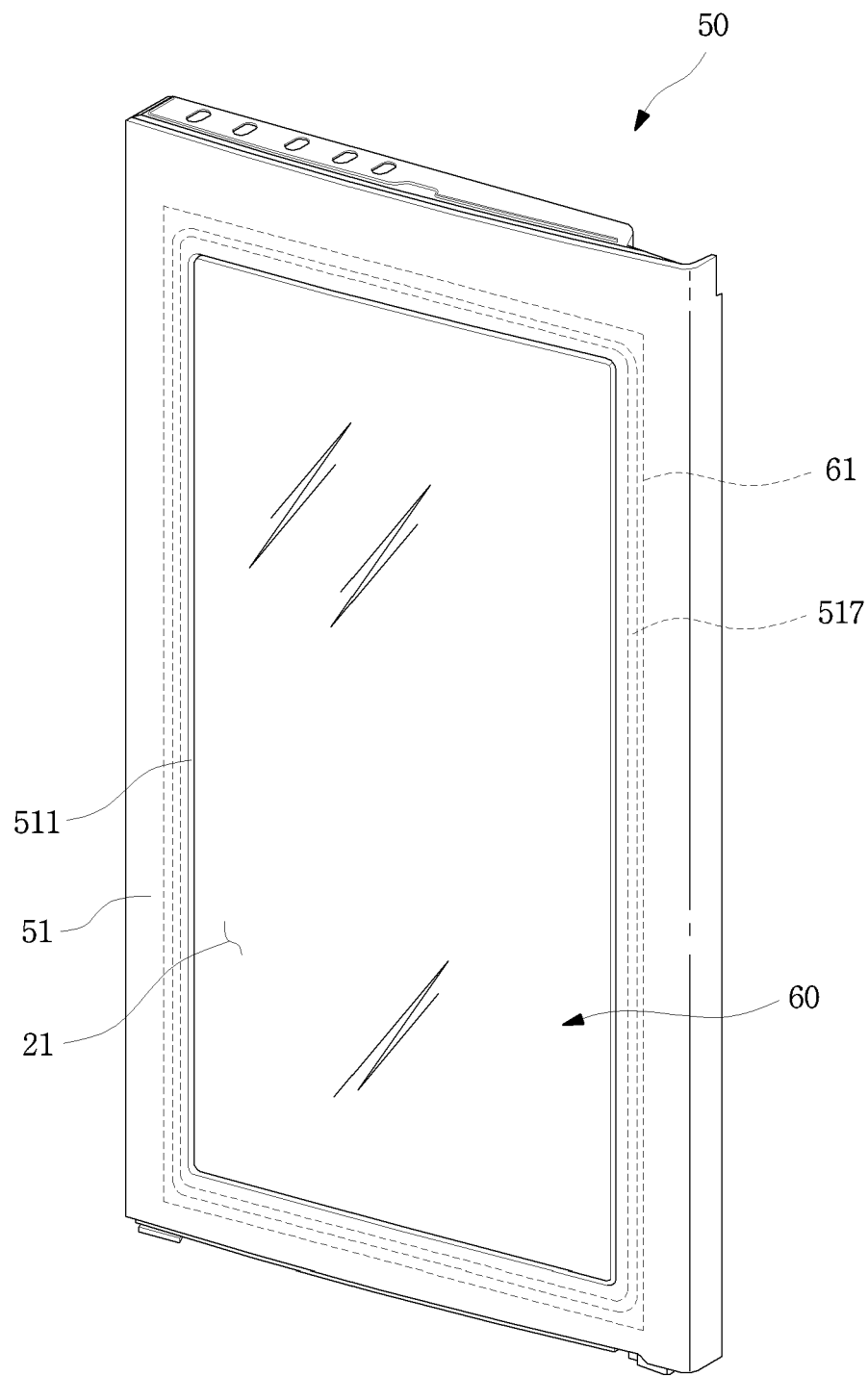
FIG. 53 is a perspective view of a sub door when viewed from a front side according to a fourth embodiment of the present invention.

FIG. 53 is a perspective view of a sub door when viewed from a front side according to a fourth embodiment of the present invention.

A fourth embodiment of the present invention is the same as the foregoing first embodiment except for only a heating member.

As illustrated in the drawing, a sub door 50 may have a plate opening 511 in an out plate 51, and a transparent panel assembly 60 may be mounted to cover the plate opening 511. Also, a front surface of the transparent panel assembly 60, which is exposed through the plate opening 511, may be defined as a see-through part 21.

Also, the inside of the refrigerator, i.e., the inside of the accommodation case 43 may be selectively visible through the see-through part 21, or a screen of the inside may be outputted according to an output of a screen on a display 62 constituting the transparent panel assembly 60 and a combination of a display light 68 and a door light 57.

In a state in which the display 62 operates, or the display light 68 and the door light 57 operate, a circumference of the transparent panel assembly 60 may be heated. Thus, dew condensation may be prevented from occurring on the circumference of the transparent panel 60, more particularly, an out plate 51 corresponding to a circumference of the see-through part 21.

However, in a state in which the display 62, the display light 68, and the door light 57 do not operate, dew condensation may occur on a front surface of the out plate 51, which corresponds to the circumference of the see-through part 21.

Thus, a heating member 517 for preventing the dew condensation from occurring on the out plate 51 may be provided in the sub door 50.

The transparent panel assembly 60 may include a front panel 61 defining a front surface thereof. The front panel 61 may have a size greater than that of a plate opening 511 and thus be supported on a rear surface of the out plate 51.

Also, the heating member 517 may be disposed on a circumference of the front panel 61 contacting the rear surface of the out plate 51. Thus, the front surface of the out plate 51, on which the dew condensation may occur, may be heated by heat of the heating member 517 to prevent the dew condensation from occurring. Various types of heaters, which are disposed between the out plate 51 and the front panel 61, such as a wire-type heating line or a film-type film heater may be used as the heating member 517.

The heating member 517 may be periodically turned on and off to prevent the dew condensation from occurring. Also, while the display 62, the display light 68, and the door light 57 operate, the heating member 517 may be turned off. When the display 62, the display light 68, and the door light 57 do not operate, the heating member 517 may be turned on.

Figure 54:
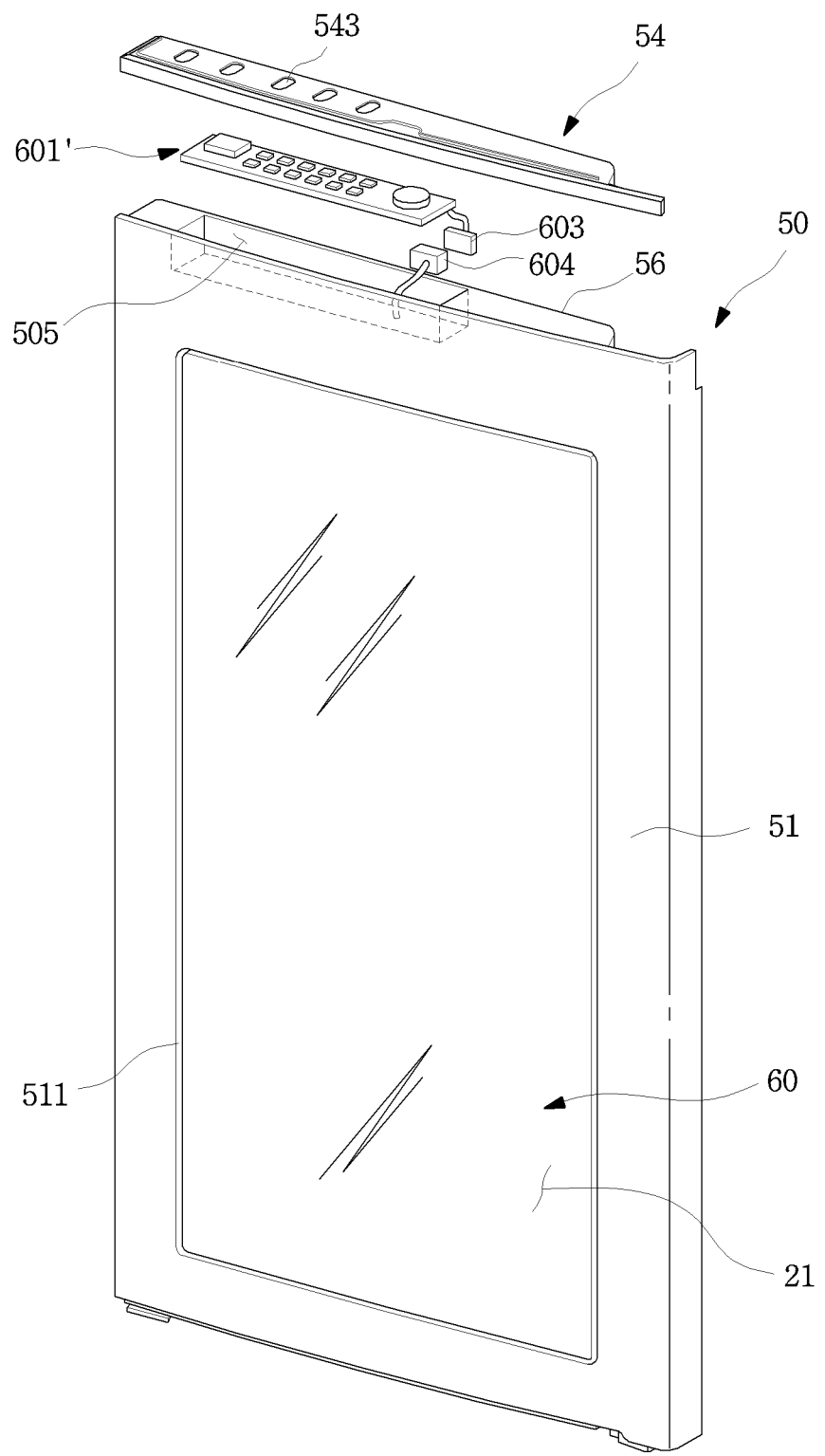
FIG. 54 is an exploded perspective view of a sub door according to a fifth embodiment of the present invention.

FIG. 54 is an exploded perspective view of a sub door according to a fifth embodiment of the present invention.

A fifth embodiment of the present invention is the same as the foregoing first embodiment except for only a mounted structure of a PCB.

As illustrated in the drawing, a sub door 50 may have a plate opening 511 in an out plate 51, and a transparent panel assembly 60 may be mounted to cover the plate opening 511. Also, a front surface of the transparent panel assembly 60, which is exposed through the plate opening 511, may be defined as a see-through part 21.

Also, the inside of the refrigerator, i.e., the inside of the accommodation case 43 may be selectively visible through the see-through part 21, or a screen of the inside may be outputted according to an output of a screen on a display 62 constituting the transparent panel assembly 60 and a combination of a display light 68 and a door light 57.

Also, a PCB accommodation part 505 that is opened upward may be defined in an upper side of the inside of the sub door 50. The PCB accommodation part 505 may be defined in a door liner defining a rear surface of the sub door 50 and be recessed downward to form a space for accommodating a PCB 601'. Alternatively, the PCB accommodation part 505 may not be defined in the door liner 56 but be provided by an injection molding or a previously molded insulation member 53, which is separately assembled.

Also, the PCB accommodation part 505 may be covered by an upper cap decor 54 defining a top surface of the sub door 50. A heat dissipation hole 543 for releasing heat generated in the PCB 601' may be defined in an area of the upper cap decor 54, which corresponds to the PCB accommodation part 505.

The PCB 601' may be configured to control operations of a touch sensor 612, a display 62, and a display light 68, which constitute the transparent panel assembly 60, and may be provided in the form of a module. Also, the PCB 601' may also control the door light 57 and/or the heating member 517. The PCB 601' may be provided as one PCB module for controlling one or more constituents. As necessary, the PCB 601' may be provided by connecting one or more constituents to each other.

Also, a PCB connector 603 may be provided on the PCB 601'. The PCB connector 603 may be connected to an assembly connector 604 connected to the transparent panel assembly 60 while being assembled.

While the sub door 50 is assembled, the assembly connector 604 may be exposed to the inside of the PCB accommodation part 505. While the PCB 601' is mounted, the assembly connector 604 and the PCB connector 603 may be connected to each other. After the PCB 601' is completely mounted, the upper cap decor 54 may be mounted to assemble the sub door 50.

Figure 55:
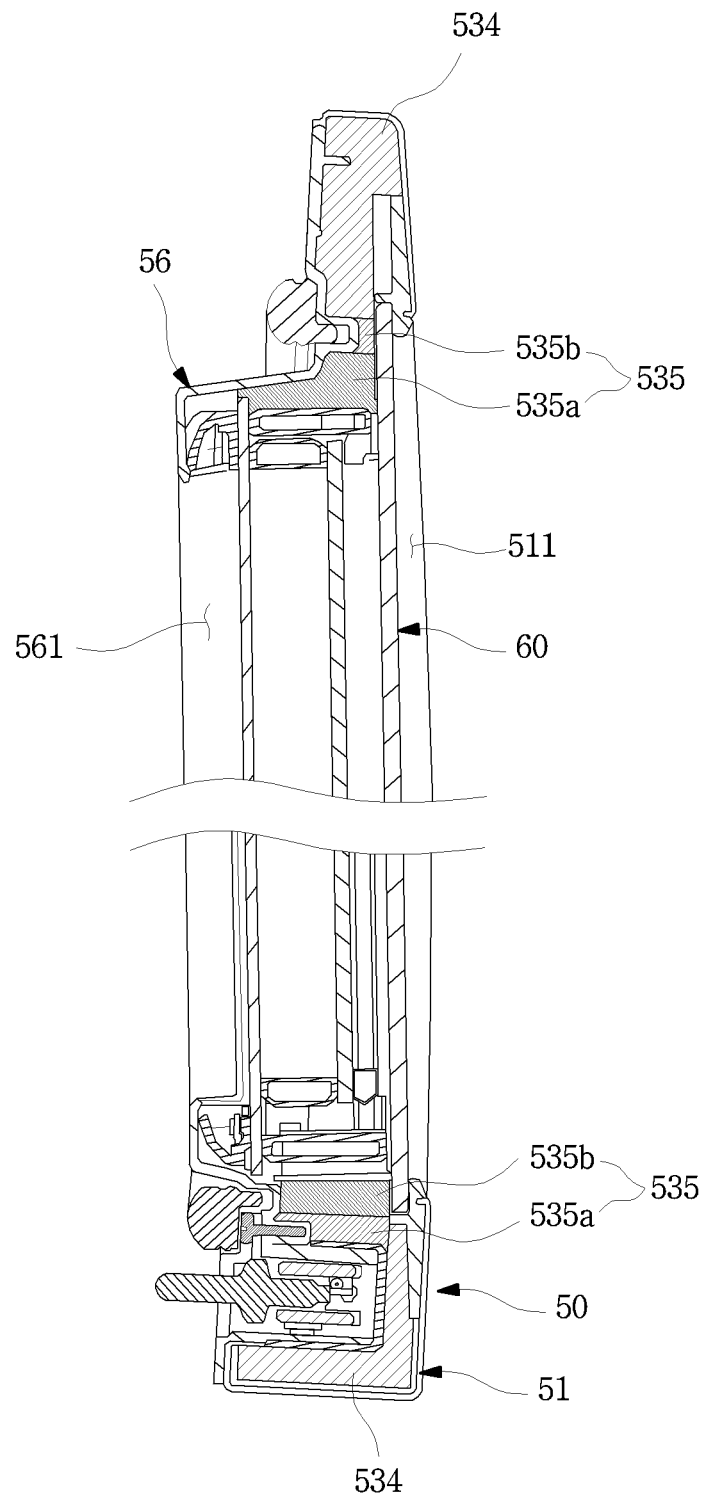
FIG. 55 is a transversely cross-sectional view of a sub door according to a sixth embodiment of the present invention.

FIG. 55 is a transversely cross-sectional view of a sub door according to a sixth embodiment of the present invention.

A fourth embodiment of the present invention is the same as the foregoing first embodiment except for only a heating member and a supplement member.

As illustrated in the drawing, an outer appearance of a sub door 50 is defined by an out plate 51, a door liner 56, an upper cap decor 54, and a lower cap decor 55. Also, a transparent panel assembly 60 may be disposed in the sub door 50 to cover a plate opening 511 and a liner opening 561.

A space may be defined in left and right sides of a space in which the transparent panel assembly 60 is disposed, and an insulation member 534 for insulating may be provided in the space. The sub door 50 may have a structure in which the transparent panel assembly 60 is mounted after the insulation member 534 is assembled. Thus, after the insulation member 534 is assembled, while the transparent panel assembly 60 is assembled and mounted, a gap may occur between a circumference of the transparent panel assembly 60 and the insulation member 534.

A supplement member 535 may be provided between the circumference of the transparent panel assembly 60 and the insulation member 534. The gap between the transparent panel assembly 60 and the insulation member 534 may be filled with the supplement member 535.

At least one or more supplement members 535 may be provided. For example, a first supplement member 535*a* made of a material having elasticity may be provided on a portion contacting the transparent panel assembly 60. Thus, the first supplement member 535*a* may press and support a circumferential surface of the transparent panel assembly 60 to prevent the gap from occurring. Also, even though the sub door 50 rotates, or an impact is applied to the sub door 50, the transparent panel assembly 60 may be stably protected.

Also, a second supplement member 535*b* may be disposed between the first supplement member 535*a* and the insulation member 534. The second supplement member 535*b* may be provided as an adhesive so that the first supplement member 535*a* and the insulation member 534 adhere to each other. Also, the second supplement member 535*b* may be made of an insulation material that is capable of being injected from the outside to provide additional insulation.

Alternatively, the supplement member 535 may be provided as a single constituent. In this case, the supplement member 535 may be provided in the form of the first supplement member 535*a* or the second supplement member 535*b*.

An inner region of the sub door 50 outside the transparent panel assembly 60 may be filled with the supplement member 535. Thus, insulation performance may be improved, and also, the inner space may be filled to provide a structure in which the out plate 51 and the door liner 56 are closely attached to each other.

Also, the supplement member 535 may have a structure that adheres to the out plate 51 and the door liner 56 to prevent the out plate 51 and the door liner 56 from being deformed.

Figure 56:
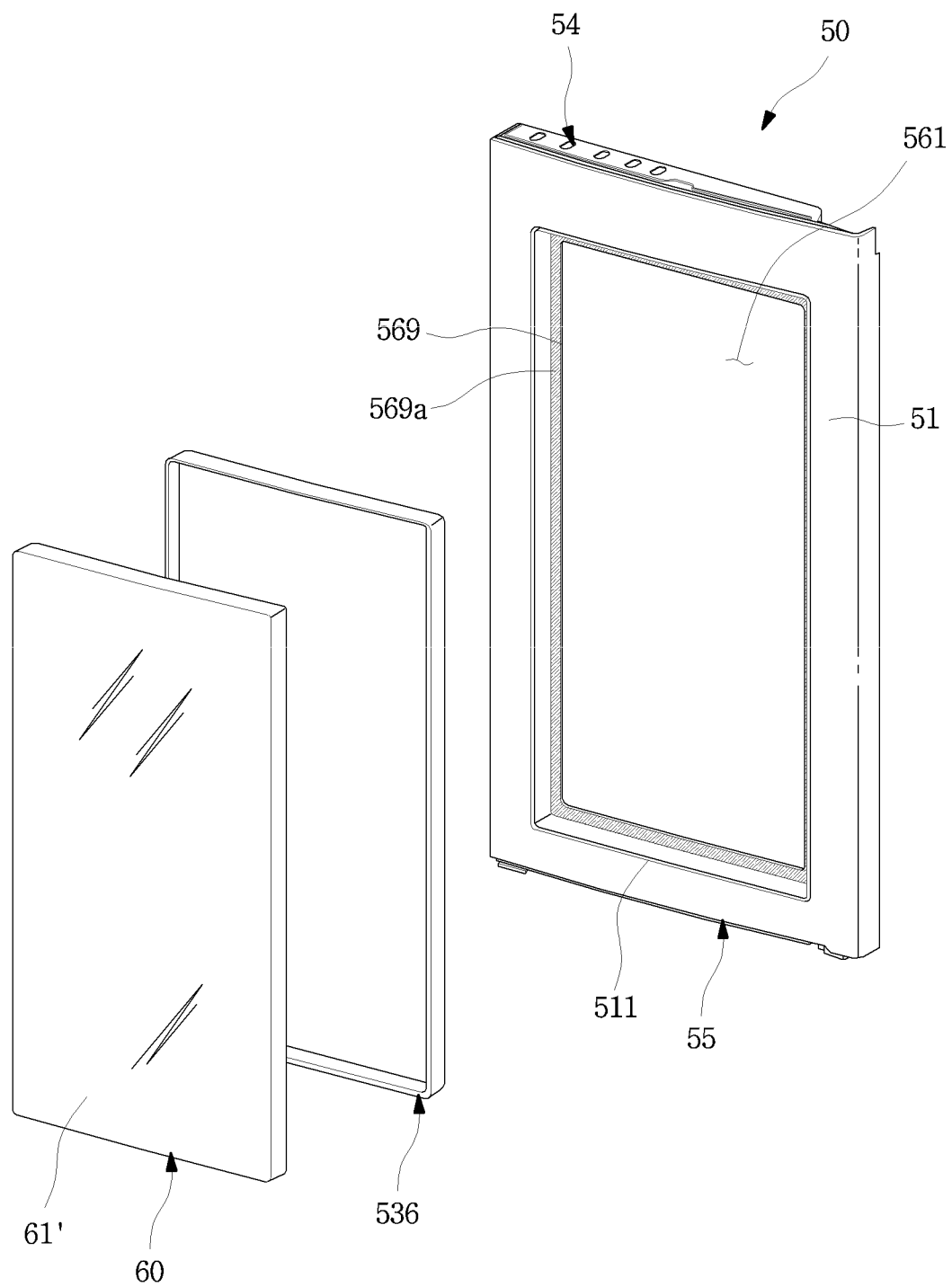
FIG. 56 is an exploded perspective view of a sub door according to a seventh embodiment of the present invention.

FIG. 56 is an exploded perspective view of a sub door according to a seventh embodiment of the present invention.

A third embodiment of the present invention is the same as the foregoing first embodiment except for a mounted structure of a transparent panel assembly.

As illustrated in the drawing, an outer appearance of a sub door 50 is defined by an out plate 51, a door liner 56, an upper cap decor 54, and a lower cap decor 55. Also, a transparent panel assembly 60 may be disposed in the sub door 50 to cover a plate opening 511 and a liner opening 561.

Although the transparent panel assembly 60 has the same structure as that according to foregoing first embodiment, a front panel 60' may have a size corresponding to a plate opening 511. Thus, the transparent panel assembly 60 may be inserted and mounted from a front side through the plate opening 511.

Also, a supplement member 536 may be disposed on a circumference of the transparent panel assembly 60. The supplement member 536 may be disposed on the whole or a portion of the circumference of the transparent panel assembly 60. An outer surface of the transparent panel assembly 60 and the inside of the sub door 50 may be supported by each other. Thus, a gap between the circumference of the transparent panel assembly 60 and the inner surface of the sub door 50 may be covered by the supplement member 536.

The supplement member 536 may be made of a rubber, resin, or silicon material. Thus, the transparent panel assembly 60 may be assembled in a state in which the supplement member 536 is applied to the circumference of the transparent panel assembly 60 or the inner surface of the sub door 50.

A seating part 569 on which the transparent panel assembly 60 is seated may be disposed inside the plate opening 511. The seating part 569 may protrude inward to support a circumference of a rear surface of the transparent panel assembly 60 and define the liner opening 561. Thus, the seating part 569 may be provided by the door liner 56 or provided by another constituent provided in the sub door 50.

A sealing member or adhesive 569*a* may be disposed on a front surface of the seating part 569. Thus, the rear surface of the transparent panel assembly 60 may be adhered and fixed to the seating part 569.

Figure 57:
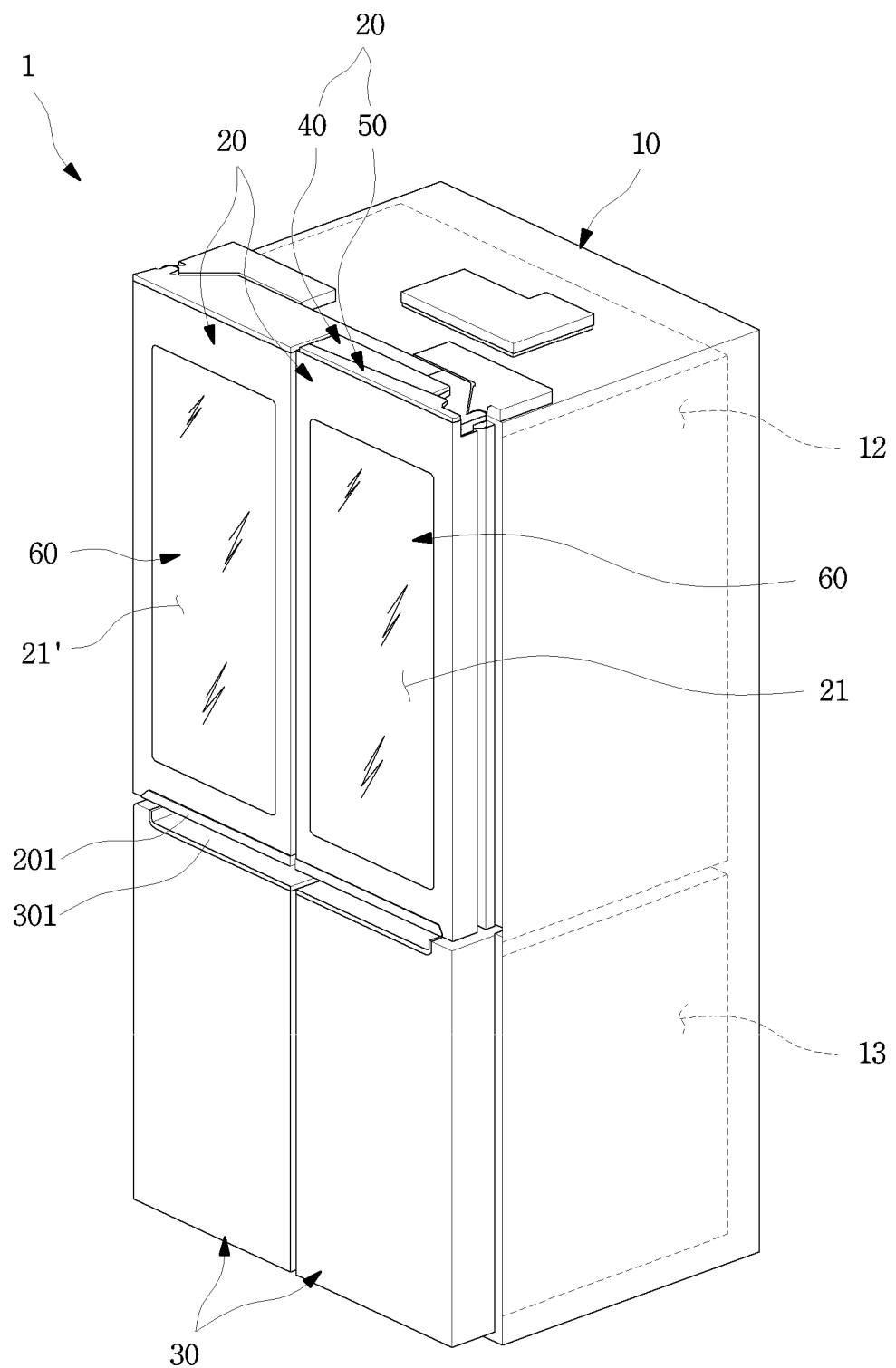
FIG. 57 is an exploded perspective view of a sub door according to an eighth embodiment of the present invention.

FIG. 57 is an exploded perspective view of a sub door according to an eighth embodiment of the present invention.

A fourth embodiment of the present invention is the same as the foregoing first embodiment except for only an arrangement of a see-through part.

As illustrated in the drawing, a refrigerator 1 according to a seventh embodiment of the present invention includes a refrigerating compartment 12 and a freezing compartment, which are respectively provided in upper and lower portions thereof. Also, a refrigerating compartment door 20 may be rotatably provided on the refrigerating compartment 12, and a freezing compartment door 30 may be provided on the freezing compartment 13.

The refrigerating compartment door 20 and the freezing compartment door 30 may be respectively configured to open and close the refrigerating compartment 12 and the freezing compartment 13 by the rotation thereof. Each of the refrigerating compartment door and the freezing compartment door 30 may be provided in a pair at left and right sides to partially or wholly open and close the refrigerating compartment 12 or the freezing compartment 13.

A right refrigerating compartment door 20 of the refrigerating compartment door 20 may be constituted by a main door 40 and a sub door 50. An opening 41 and an accommodation case 43 may be provided in the main door 40, and the opening 41 may be opened and closed by the sub door 50.

Also, a see-through part 21 through which the inside of the accommodation case 43 is visible may be provided in the sub door 50. The see-through part 21 may include a transparent panel assembly 60 mounted inside the sub door 50. The see-through part 21 may be selectively transparent or output a screen by a combination of a display 62, a display light 68, and a door light 57 of the transparent panel assembly 60.

A see-through part 21' may be provided in a left refrigerating compartment door 20. The see-through part 21' may be selectively transparent or output a screen by the transparent panel assembly 60. The see-through part 21 may be provided by mounting the transparent panel assembly 60 having the same structure as the see-through part 21' except for the position thereof. Also, the see-through part 21' may be provided in the refrigerating compartment door 20 to illuminate an inner space of a cabinet 10. As necessary, the left refrigerating compartment door 20 may also include the main door 40 and the sub door 50 and may selectively visualize the inside of the accommodation case 43 through the see-through part 21'.

That is, a stored state of foods in all of the pair of refrigerating compartment doors 20 that are respectively provided at the left right sides may be selectively visible through the see-through parts 21 and 21'. Also, the screen may be outputted through the see-through part 21 and 21'.

A refrigerator according to an embodiment includes: a see-through part passing through a door to communicate with an accommodation space; a transparent panel assembly covering the see-through part and outputting a screen; a display light provided in the transparent panel assembly to serve as a backlight when the screen is outputted; and a door light provided in the door behind a transparent display to selectively illuminate the accommodation member so that the inside of an accommodation space is visible through the see-through part, wherein the see-through part is displayed in one state of transparent, opaque, and screen output states by a combination of the display light and the door light.

The display light may be vertically disposed to emit light in directions facing each other, and the door light may be disposed on each of both sides to emit light in directions facing each other.

The door light may be disposed on a rear surface of the transparent display panel to emit light in a direction that is parallel to the transparent display panel.

The transparent display panel includes: a front panel made of a transparent material to define an outer appearance of a front surface of the transparent panel assembly and exposed through the see-through part; a display disposed behind the front panel to output a screen and being transparent; a light guide plate provided behind the display; a rear panel made of a transparent material to define an outer appearance of a rear surface of the transparent panel assembly and spaced apart from the front panel; and an outer spacer configured to connect the front panel to the rear panel and defining an outer appearance of a circumferential surface of the transparent panel assembly, wherein the display light is mounted on the outer spacer to emit light toward the light guide plate at positions corresponding to upper and lower ends of the light guide plate.

A heating member for preventing dew condensation from occurring may be disposed between the front panel and the front surface of the door outside the see-through part.

A spacer may be disposed between both left and right sides of the front panel and the light guide plate, and the spacer may be disposed at a further front side than an intermediate point of a thickness of the transparent panel assembly.

The outer spacer may include: a light mounting part which extends upward and downward from the light guide plate and on which the display light is mounted; and a spacer part extending to one side of the light mounting part to support a portion between the front panel and the light guide plate.

The door light may include: a lighting module emitting light backward; a light housing including a reflection part for reflecting the light emitted from the lighting module in a lateral direction; and a light cover that covers an opening of the light housing and through which the light reflected by the reflection part passes.

The front panel may have a size greater than that of the see-through part and further protrude outward than the display, the light guide plate, and the rear panel.

An inner frame disposed along a circumference of the see-through part may be disposed outside the door, and a circumference of the front panel may be seated on the inner frame.

The inner frame may have an accommodation groove into which an opening bent part that is bent along the circumference of the see-through part is inserted, and a space between the see-through part and the front panel may be covered by the inner frame.

A rib supporting an end of the front panel may be disposed on the rear surface of the inner frame.

A PCB mounting part on which a PCB for controlling an operation of the transparent panel assembly is mounted may be disposed on an upper portion of the inner frame, and the PCB mounting part may be disposed above the transparent panel assembly.

An upper cap decor defining a top surface of the door may be disposed above the PCB mounting part, and a heat dissipation hole for cooling the PCB may be defined in the upper cap decor.

A heat dissipation hole guide for guiding foreign substance passing through the heat dissipation hole to the outside of the PCB may be further defined in a circumference of the heat dissipation hole.

The PCB may include a T-CON board for controlling the display, a light PCB for controlling the display light, and a touch PCB for controlling a touch sensor attached to the front panel.

The PCB, the touch sensor, the display, and the display light may be connected to each other through an FFC or EEP type cables, and the cables may be disposed along the circumference of the transparent panel assembly.

A connector that is connected to be converted into a wire-type electric wire may be provided on the PCB.

The wire may pass through the upper cap decor and a hinge cover covering a hinge of the door and be guided to the outside of the door.

The PCB may be connected to the main control unit on the top surface of the cabinet by the wire, and the main control unit may include: a main PCB controlling an overall operation of the refrigerator; a display PCB connected to the PCB to control the transparent panel assembly and the door light; and an adaptor converting input power to transmit the power to the PCB.

A communication module may be connected to the display PCB, home appliances may be connected to each other by the communication module, and an operation state of each of the connected home appliances may be outputted to be manipulated.

A source board may be connected to at least one end of both left and right ends of the display, and the source board may be bent to the outside of the outer spacer to extend along the outer spacer.

An insulation member that is inserted and mounted in a molded shape along the circumference of the transparent panel assembly may be provided in the door.

A supplement member configured to support the transparent panel assembly may be further disposed between the insulation member and the transparent panel assembly.

The supplement member may be provided as an adhesive, a sealing member, or an elastic material.

The door may include: a main door rotatably mounted on the cabinet and having an accommodation space and a front opening communicating with the accommodation space; and a sub door rotatably mounted on the main door and including the see-through part.

A liner protrusion protruding backward and accommodated in the opening may be disposed on the sub door, and the door light may be disposed at a position facing each other on the liner protrusion.

INDUSTRIAL APPLICABILITY

According to the embodiment of the present invention, since the use convenience is improved, the industrial possibility is high.

What is claimed is:
1. A refrigerator comprising:
a cabinet having (i) a refrigerating compartment disposed at an upper portion of the cabinet and (ii) a freezing compartment disposed at a lower portion of the cabinet;
a main door configured to open and close at least a portion of the refrigerating compartment, the main door having (i) a door storage space and (ii) an opening that provides access to the door storage space;
a sub door disposed at a front side of the main door and configured to open and close the opening of the main door, the sub door comprising a viewing portion that faces an outside of the refrigerator;
a lighting member configured to illuminate the door storage space to thereby allow the door storage space of the main door to be visible from the outside through the viewing portion of the sub door; and
an opening device disposed at the sub door and configured to couple the sub door to the main door and to release the sub door from the main door,
wherein the sub door further comprises:
a panel assembly comprising (i) a front panel defining a front surface of the panel assembly, (ii) a rear panel defining a rear surface of the panel assembly, and (iii) a spacer disposed between the front panel and the rear panel, and
a plate having a plate opening at a portion corresponding to the panel assembly, the plate including (i) a front part that surrounds the plate opening and (ii) a side part that extends rearward from the front part and defines a side surface of the panel assembly,
wherein the spacer defines a first space between the front panel and the rear panel, and
wherein the sub door further comprises:
a door liner that defines a rear surface of the sub door, the door liner having a liner opening at an area corresponding to the panel assembly,
an upper cap décor that defines a top surface of the sub door and is coupled to upper ends of the plate and the door liner,
a lower cap décor that defines a bottom surface of the sub door and is coupled to lower ends of the plate and the door liner, and
an insulation member provided in a second space that is defined by the panel assembly, the plate, the door liner, the upper cap décor, and the lower cap décor.
2. The refrigerator of claim 1, further comprising a freezing compartment door configured to open and close at least a portion of the freezing compartment,
wherein the sub door defines a first handle groove recessed upward from a lower surface of the sub door, and
wherein the freezing compartment door defines a second handle groove that faces the first handle groove and is recessed downward from an upper surface of the freezing compartment door.

3. The refrigerator of claim 2, wherein the opening device comprises:
a manipulation lever disposed at the first handle groove and configured to be manipulated by a user;
a rod guide disposed between the side part of the plate and the side surface of the panel assembly;
a connecting rod that is connected to the manipulation lever and passes through the rod guide; and
a latch that protrudes from a rear surface of the sub door toward the main door, the latch being configured to move to the main door based the user manipulating the manipulation lever to thereby release the sub door from the main door, and
wherein the main door comprises a locking unit configured to catch or release the latch.

4. The refrigerator of claim 3, wherein the locking unit has a latch hole configured to receive the latch.

5. The refrigerator of claim 3, wherein the opening device further comprises an accommodation cover that is disposed between the side part of the plate and the side surface of the panel assembly and accommodates the latch.

6. The refrigerator of claim 1, wherein the front panel comprises a bezel that is disposed at a circumference of the front panel and surrounds the viewing portion.

7. The refrigerator of claim 6, wherein the front panel comprises a protruding portion that protrudes laterally outward relative to the rear panel, and
wherein the bezel is disposed at a rear surface of the protruding portion of the front panel.

8. The refrigerator of claim 6, further comprising a heater disposed at the bezel and configured to heat the circumference of the front panel.

9. The refrigerator of claim 8, wherein the heater comprises a wire-type heater or a film-type heater and is disposed along the bezel.

10. The refrigerator of claim 6, wherein the bezel has a black color and is printed on a rear surface of the front panel.

11. The refrigerator of claim 1, wherein the front panel is made of a transparent glass material comprising blue glass.

12. The refrigerator of claim 1, wherein the rear panel is made of a transparent glass material comprising a low-emission coating layer, the rear panel being configured to reduce heat transfer from the refrigerating compartment and the door storage space to the outside.

13. The refrigerator of claim 2, wherein the first space is a vacuum or accommodating an insulation gas.

14. The refrigerator of claim 1, wherein the insulation member is in contact with the plate and surrounds the panel assembly.

15. The refrigerator of claim 14, wherein the insulation member is disposed between the plate and the door liner, the insulation member comprising:
an upper insulation disposed above an upper surface of the panel assembly;
a lower insulation disposed below a lower surface of the panel assembly; and
a pair of side insulations disposed at sides of the panel assembly, respectively, and
wherein one of the pair of side insulations defines a recess at a position corresponding to the opening device.

16. The refrigerator of claim 1, further comprising a supplement member that is disposed between the insulation member and the panel assembly.

17. The refrigerator of claim 16, wherein the supplement member comprises an adhesive or a sealing that couples the insulation member to the panel assembly.

18. The refrigerator of claim 1, further comprising a damper that is disposed at a lower portion of the sub door and protrudes rearward from a rear surface of the sub door, wherein the damper is configured to:
contact the front surface of the main door based on the sub door closing the opening of the main door; and
apply pressure to the front surface of the main door based on the opening device releasing the sub door from the main door to thereby provide a gap between the sub door from the main door.

19. A refrigerator comprising:
a cabinet having (i) a refrigerating compartment disposed at an upper portion of the cabinet and (ii) a freezing compartment disposed at a lower portion of the cabinet;
a main door configured to open and close at least a portion of the refrigerating compartment, the main door having (i) a door storage space and (ii) an opening that provides access to the door storage space;
a sub door disposed at a front side of the main door and configured to open and close the opening of the main door, the sub door comprising a viewing portion that faces an outside of the refrigerator;
a freezing compartment door configured to open and close at least a portion of the freezing compartment;
a lighting member configured to illuminate the door storage space to thereby allow the door storage space to be visible from the outside through the viewing portion of the sub door; and
an opening device disposed at the sub door and configured to couple the sub door to the main door and to release the sub door from the main door,
wherein the sub door further comprises:
a panel assembly comprising (i) a front panel defining a front surface of the panel assembly, (ii) a rear panel defining a rear surface of the panel assembly, and (iii) a spacer that defines a first space between the front panel and the rear panel,
a plate that defines a plate opening that receives a portion of the panel assembly,
the plate including (i) a front part that surrounds the plate opening and (ii) a side part that extends rearward from the front part and defines a side surface of the panel assembly,
a door liner that defines a rear surface of the sub door, the door liner having a liner opening at an area corresponding to the panel assembly,
an upper cap décor that defines a top surface of the sub door and is coupled to upper ends of the plate and the door liner,
a lower cap décor that defines a bottom surface of the sub door and is coupled to lower ends of the plate and the door liner, and
an insulation member provided in a second space that is defined by the panel assembly, the plate, the door liner, the upper cap décor, and the lower cap décor,
wherein the sub door defines a first handle groove recessed upward from a lower surface of the sub door,
wherein the freezing compartment door defines a second handle groove that faces the first handle groove and is recessed downward from an upper surface of the freezing compartment door,
wherein the opening device comprises:
a manipulation lever disposed at the first handle groove and configured to be manipulated by a user,
a rod guide disposed within the second space of the sub door;

a connecting rod that is connected to the manipulation lever and passes through the rod guide, and a latch that protrudes from the rear surface of the sub door toward the main door, the latch being configured to move to the main door based the user manipulating the manipulation lever to thereby release the sub door from the main door, and wherein the main door comprises a locking unit configured to catch or release the latch based the user manipulating the manipulation lever.

* * * * *